US012581222B2

(12) United States Patent
Han

(10) Patent No.: US 12,581,222 B2
(45) Date of Patent: Mar. 17, 2026

(54) SIGNAL READOUT CIRCUIT AND METHOD THEREFOR

(71) Applicant: SPIKE VISION (BEIJING) TECHNOLOGY CO., LTD., Beijing (CN)

(72) Inventor: Runze Han, Beijing (CN)

(73) Assignee: SPIKE VISION (BEIJING) TECHNOLOGY CO., LTD., Beijing (CN)

( * ) Notice: Subject to any disclaimer, the term of this patent is extended or adjusted under 35 U.S.C. 154(b) by 132 days.

(21) Appl. No.: 18/466,791

(22) Filed: Sep. 13, 2023

(65) Prior Publication Data

US 2024/0089638 A1       Mar. 14, 2024

(30) Foreign Application Priority Data

Sep. 14, 2022    (CN) .......................... 202211113054.X
Sep. 14, 2022    (CN) .......................... 202211113101.0
(Continued)

(51) Int. Cl.
| | |
|---|---|
| *H04N 25/78* | (2023.01) |
| *H04N 25/47* | (2023.01) |
| *H04N 25/77* | (2023.01) |

(52) U.S. Cl.
CPC ............. *H04N 25/78* (2023.01); *H04N 25/47* (2023.01); *H04N 25/77* (2023.01)

(58) Field of Classification Search
None
See application file for complete search history.

(56) References Cited

U.S. PATENT DOCUMENTS

| | | |
|---|---|---|
| 2008/0218614 A1 | 9/2008 | Joshi et al. |
| 2009/0190018 A1 | 7/2009 | Sakakibara |
| (Continued) | | |

FOREIGN PATENT DOCUMENTS

| | | |
|---|---|---|
| CN | 102215352 A | 10/2011 |
| CN | 104704812 A | 6/2015 |
| (Continued) | | |

OTHER PUBLICATIONS

Lenero-Bardallo et al., "Asynchronous Spiking Pixel With Programmable Sensitivity to Illumination," IEEE Transactions on Circuits and Systems-I: Regular Papers, vol. 65, No. 11, pp. 3854-3863, Institute of Electrical and Electronics Engineers, New York, New York (Nov. 2018).

*Primary Examiner* — Quan Pham
(74) *Attorney, Agent, or Firm* — Leydig, Voit & Mayer, Ltd.

(57) ABSTRACT

Provided are a signal readout circuit and a method therefor. In the signal readout circuit, a readout row selector is configured to gate a row of pixel units in a pixel array. A reset row selector is configured to gate first reset switches of the row of pixel units. Each pixel unit in the row in a pixel subarray included in the pixel array converts an optical signal into an electrical signal, and outputs the electrical signal to a connected pixel subarray readout feedback circuit. When it is determined based on the electrical signal that a signal generation condition is met, a reset signal is generated and sent to a first pixel unit, and an output signal is generated for output.

16 Claims, 22 Drawing Sheets

(30)      Foreign Application Priority Data

| Oct. 24, 2022 | (CN) | .......................... | 202211301756.0 |
| Jan. 12, 2023 | (CN) | .......................... | 202310038893.8 |
| Jan. 17, 2023 | (CN) | .......................... | 202310060235.9 |

(56)      References Cited

U.S. PATENT DOCUMENTS

| 2010/0026838 | A1 | 2/2010 | Belenky et al. |
| 2014/0008521 | A1* | 1/2014 | Rostaing .............. H04N 25/772 |
| | | | 250/208.1 |
| 2015/0043655 | A1* | 2/2015 | Nilsson .................. G06V 20/41 |
| | | | 375/240.26 |
| 2015/0103219 | A1 | 4/2015 | Kasuga et al. |
| 2016/0118424 | A1 | 4/2016 | Guidash et al. |
| 2017/0339326 | A1* | 11/2017 | Rycenga ................. B60R 11/04 |
| 2018/0349697 | A1 | 12/2018 | Kang et al. |
| 2021/0337151 | A1 | 10/2021 | Berner et al. |

FOREIGN PATENT DOCUMENTS

| CN | 111898737 | A | 11/2020 |
| CN | 112449125 | A | 3/2021 |
| CN | 113034634 | A | 6/2021 |
| CN | 113067979 | A | 7/2021 |
| CN | 113554726 | A | 10/2021 |
| CN | 114495178 | A | 5/2022 |
| CN | 115190220 | A | 10/2022 |
| CN | 219181573 | U | 6/2023 |
| JP | 200154022 | A | 2/2001 |
| JP | 2001245214 | A | 9/2001 |
| JP | 2005252743 | A | 9/2005 |

* cited by examiner

501

502

503

3011

302

303

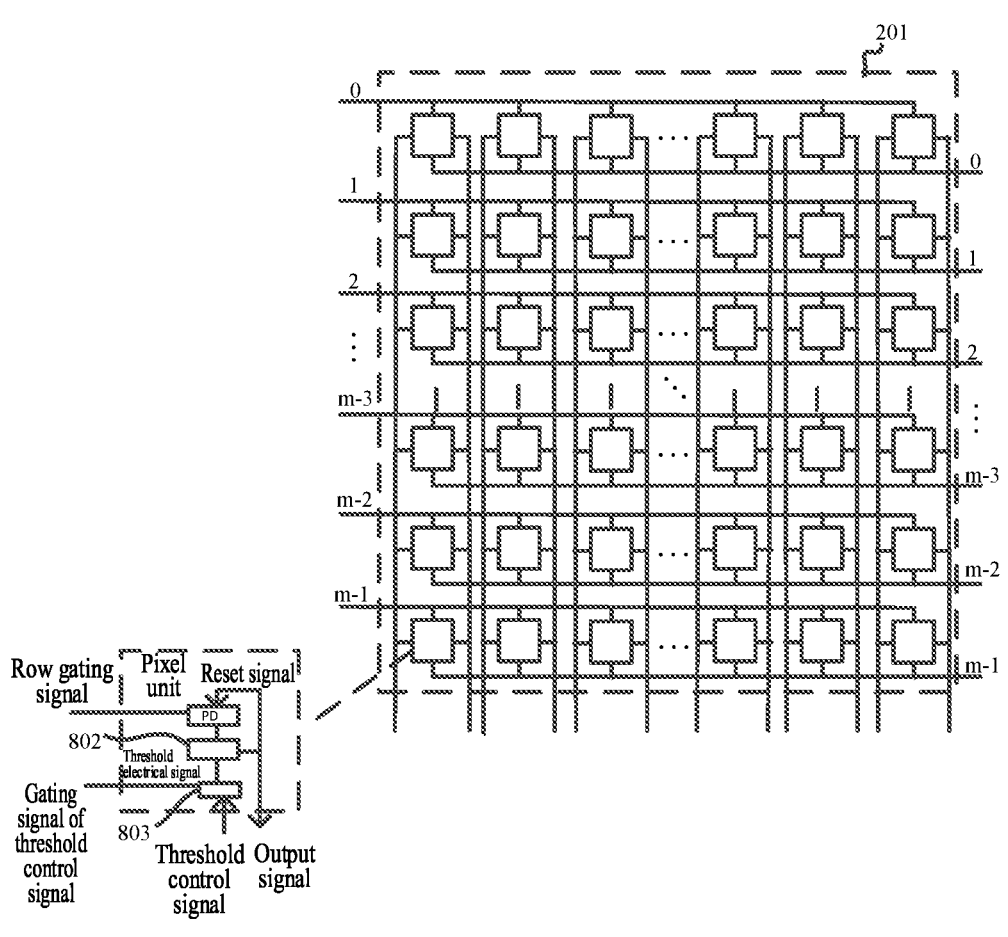
FIG. 13B
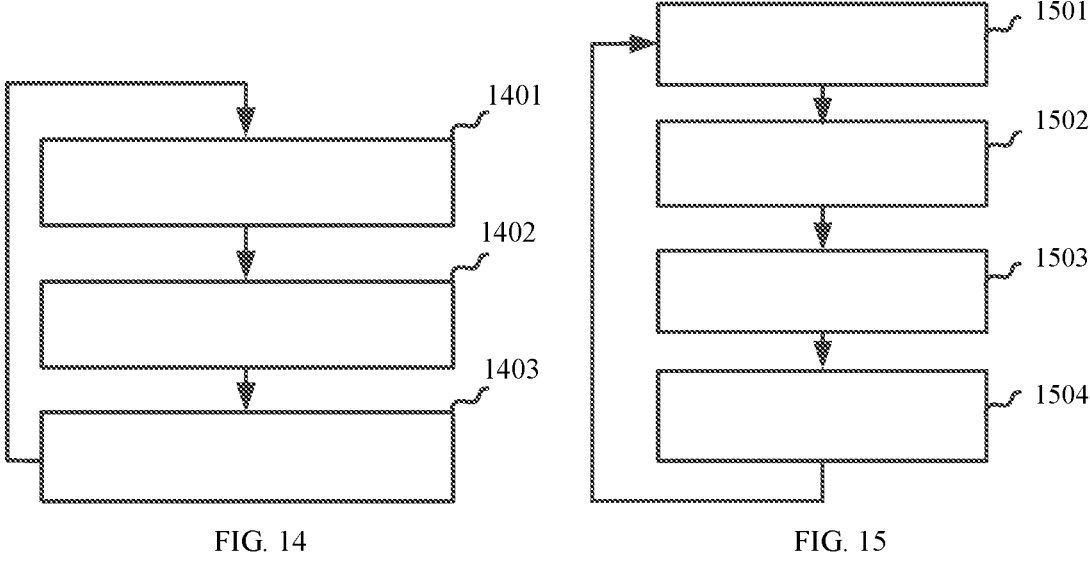
FIG. 14                                FIG. 15

SIGNAL READOUT CIRCUIT AND METHOD THEREFOR

CROSS-REFERENCE TO RELATED APPLICATIONS

The present disclosure claims priorities to Chinese Patent Application No. 202211113101.0, filed on Sep. 14, 2022, to Chinese Patent Application No. 202211301756.0, filed on Oct. 24, 2022, to Chinese Patent Application No. 202211113054.X, filed on Sep. 14, 2022, to Chinese Patent Application No. 202310038893.8, filed on Jan. 12, 2023, and to Chinese Patent Application No. 202310060235.9, filed on Jan. 17, 2023, the contents of which are hereby incorporated by reference in their entirety for all purposes.

TECHNICAL FIELD

The present disclosure relates to the technical field of image sensor imaging, and in particular, to a signal readout circuit and a method therefor.

BACKGROUND

Image sensors have always been a hot research topic. A bionic pulse sequence image sensor as a neuromorphic visual sensor features a high frame rate and a low data throughput, and meets a requirement for high-speed imaging. The pulse sequence image sensor imitates retinal imaging of primates, and emits pulse sequences at a high density to record continuous light intensity information in a scene, so that high-speed motions can be captured and recorded, and texture details in the scene can also be reconstructed. Therefore, the pulse sequence image sensor has high application value in machine vision, dynamic scene capturing, and other fields.

SUMMARY

According to one aspect of the present disclosure, a signal readout circuit is provided. The signal readout circuit includes: a pixel array, a readout row selector, a reset row selector, and at least one pixel subarray readout feedback circuit. The pixel array includes at least one pixel subarray. Each pixel subarray is electrically connected to a corresponding pixel subarray readout feedback circuit in the at least one pixel subarray readout feedback circuit. The readout row selector is configured to send a row readout signal to a selected row of pixel units in the pixel array, to gate the selected row of pixel units. The reset row selector is configured to send a row reset signal to the selected row of pixel units, to gate first reset switches of the selected row of pixel units. The selected row of pixel units include a first pixel unit. The first pixel unit is configured to convert an optical signal into an electrical signal, and output the electrical signal to the corresponding pixel subarray readout feedback circuit. In addition, the corresponding pixel subarray readout feedback circuit is configured to receive the electrical signal from the first pixel unit, and in response to determining based on the electrical signal that a signal generation condition is met, generate a reset signal and send the reset signal to the first pixel unit, to gate a second reset switch of the first pixel unit, wherein the reset signal and the row reset signal cause the first pixel unit to perform a reset operation, and generate an output signal for output.

According to another aspect of the present disclosure, a method for a signal readout circuit is provided. The signal readout circuit includes: a pixel array, a readout row selector, a reset row selector, and at least one pixel subarray readout feedback circuit. The pixel array includes at least one pixel subarray. Each pixel subarray is electrically connected to a corresponding pixel subarray readout feedback circuit in the at least one pixel subarray readout feedback circuit. The method includes the following operations: the readout row selector sends a row readout signal to a selected row of pixel units in the pixel array, to gate the selected row of pixel units; outputting, by a first pixel unit in the selected row of pixel units, an electrical signal to the corresponding pixel subarray readout feedback circuit, where the electrical signal is converted from an optical signal; the corresponding pixel subarray readout feedback circuit receives the electrical signal, and in response to determining based on the electrical signal that a signal generation condition is met, generates an output signal, and generates a reset signal and outputs the reset signal to the first pixel unit; and the reset row selector sends a row reset signal to the row of pixel units, to cause the first pixel unit to reset in response to the row reset signal and the reset signal.

According to another aspect of the present disclosure, a device is provided. The device includes a signal readout circuit. The signal readout circuit includes: a pixel array, a readout row selector, a reset row selector, and at least one pixel subarray readout feedback circuit. The pixel array includes at least one pixel subarray. Each pixel subarray is electrically connected to a corresponding pixel subarray readout feedback circuit in the at least one pixel subarray readout feedback circuit. The readout row selector is configured to send a row readout signal to a selected row of pixel units in the pixel array, to gate the selected row of pixel units. The reset row selector is configured to send a row reset signal to the selected row of pixel units, to gate first reset switches of the selected row of pixel units. The selected row of pixel units include a first pixel unit. The first pixel unit is configured to convert an optical signal into an electrical signal, and output the electrical signal to the corresponding pixel subarray readout feedback circuit. In addition, the corresponding pixel subarray readout feedback circuit is configured to receive the electrical signal from the first pixel unit, and in response to determining based on the electrical signal that a signal generation condition is met, generate a reset signal and send the reset signal to the first pixel unit, to gate a second reset switch of the first pixel unit, where the reset signal and the row reset signal cause the first pixel unit to perform a reset operation, and generate an output signal.

These and other aspects of the present disclosure will be clear from the embodiments described below, and will be clarified with reference to the embodiments described below.

BRIEF DESCRIPTION OF THE DRAWINGS

FIG. 13B is a schematic diagram of another example of a signal readout circuit according to an embodiment of the present disclosure;

FIG. 14 is an example flowchart of a method for a signal readout circuit according to an embodiment of the present disclosure;

FIG. 15 is a flowchart of another method for a signal readout circuit according to an embodiment of the present disclosure;

DETAILED DESCRIPTION OF EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All other embodiments obtained by those of ordinary skill in the art based on the embodiments of the present disclosure without any creative effort shall fall within the protection scope of the present disclosure.

In the description, claims and accompanying drawings of the present disclosure, the terms such as "first", "second", "third", and "fourth" (if present) are used for distinguishing similar objects, but are not used for describing a particular sequence or order among the objects. It should be understood that the data termed in such a way is interchangeable in proper circumstances so that the embodiments of the present disclosure described herein can be implemented in an order other than the order illustrated or described herein. In addition, the terms "comprising" and "having" and any variations thereof are intended to cover non-exclusive inclusion. For example, processes, methods, systems, products, or devices including a series of steps or units are not necessarily limited to clearly listing those steps or units, but may include other steps or units not clearly listed or inherent to those processes, methods, products, or devices. In the context of this description, the term "electrically connected" means a low-ohmic electrical connection between the connected elements. The electrically connected elements need not necessarily be directly connected to one another. Further elements may be arranged between electrically connected elements.

The technical solution of the present disclosure will be described in detail below with reference to specific embodiments. The following specific embodiments may be combined with each other, and the same or similar concepts or processes may not be described in detail in some embodiments.

Figure 1:
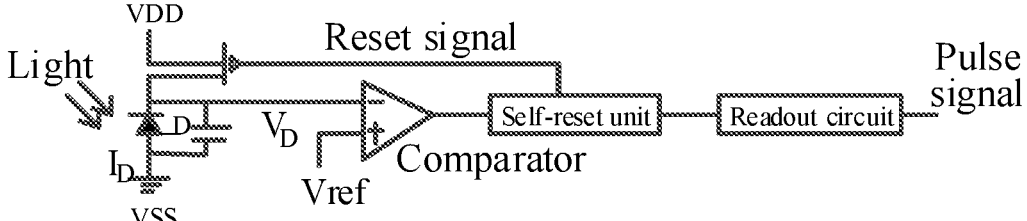
FIG. 1 is a schematic circuit diagram of each pixel unit in a pixel array circuit of a pulse sequence image sensor.

In an embodiment of the present disclosure, an imaging array circuit in a pulse sequence image sensor includes a plurality of pixel units arranged in an array. An imaging array may also be referred to as a pixel array. A circuit structure of each pixel unit is shown in FIG. 1. FIG. 1 is a schematic circuit diagram of each pixel unit in a pixel array circuit of a pulse sequence image sensor. The pixel unit includes: a photodiode, a reset transistor, a comparator, a self-reset unit, and a readout circuit within the pixel unit. Under lighting conditions, the photodiode generates a photo-generated current $I_D$ in an integration manner, and generates a photo-generated charge $Q_D$. When the comparator determines that the photo-generated charge $Q_D$ reaches a threshold $Q_{ref}$, the self-reset unit resets the photodiode by using the reset transistor, restarts integration, and generates a signal 1, and a readout circuit element transmits the signal 1 when a synchronous readout signal arrives. A clock cycle in which a readout signal arrives is a frame period. Therefore, if no signal 1 is generated within one frame cycle, a signal 0 is output when a synchronous readout signal arrives.

It can be learned that, in addition to the photodiode, the circuit of each pixel unit in the pixel array of the pulse sequence image sensor further includes a plurality of other devices. Therefore, an occupied area is large. Given a fixed overall circuit area, the plurality of devices occupy much circuit space, which limits a scale of the imaging array. As a result, a fill factor of the pixel unit is decreased, a proportion of a photosensitive area is small, and imaging performance under low-light conditions is poor. In the pulse sequence image sensor, an independent comparator is disposed in each pixel unit, and is configured to implement signal readout of the pixel unit and generate a reset signal. Therefore, the pixel units need a same quantity of independent comparators, which complicates the circuit of the pixel units and scales up the pixel array. In addition, because offset voltages of comparators in different pixel units may be different, imaging uniformity of the imaging array is reduced.

Therefore, to mitigate, alleviate, or eliminate the foregoing problems, a circuit for generating a signal and a reset signal is implemented outside the pixel unit in the circuit in an embodiment of the present disclosure. In other words, a disposed pixel subarray readout feedback circuit generates the signal and the reset signal for a plurality of pixel units electrically connected to the pixel subarray readout feedback circuit. A circuit for generating an electrical signal from an optical signal and a circuit for reset based on a received row reset signal and a reset signal are reserved in the pixel unit. The pixel unit outputs an electrical signal to the connected pixel subarray readout feedback circuit under the control of a row readout signal, and resets under the control of a reset signal output by the pixel subarray readout feedback circuit and a row reset signal from a reset row selector.

In this way, a circuit area occupied by the circuit of each pixel unit in the pixel array circuit is reduced. Given a fixed quantity of pixel units, the circuit can be scaled down, to achieve circuit miniaturization. Alternatively, given a fixed circuit scale, because a circuit area of each pixel unit is reduced, more pixel units may be disposed to implement photoelectric conversion, a dynamic imaging range can be increased, and especially imaging performance under low-light conditions can be improved. With the circuit structure provided in this embodiment of the present disclosure, signal and reset signal generation functions of the plurality of different pixel units in one pixel subarray are all implemented by the connected pixel subarray readout feedback circuit, so that imaging uniformity of the imaging array is improved.

Because circuits implemented in each pixel unit in the pixel array circuit are reduced, the circuit for generating the electrical signal from the optical signal, that is, an area occupied by the photodiode, can be increased. Therefore, the fill factor of each pixel unit is increased, the proportion of the photosensitive area of each pixel unit is increased, and imaging performance under low-light conditions is improved. Because the signal and reset signal generation functions of the different pixel units are all implemented by the disposed pixel subarray readout feedback circuit, the problem that offset voltages of comparators in the different pixel units that are in the pixel subarray and that are connected to the pixel subarray readout feedback circuit cannot be unified does not exist, and imaging uniformity of the pixel array circuit as the imaging array is improved.

Herein, the pulse sequence image sensor is implemented by using a signal readout circuit provided in embodiments of the present disclosure.

Figure 2:
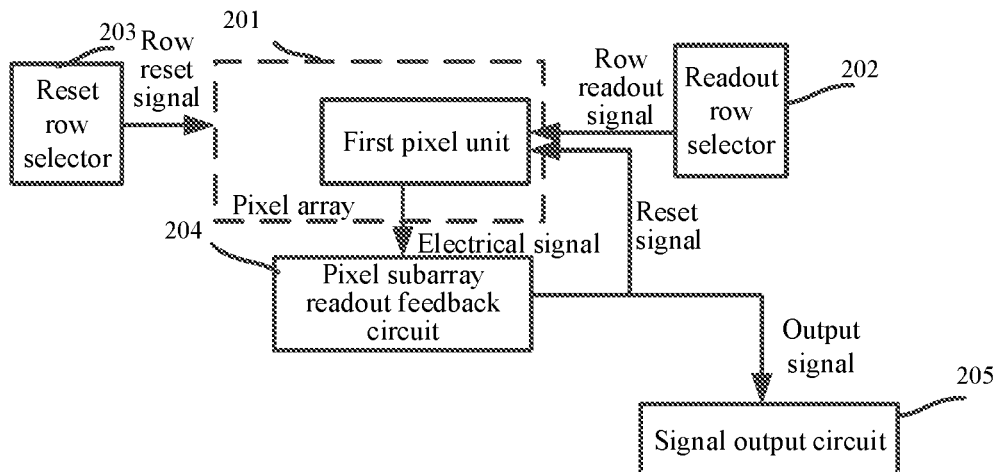
FIG. 2 is a schematic diagram of an overall structure of a signal readout circuit according to an embodiment of the present disclosure.

FIG. 2 is a schematic diagram of an overall structure of a signal readout circuit according to an embodiment of the present disclosure. The circuit is an imaging array circuit in a pulse sequence image sensor, and includes: a pixel array 201, a readout row selector 202, a reset row selector 203, and at least one pixel subarray readout feedback circuit 204.

The pixel array 201 includes at least one pixel subarray. Each pixel subarray is connected electrically connected to a corresponding pixel subarray readout feedback circuit in the at least one pixel subarray readout feedback circuit 204.

The readout row selector 202 is configured to send a row readout signal to a corresponding row (for example, a selected row) of pixel units in the pixel array 201, to gate the row of pixel units.

The reset row selector 203 is configured to send a row reset signal to the row of pixel units, to gate first reset switches of the row of pixel units. The row of pixel units include a first pixel unit.

The first pixel unit is configured to convert an optical signal into an electrical signal, and output the electrical signal to the at least one connected pixel subarray readout feedback circuit 204.

The corresponding pixel subarray readout feedback circuit 204 is configured to receive the electrical signal from the first pixel unit, and in response to determining based on the electrical signal that a signal generation condition is met, generate a reset signal and send the reset signal to the first pixel unit, to gate a second reset switch of the first pixel unit, and generate an output signal for output.

In some embodiments, the signal readout circuit further include a signal output circuit 205. In response to the signal generation condition, the signal output circuit 205 outputs the output signal.

It can be learned from the signal readout circuit in FIG. 2 that, in this embodiment of the present disclosure, signal and reset signal generation functions of the pixel units in the pixel array 201 are all completed by the pixel subarray readout feedback circuit 204 connected to the pixel units. Therefore, a circuit area of each pixel unit is reduced, and an area of the signal readout circuit is further reduced, to achieve circuit miniaturization. In addition, given an unchanged scale of the signal readout circuit, a quantity of pixel units can be increased, so that a dynamic range of photoelectric conversion is increased, and imaging performance under low-light conditions is improved. Different pixel units controlled by the pixel subarray readout feedback circuit 204 have a unified process of converting an electrical signal into a signal, so that non-uniformity of an array image caused by offset voltages of comparators in the different pixel units is reduced.

In this embodiment of the present disclosure, the signal includes: a pulse signal, a level signal, a value with a limit, or the like. This is not limited herein. Correspondingly, the signal output circuit 205 outputs the pulse signal, the level signal, the value with a limit, or the like. This is not limited herein.

During specific implementation, an example in which the signal is the pulse signal is described in detail.

In the circuit shown in FIG. 2, the pixel array 201 includes at least one row of a plurality of pixel units arranged in rows and columns. The pixel units may be m*n pixel units, namely, m rows and n columns of pixel units, where m and n are natural numbers.

Figure 3A:
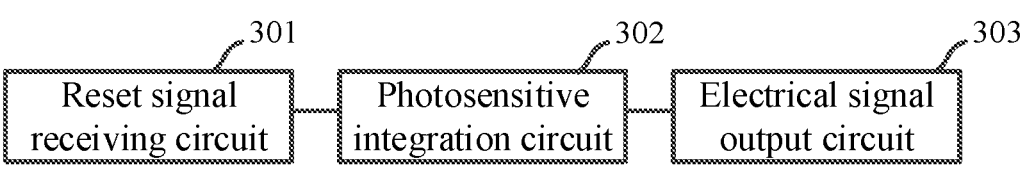
FIG. 3A is a schematic circuit diagram of a pixel unit according to an embodiment of the present disclosure.

In this embodiment of the present disclosure, a circuit structure of the pixel unit is shown in FIG. 3A, and includes: a reset signal receiving circuit 301, a photosensitive integration circuit 302, and an electrical signal output circuit 303.

The reset signal receiving circuit 301 is configured to receive the row reset signal to gate the first reset switch, and receive the reset signal sent by the connected pixel subarray readout feedback circuit 204 to gate the second reset switch for performing a reset operation and to turn on the photosensitive integration circuit 302.

The photosensitive integration circuit 302 is configured to: in an on state, convert the optical signal into the electrical signal under lighting conditions and output the electrical signal to the electrical signal output circuit 303.

The electrical signal output circuit 303 is configured to: in response to the row readout signal, output the electrical signal to the corresponding pixel subarray readout feedback circuit 204.

In an example, the photosensitive integration circuit 302 is implemented by a photodiode (PD). The reset signal receiving circuit 301 is implemented by cascading a plurality of transistors. The electrical signal output circuit 303 is implemented by a transistor.

Herein, the electrical signal is a voltage signal or a current signal. This is not limited herein.

Figure 3B:
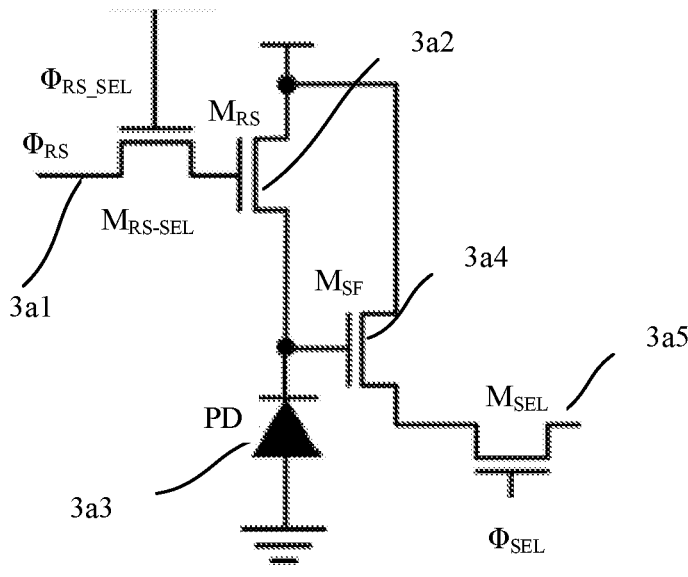
FIG. 3B is a schematic diagram of a structure of a specific circuit implementation of a pixel unit according to an embodiment of the present disclosure.

FIG. 3B is a schematic diagram of a structure of a specific circuit implementation of a pixel unit according to an embodiment of the present disclosure. In this example, the reset signal receiving circuit 301 includes a first transistor 3$a$1 and a second transistor 3$a$2. The photosensitive integration circuit 302 includes a photodiode (PD) 3$a$3. The electrical signal output circuit 303 includes a third transistor 3$a$4 and a fourth transistor 3$a$5. The first transistor 3$a$1 includes $M_{RS\text{-}SEL}$. The second transistor 3$a$2 includes $M_{RS}$. The third transistor 3$a$4 includes $M_{SF}$. The fourth transistor 3$a$5 includes $M_{SEL}$.

A gate of the $M_{RS\text{-}SEL}$ is the first reset switch and receives the row reset signal, a source is the second reset switch and receives the reset signal, and a drain is connected to a gate of the $M_{RS}$. A drain of the $M_{RS}$ is connected to a high-level voltage signal, and a source is connected to an output end of the PD. An input end of the PD is connected to the ground.

A grid of the $M_{SF}$ is connected to the output end of the PD, a drain is connected to the drain of the $M_{RS}$, and a source is connected to a drain of the $M_{SEL}$. A source of the $M_{SEL}$ outputs an electrical signal, and a grid receives the row readout signal.

In this example, a signal $\Phi_{SEL}$ applied to the $M_{SEL}$ is a readout signal, and a voltage signal on the PD is transferred to a column output line of the array. $\Phi_{RS\_SEL}$ applied to the $M_{RS\_SEL}$ is a row reset signal, a signal $\Phi_{RS}$ is a reset signal, and the two signals are used to jointly control a reset operation of the PD.

Figure 3C:
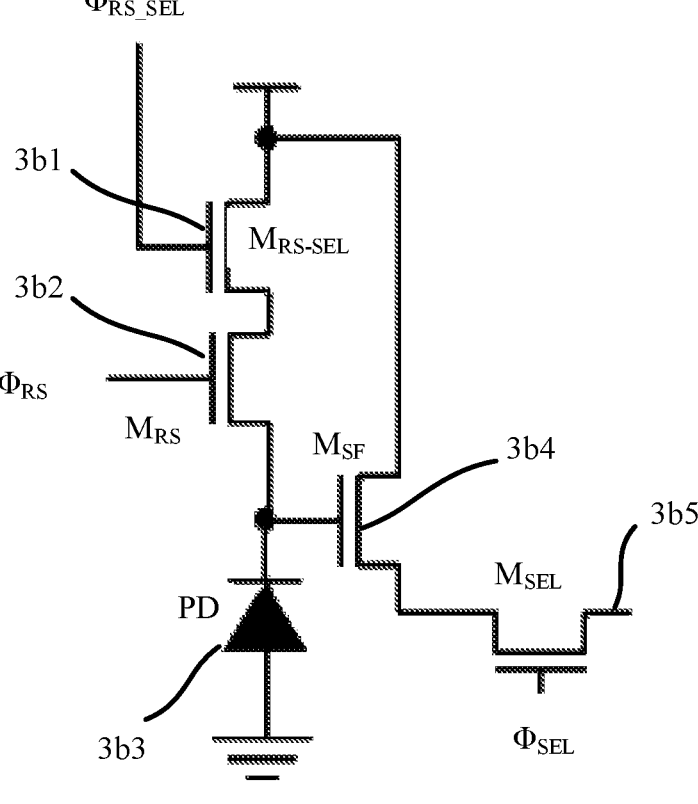
FIG. 3C is a schematic diagram of a structure of another specific circuit implementation of a pixel unit according to an embodiment of the present disclosure.

FIG. 3C is a schematic diagram of a structure of another specific circuit implementation of a pixel unit according to an embodiment of the present disclosure. In an example, the reset signal receiving circuit 301 includes a first transistor 3$b$1 and a second transistor 3$b$2. The photosensitive integration circuit 302 includes a photodiode (PD) 3$b$3. The electrical signal output circuit 303 includes a third transistor 3$b$4 and a fourth transistor 3$b$5. The first transistor 3$b$1, the second transistor 3$b$2, the third transistor 3$b$4, and the fourth transistor 3$b$5 are respectively $M_{RS\text{-}SEL}$, $M_{RS}$, $M_{SF}$, and $M_{SEL}$.

A grid of the $M_{RS\text{-}SEL}$ is the first reset switch and receives the row reset signal, a drain is connected to a high level, and a source is connected to a drain of the $M_{RS}$. A grid of the $M_{RS}$ is the second reset switch and receives the reset signal, and a source is connected to an output end of the PD. An input end of the PD is connected to the ground. The grid of the $M_{SF}$ is connected to the output end of the PD, a drain of the $M_{SF}$ is connected to a drain of the $M_{RS\text{-}SEL}$, and a source of the $M_{SF}$ is connected to a drain of the $M_{SEL}$. A source of the $M_{SEL}$ outputs the electrical signal, and a grid receives the row readout signal.

In the example shown in FIG. 3B or FIG. 3C, a 3T-active pixel sensor (APS) is described, and all the signals are applied in a same manner. The pixel unit shown in FIG. 3B or FIG. 3C may implement photoelectric conversion by using the 3T-APS, to further implement generation and readout of a signal and a reset operation of the pixel unit.

Figure 3D:
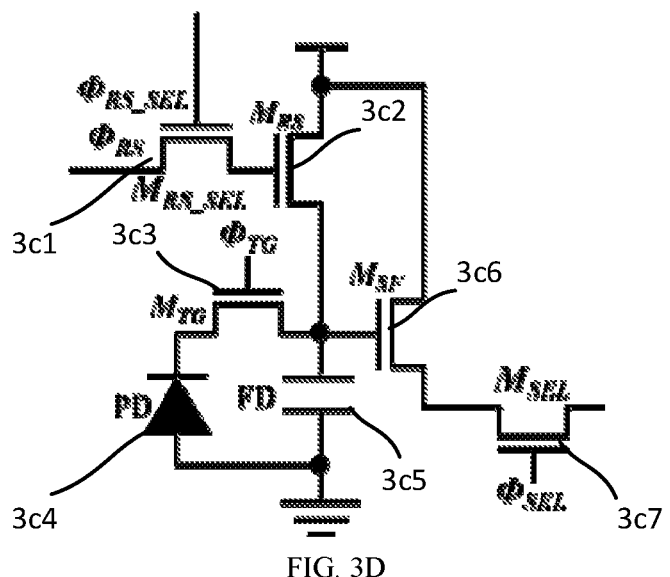
FIG. 3D is a schematic diagram of a structure of another specific circuit implementation of a pixel unit according to an embodiment of the present disclosure.

FIG. 3D is a schematic diagram of a structure of another specific circuit implementation of a pixel unit according to an embodiment of the present disclosure. In an example, the reset signal receiving circuit 301 includes a first transistor 3$c$1, a second transistor 3$c$2, and a fifth transistor 3$c$3. The photosensitive integration circuit 302 includes a PD 3$c$4 and a capacitor (FD) 3$c$5. The electrical signal output circuit 303 includes a third transistor 3$c$6 and a fourth transistor 3$c$7. The first transistor 3$c$1, the second transistor 3$c$2, the third transistor 3$c$6, the fourth transistor 3$c$7, and the fifth transistor 3$c$3 are respectively $M_{RS\text{-}SEL}$, $M_{RS}$, $M_{SF}$, $M_{SEL}$, and $M_{TG}$.

A grid of the $M_{RS\text{-}SEL}$ is the first reset switch and receives the row reset signal, a source is the second reset switch and receives the reset signal, and a drain is connected to a grid of the $M_{RS}$. A drain of the $M_{RS}$ is connected to a high-level voltage signal, and a source is connected to a drain of the $M_{TG}$. A source of the $M_{TG}$ is connected to an output end of the PD, an input end of the PD is connected to the ground and connected to one end of the FD, and the other end of the FD is connected to the source of the $M_{RS}$ and a grid of the $M_{SF}$. A source of the $M_{SF}$ is connected to a drain of the $M_{SEL}$, and a drain of the $M_{SF}$ is connected to the drain of the $M_{RS}$. A source of the $M_{SEL}$ outputs the electrical signal, and a grid receives the row readout signal.

In an example, before the grid of the $M_{RS\text{-}SEL}$ receives the row reset signal and the source receives the reset signal, a grid of the $M_{TG}$ receives a high-level voltage signal, so that the PD transfers to the FD an electrical signal generated from an optical signal.

In the example shown in FIG. 3D, the pixel unit is implemented by a 4T-APS. In a circuit of the 4T-APS, the $M_{TG}$ is disposed between the PD and the FD, to control connection and disconnection between the PD and the FD. In this example, photoelectric conversion may be implemented by using the 4T-APS, to further implement generation and readout of a signal and a reset operation of the pixel unit.

In this embodiment of the present disclosure, locations and quantities of pixel units controlled by the pixel subarray readout feedback circuits 204 are different. Specifically, there may be different circuit implementation structures.

Figure 4A:
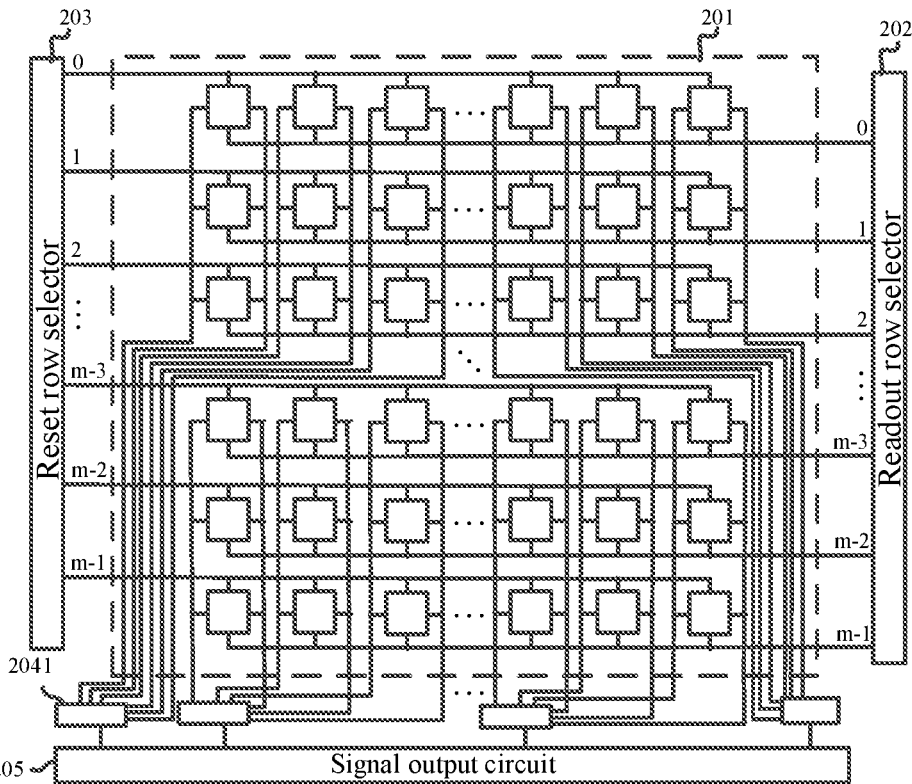
FIG. 4A is a schematic diagram of an example of a signal readout circuit according to an embodiment of the present disclosure.

In an example, FIG. 4A is a schematic diagram of an example of a signal readout circuit according to an embodiment of the present disclosure. The pixel array is divided into different regions. pixel units included in each region are set as a pixel subarray. Region readout feedback circuits 2041 are disposed for different regions. The region readout feedback circuit 2041 generates a reset signal and an output signal for the pixel units in the pixel subarray. Specifically, the pixel subarray readout feedback circuit 204 includes the region readout feedback circuit 2041. The region readout feedback circuit 2041 is electrically connected to pixel units in a specified region in the pixel array 201. A quantity of columns of the pixel units in the specified region is at least one and is less than or equal to a quantity of columns of pixel units in the pixel array 201. A quantity of rows of the pixel units in the specified region is less than or equal to a quantity of rows of the pixel units in the pixel array 201.

A size of the pixel subarray is not limited. For example, the pixel subarray may be a pixel subarray including 3*3 pixel units, or may be a pixel subarray including a plurality of columns and at least one row of pixel units.

Herein, when there is only one column of pixel units in the pixel subarray (in this case, a quantity of rows of the pixel units in the pixel subarray is less than the quantity of rows of the pixel units in the pixel array), the region readout feedback circuit 2041 is electrically connected to a corresponding column of pixel units, and is configured to receive the electrical signal transmitted by the first pixel unit, and send the reset signal to the first pixel unit.

Alternatively, when there are a plurality of columns of pixel units in the pixel subarray (in this case, a quantity of rows of the pixel units in the pixel subarray is less than or equal to the quantity of rows of the pixel units in the pixel array, and when a quantity of columns of the pixel units in the pixel subarray is equal to the quantity of columns of the pixel units in the pixel array, the quantity of rows of the pixel units in the pixel subarray is less than the quantity of rows of the pixel units in the pixel array), the region readout feedback circuit 2041 is electrically connected to a plurality of corresponding columns of pixel units, and is configured to receive an electrical signal sent by a second pixel unit in a column different from a column of the first pixel unit, send the reset signal to the first pixel unit at a first moment, and send the reset signal to the second pixel unit at a second moment.

Figure 4B:
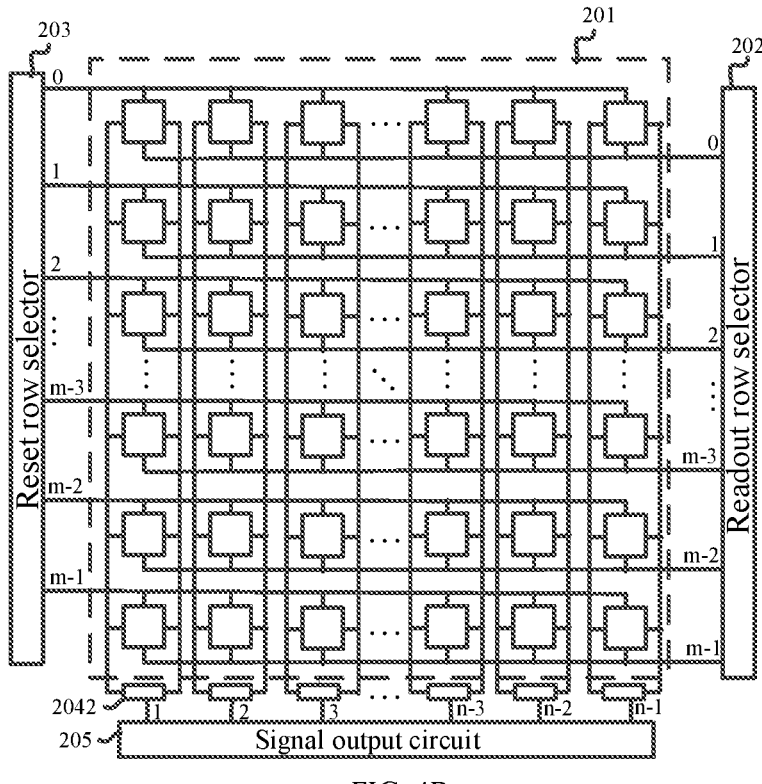
FIG. 4B is a schematic diagram of another example of a signal readout circuit according to an embodiment of the present disclosure.

In another example, FIG. 4B is a schematic diagram of an example of a signal readout circuit according to an embodiment of the present disclosure. The pixel array is divided into different columns. A column-level readout feedback circuit 2042 is disposed for controlling at least one column of pixel units. The column-level readout feedback circuit 2042 generates a reset signal and an output signal for different lines of pixel units in the controlled column.

Specifically, the pixel subarray readout feedback circuit 204 includes the column-level readout feedback circuit 2042. The column-level readout feedback circuit 2042 is electrically connected to at least one specified column of pixel units in the pixel array 201. A quantity of rows of the pixel units in the specified column is less than or equal to a quantity of rows of pixel units in the pixel array 201.

In an example, one column-level readout feedback circuit 2042 may be disposed for each column of pixel units in the pixel array 201 of the circuit, to implement one-to-one correspondence. Certainly, a plurality of columns of pixel units may alternatively correspond to one column-level readout feedback circuit 2042, to implement a multiple-to-one relationship, so that the plurality of columns of pixel units share one corresponding column-level readout feedback circuit 2042. In this way, a circuit area of the pulse sequence image sensor can be further reduced. Specifically, the column-level readout feedback circuit 2042 is electrically connected to a corresponding column of pixel units, and is configured to receive the electrical signal transmitted by the first pixel unit in the corresponding column of pixel units, and send the reset signal to the first pixel unit. Alternatively, the column-level readout feedback circuit 2042 is electrically connected to a plurality of corresponding columns of pixel units, and is configured to receive an electrical signal sent by a second pixel unit in a column different from a column of the first pixel unit, send the reset signal to the first pixel unit at a first moment, and send the reset signal to the second pixel unit at a second moment.

Figure 4C:
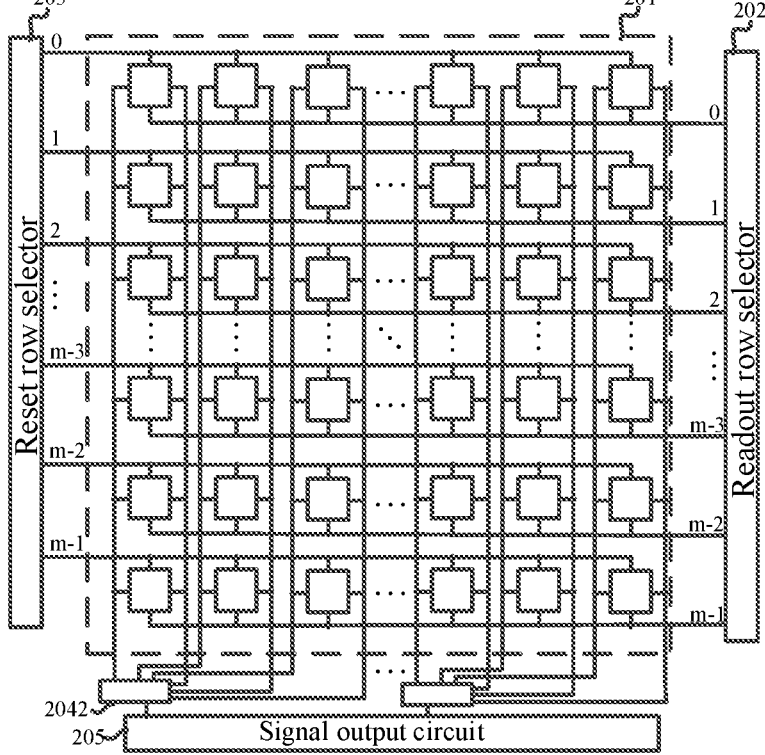
FIG. 4C is a schematic diagram of a structure of another example of a signal readout circuit according to an embodiment of the present disclosure.

FIG. 4C is a schematic diagram of a structure of another example of a signal readout circuit according to an embodiment of the present disclosure. It can be learned from FIG. 4C that a plurality of columns of pixel units in the pixel array 201 of the circuit correspond to one column-level readout feedback circuit 2042. In this case, at different moments, the column-level readout feedback circuit 2042 interacts with different corresponding columns of pixel units, to receive an electrical signal and feed back a reset signal. For example, when three columns of pixel units are electrically connected to one column-level readout feedback circuit 2042, a first column of pixel units interact with the column-level readout feedback circuit 2042 at a first moment such as the first third of a frame cycle, a second column of pixel units interact with the column-level readout feedback circuit 2042 at a second moment such as the middle third of the frame cycle, and a third column of pixel units interact with the column-level readout feedback circuit 2042 at a third moment such as the last third of the frame cycle.

In an example, when the region readout feedback circuit 2041 in the circuit structure is connected to a plurality of different columns of pixel units in the specified region, the region readout feedback circuit 2041 interacts with the different columns of pixel units in the specified region in a time division multiplexing manner, to feed a reset signal back to the different columns of pixel units in the specified region at different moments.

Figure 5A:
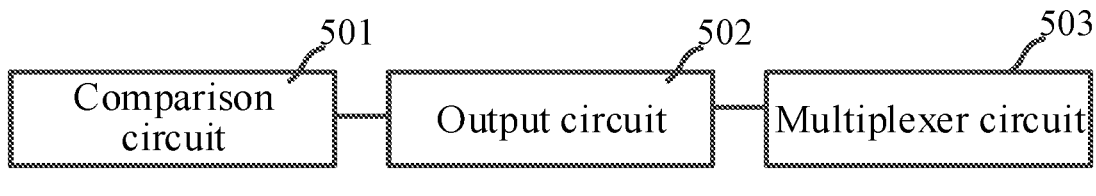
FIG. 5A is a schematic diagram of a structure of a column-level readout feedback circuit according to an embodiment of the present disclosure.

FIG. 5A is a schematic diagram of a structure of a column-level readout feedback circuit according to an embodiment of the present disclosure. As shown in the figure, the column-level readout feedback circuit 2042 includes a comparison circuit 501, an output circuit 502, and a multiplexer circuit 503.

The comparison circuit 501 is configured to receive the electrical signal from the first pixel unit, compare the electrical signal with a threshold signal, and in response to determining that the signal generation condition is met, obtain a comparison result including the output signal and the reset signal, and output the comparison result to the output circuit 502.

The output circuit 502 is configured to latch the comparison result of the first pixel unit, output the reset signal in the comparison result to the multiplexer circuit 503, and output the comparison result.

In some embodiments, the comparison result may be output by using the signal output circuit 205. It should be understood that the signal output circuit 205 is not necessary, and may be omitted in some embodiments.

The multiplexer circuit 503 is configured to select a link (for example, a link electrically connected) to the first pixel unit, and send the reset signal to the first pixel unit over the link.

Figure 5B:
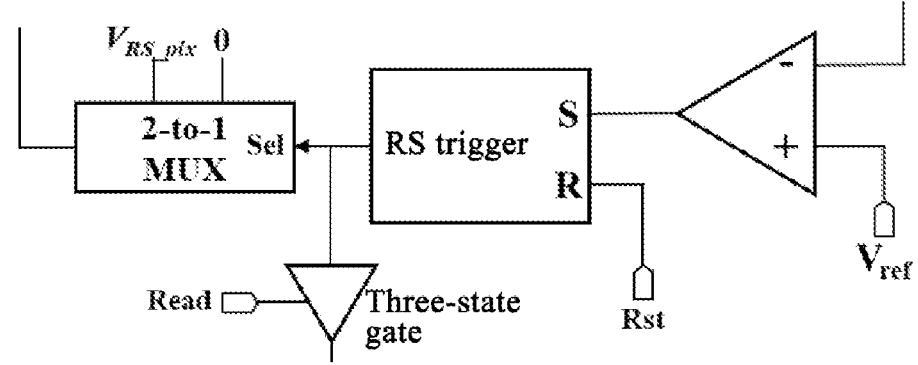
FIG. 5B is a schematic diagram of a structure of a specific implementation of a column-level readout feedback circuit according to an embodiment of the present disclosure.

In an example, a specific structure of the region readout feedback circuit 2041 is the same as a structure of the column-level readout feedback circuit 2042 described in FIG. 5A, and is also the same as a specific implementation structure of the column-level readout feedback circuit 2042 described in FIG. 5B below. Details are not described herein again.

In an example, in the column-level readout feedback circuit 2042, the comparison circuit 501 is implemented by a comparator, the output circuit 502 is implemented by an RS trigger and a three-state gate device, and the multiplexer circuit 503 is implemented by a multiplexer (MUX). FIG. 5B is a schematic diagram of a structure of a specific implementation of a column-level readout feedback circuit according to an embodiment of the present disclosure. The comparison circuit 501 includes a comparator. The output circuit 502 includes an RS trigger and a three-state gate device. The multiplexer circuit includes a MUX.

One input end of the comparator receives the electrical signal transmitted by the first pixel unit, and the other input end receives the threshold signal. After the comparator compares the electrical signal with the threshold signal, the comparison result is obtained.

The comparator outputs the comparison result to an end S of the RS trigger. An end R of the RS trigger is used as a reset end. An output of the RS trigger is separately connected to an input end of the MUX and an input end of the three-state gate device, and sends the reset signal in the comparison result to the MUX and sends the signal in the comparison result to the three-state gate device.

The MUX determines whether the reset signal in the comparison result is effective, and when determining that the reset signal is effective, sends the reset signal to the first pixel unit over the link.

When a resistance-state end of the three-state gate device is set to a low-level voltage, an output end outputs the signal to the signal output circuit 205. When the resistance-state end of the three-state gate device is set to a high-level voltage, the comparison result in the comparator is latched.

In the foregoing example, the three-state gate device is included between the RS trigger and the signal output circuit 205. The RS trigger transmits the signal to the signal output circuit 205 by using the three-state gate device. When the signal output circuit needs to be protected or the signal is not output, an end e of the three-state gate device is set to a high-resistance state, so that the RS trigger is disconnected from the signal output circuit.

In this embodiment of the present disclosure, the comparator may alternatively use a multi-bit analog-to-digital converter (ADC). In this case, the obtained comparison result is multi-bit data rather than merely "0" or "1" (0 represents an ineffective reset signal, indicating that a second reset switch in a corresponding pixel unit cannot be turned on and therefore the corresponding pixel unit cannot reset, that is, a signal and reset signal generation condition is not met). The RS trigger determines whether the reset signal is greater than a specified reset threshold before sending the reset signal to the MUX.

In an example, the RS trigger may be replaced with a D trigger. This is not limited herein.

When the signal readout circuit is used to output a signal, a row of pixel units in the pixel array are selected. After a signal of the selected pixel units is read out, a next row of pixel units in the pixel array are selected, and a signal of the next selected row of pixel units is read out. After polling of each row of pixel units in the pixel units is performed in this manner, an obtained signal of the pixel array is used to subsequently detect or reconstruct an image. In this process, to ensure that a signal of each pixel unit in the pixel array can be read out without disorder, a sending time interval of row readout signals between rows in the pixel array needs to be greater than reset time of each row of pixel units. In other words, the pixel subarray readout feedback circuit receives an electrical signal read by the selected row of pixel units, compares the electrical signal with a specified threshold for determination, determines, based on a determination result, whether to reset the row of pixel units and whether to send a reset signal, and after the row of pixel units reset based on the received reset signal, sends a row readout signal to the row of pixel units next to the selected row. Reset time of each pixel unit is far greater than time for readout of an electrical signal. When electrical signals of the pixel units in the pixel array are read out in a polling manner, a last row of pixel units need to complete a reset operation. In this case, a readout rate of the electrical signal is greatly reduced, causing a lower signal readout speed of each pixel unit of the pixel array, and not facilitating high-speed obtaining of the signal.

Based on this, the main cause of the lower signal readout speed of each pixel unit of the entire pixel array is as follows: When an electrical signal of each row of pixel units is read out, reset time of the row of pixel units needs to be consumed to reset the row of pixel units. Therefore, the sending time interval of the row readout signals between rows in the pixel array needs to be greater than the reset time of the pixel units. The reset time of the row of pixel units needs to be consumed because the pixel subarray readout feedback circuit is connected to a plurality of rows of pixel units. If the reset time of the current row of pixel units is not consumed, the current row of pixel units cannot stably reset. As a result, a final output signal of the pixel subarray readout feedback circuit finally causes a subsequent failure of imaging or detection due to the disordered or unstable situation of the row of pixel units.

To relieve, alleviate, or eliminate the foregoing problems, an internal structure of the pixel units in the pixel array of the signal readout circuit is modified in this embodiment of the present disclosure. A reset signal latch module is added to latch the reset signal fed back by the pixel subarray readout feedback circuit. The latched reset signal is used to reset the pixel units. An interval of signal readout control instructions between rows in the pixel array is set to be less than the reset time of the pixel units. According to the technical solution provided in this embodiment of the present disclosure, after a previous row of pixel units are gated by using a row readout signal and output an electrical signal, a row readout signal is sent to a current row of pixel units, to read out an electrical signal of the current row of pixel units. A row readout signal can be sent to a current row of pixel units, and there is no need to wait until a previous row of pixel units complete a reset operation. Therefore, a signal of a current row of pixel units can be output before the end of an entire reset process of a previous row of pixel units. In this way, a signal readout speed is increased.

Figure 6A:
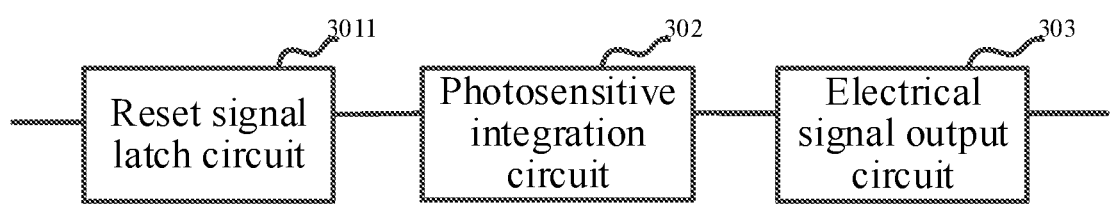
FIG. 6A is a schematic diagram of a structure of another specific circuit implementation of a pixel unit according to an embodiment of the present disclosure.

FIG. 6A is a schematic diagram of a structure of another specific circuit implementation of a pixel unit according to an embodiment of the present disclosure. According to the signal readout circuit described in FIG. 1, the reset signal receiving circuit 301 includes a reset signal latch circuit 3011. The reset signal latch circuit 3011 is configured to receive the reset signal from the corresponding pixel subarray readout feedback circuit 204, latch the reset signal in response to the row reset signal, and reset the photosensitive integration circuit 302 in an effective duration of the row reset signal. The electrical signal output circuit 303 is configured to: in response to the row readout signal, output the electrical signal to the corresponding pixel subarray readout feedback circuit 204, to cause the corresponding pixel subarray readout feedback circuit 204 to compare the electrical signal with a threshold, and based on a comparison result, (i) generate the reset signal and feed the reset signal back to the reset signal latch circuit 3011, and (ii) generate the output signal for output.

In an example, the photosensitive integration circuit 302 is generally implemented by a photodiode (PD). The reset signal latch circuit 3011 is implemented by a D trigger. The electrical signal output circuit 303 is implemented by cascading a plurality of transistors.

Herein, the electrical signal is a voltage signal or a current signal. This is not limited herein.

Figure 6B:
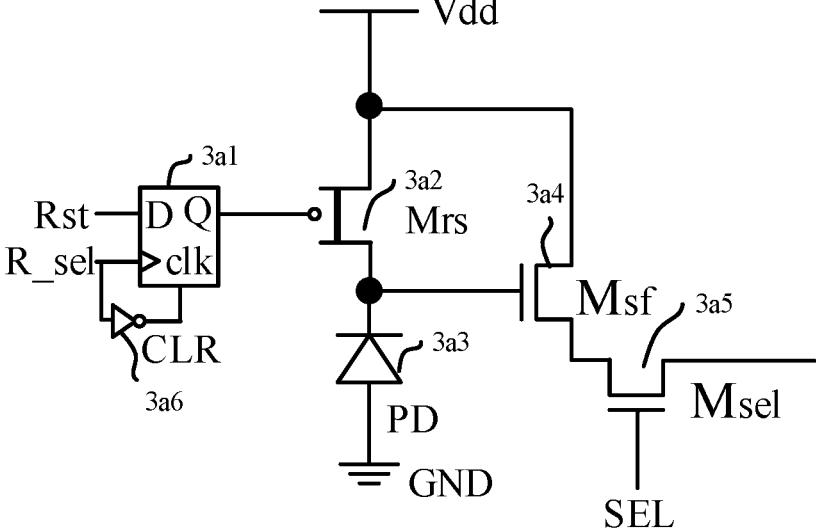
FIG. 6B is a schematic diagram of a structure of another specific circuit implementation of a pixel unit according to an embodiment of the present disclosure.

FIG. 6B is a schematic diagram of a structure of another specific circuit implementation of a pixel unit according to an embodiment of the present disclosure. In an example, the reset signal latch circuit 301 includes a D trigger 3a1 and a second transistor 3a2. The photosensitive integration circuit 302 includes a PD 3a3. The electrical signal output circuit 303 includes a third transistor 3a4 and a fourth transistor 3a5. The pixel unit further includes an inverter 3a6.

In an example, the second transistor 3a2 is Mrs3a2, the third transistor 3a4 is Msf3a4, and the fourth transistor is Msel3a5. Vdd is a power supply end, GND is a device substrate voltage 0V. In a reset process of the PD 3a3, the PD 3a3 resets by using the gated Mrs3a2. After reset is completed, the Mrs3a2 is turned off, the PD 3a3 starts exposure and converts a collected optical signal into an electrical signal, and a voltage of the PD 3a3 drops. A row readout signal SEL is received to gate the Msel3a5, and the Msf3a4 reads the electrical signal from the PD 3a3. In this embodiment, the Msf3a4 is configured to read the electrical signal from the PD 3a3 in a gated state, and therefore the Msf3a4 can read an electrical signal from the PD 3a3 at any necessary moment.

One input end of the D trigger 3a1 receives the row reset signal (R_sel), an end D receives the reset signal (Rst), and an end Q outputs the reset signal when the D trigger 3a1 is turned on.

The end Q of the D trigger 3a1 is connected to a grid of the Mrs3a2. When the reset signal output by the end Q is effective, the Mrs3a2 is turned off, so that the PD 3a3 resets. A drain of the Mrs3a2 is connected to a high-level voltage signal (Vdd), and a source is connected to an output end of the PD 3a3. An input end of the PD 3a3 is connected to the ground (GND). A grid of the Msf3a4 is connected to the output end of the PD 3a3, a drain is connected to the drain of the Mrs3a2, and a source is connected to a drain of the Msel3a5. A source of the Msel3a5 outputs an electrical signal, and a grid receives the SEL.

In an example, the signal SEL applied to the fourth transistor 3a5 is a row readout signal, and the electrical signal on the PD 3a3 is transferred to a column output line of the array. The R_sel applied to the D trigger 3a1 is a row reset signal, the signal Rst is a reset signal, and the two signals are used to jointly control a reset operation of the PD 3a3.

In an example, the D trigger 3a1 latches the reset signal received from the end D. Before a clock (CLR) signal in a clock interface of the D trigger 3a1 arrives, the signal Rst sent when a rising edge of the signal R_sel arrives is used to determine whether to reset the PD.

The D trigger 3a1 is a D trigger for latching and controlling the reset signal. When the rising edge of the signal R_sel arrives, the signal Rst is sent to the D trigger to be latched. The end Q keeps outputting the reset signal. When a rising edge of the CLR signal arrives, the end Q resets, and the Mrs3a2 is turned on, so that the PD 3a3 stops resetting. The electrical signal is raised to Vdd. Therefore, one reset process is completed.

To reduce complexity of a peripheral circuit and minimize a quantity of control connection lines of the pixel units, in the pixel unit, the clock interface of the D trigger 3a1 and the input end for receiving the signal R_sel are connected to each other through the inverter 3a6. When the signal R_sel is changed from a high level to a low level and the rising edge of the signal CLR arrives, the end Q resets.

Figure 7:
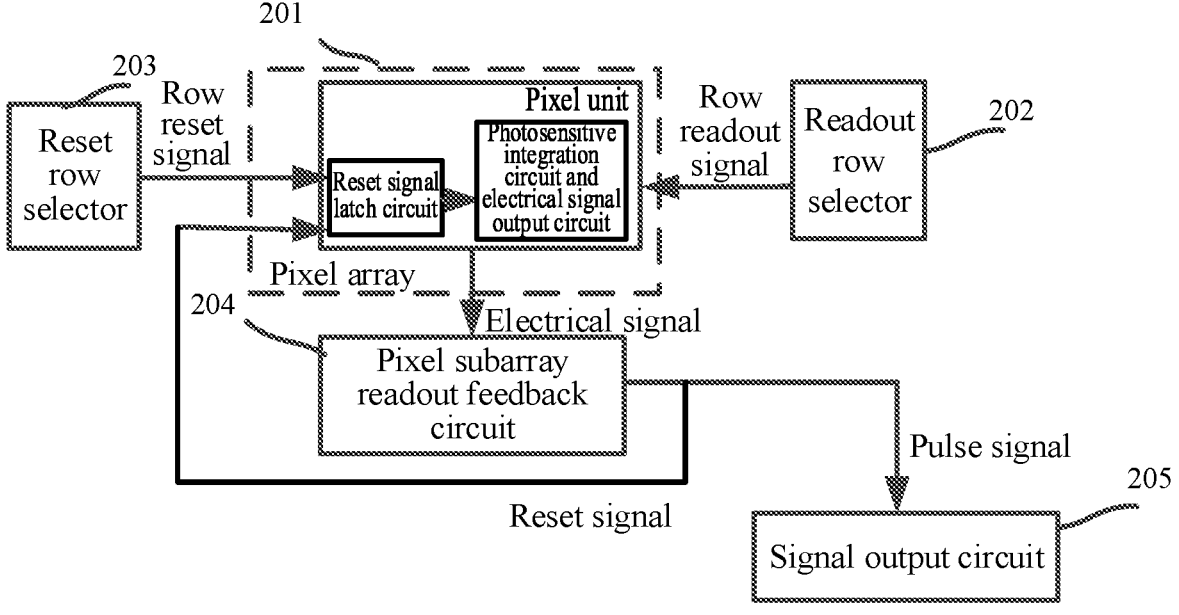
FIG. 7 is a schematic diagram of another overall structure of a signal readout circuit according to an embodiment of the present disclosure.

FIG. 7 is a schematic diagram of another overall structure of a signal readout circuit according to an embodiment of the present disclosure. As shown in the figure, the signal readout circuit includes a pixel array 201, a readout row selector 202, a reset row selector 203, at least one pixel subarray readout feedback circuit 204, and a signal output circuit 205.

The readout row selector 202 transmits a row readout signal to a selected row of pixel units in the pixel array 201, to gate the row of pixel units.

The reset row selector 203 sends a row reset signal to the row of pixel units, to gate first reset switches of the row of pixel units.

The pixel array 201 includes a plurality of pixel units arranged in at least one row. The pixel array 201 includes at least one pixel subarray. Each pixel subarray includes partial pixel units in the pixel array 201. A first pixel unit in a gated row in a first pixel subarray outputs an electrical signal to a connected pixel subarray readout feedback circuit 204, where the electrical signal is converted from an optical signal. The first pixel unit receives a reset signal sent by the connected pixel subarray readout feedback circuit 204, latches the reset signal in response to the row reset signal sent by the reset row selector 203, and gates a first reset switch of the first pixel unit by using the latched reset signal to perform a reset operation in an effective duration of the row reset signal.

The pixel subarray readout feedback circuit 204 is electrically connected to pixel units in the first pixel subarray, receives the electrical signal transmitted by the first pixel unit, and when determining based on the electrical signal that a signal generation condition is met, generates the reset signal and sends the reset signal to the first pixel unit, and generates the signal and sends the signal to the signal output circuit 205. It should be understood that the signal output circuit 205 is not necessary, and may be omitted in some embodiments.

The signal output circuit 205 outputs the signal in response to a received signal readout control instruction.

In FIG. 7, the first reset signal can be latched in the first pixel unit in an entire reset process of the first pixel unit, and the pixel subarray readout feedback circuit 204 does not need to wait until the first pixel unit resets and then receive an electrical signal of a next connected adjacent row of pixel units. Therefore, a sending interval of row readout signals sent to adjacent rows by the readout row selector 202 may be less than reset time of the first pixel unit. In other words, the sending interval is greater than or equal to a time interval from the pixel subarray readout feedback circuit 204 receiving the electrical signal sent by the first pixel unit to sending the reset signal to the first pixel unit.

It can be learned from FIG. 7 that a reset signal latch circuit is disposed in the first pixel unit and latches a reset signal. FIG. 7 shows a signal transmission process. The readout row selector 202 sends a row readout signal to the first pixel unit, and sends an electrical signal to the cascaded pixel subarray readout feedback circuit 204, where the electrical signal is converted from an optical signal in the first pixel unit. After a comparator in the pixel subarray readout feedback circuit 204 performs comparison, one part of an obtained comparison result is fed back to the first pixel unit, and is latched as a reset signal in the reset signal latch circuit 301 when a rising edge of a row reset signal sent by the reset row selector 203 arrives, and whether reset is performed is determined based on the reset signal when the rising edge of the row reset signal arrives; and the other part of the comparison result is output by using the signal output circuit 205.

It can be learned from FIG. 7 that the first pixel unit resets based on the reset signal generated from the comparison result fed back by the pixel subarray readout feedback circuit 204, and correspondingly the pixel subarray readout feedback circuit 204 outputs the signal based on the comparison result. The output of the signal and the reset of the first pixel unit are asynchronously implemented without mutual interference. The reset signal received by the first pixel unit is not generated when the pixel subarray readout feedback circuit 204 outputs the signal.

In the circuit shown in FIG. 7, the pixel array 201 includes at least one row of a plurality of pixel units arranged in rows and columns. The pixel units may be m*n pixel units, namely, m rows and n columns of pixel units, where m and n are natural numbers.

It can be learned from FIG. 1 that emission time of a pulse signal of each pixel unit is determined by a comparator based on a threshold $Q_{ref}$. In other words, an emission frequency of the pulse signal of each pixel unit is determined by the comparator in each pixel unit based on the threshold $Q_{ref}$. However, for each pixel unit in the pixel array, the threshold $Q_{ref}$ is preset and cannot be adjusted. The threshold $Q_{ref}$ of each pixel unit in the pixel array is set to a same value. As a result, no matter whether a current light intensity of the pixel unit is high or low, the threshold $Q_{ref}$ of the pulse signal of the pixel unit is preset and the same. However, for the entire pixel array, when an image is recorded, intensities of light received by regions are not the same, causing uneven brightness. Different pixel units correspond to different light intensities. If the unified threshold $Q_{ref}$ is used as a basis to determine whether to generate a pulse signal, a pixel unit that receives a low intensity of light needs to take a long time to generate a pulse signal for imaging, causing a small dynamic image range. Because the fixed threshold $Q_{ref}$ is used and a photo-generated current I is excessively large and causes an excessively small sampling interval, a pixel that receives a high intensity of light excessively emits a pulse signal, and excessively consumes and occupies resources of a pulse sequence image sensor.

To relieve, alleviate, or eliminate the foregoing problems, in the circuit in this embodiment of the present invention, for a corresponding pixel unit in the pixel array, information of a signal that can reflect an intensity of light currently received by the pixel unit is obtained through statistics within a time interval. A threshold electrical signal that reflects current light intensity information of the pixel unit is determined based on a preset threshold electrical signal generation policy and the information that is of the signal of the pixel unit and that is obtained within the time interval. A subsequent signal emission frequency of the pixel unit is controlled based on the threshold electrical signal of the pixel unit.

In this way, the threshold electrical signal of the corresponding pixel unit for controlling a signal generation frequency is selected to provide different emission frequencies, so that a signal emission frequency of the pixel unit that currently receives a high intensity of light is decreased, and a signal emission frequency of the pixel unit that currently receives a low intensity of light is increased. Therefore, the signal emission frequency of the pixel unit in the pixel array can be flexibly controlled, a dynamic imaging range of the image sensor is enlarged, and consumption of resources of the image sensor is reduced.

The signal in this embodiment of the present disclosure carries a digital signal or an analog signal that can represent a photocurrent physical quantity, and may, for example, be a pulse signal, a level signal, a value with a limit, or the like. This is not limited herein. Correspondingly, the signal for reflecting an intensity of light currently received by the pixel unit includes a pulse signal, a level signal, a value with a limit, or the like. This is not limited herein.

Figure 8:
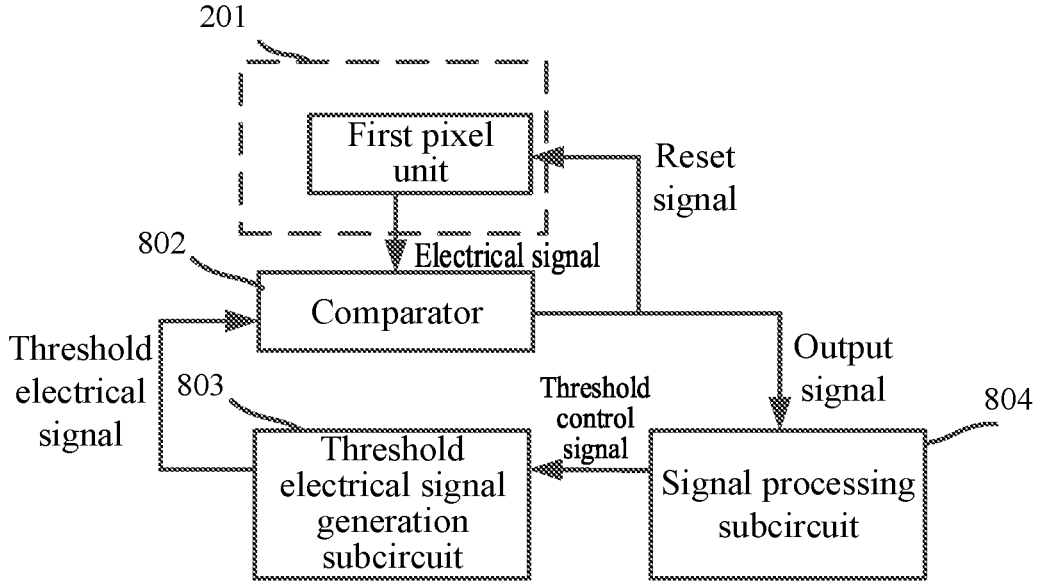
FIG. 8 is a schematic diagram of another overall structure of a signal readout circuit according to an embodiment of the present disclosure.

FIG. 8 is another schematic circuit diagram of a pixel unit according to an embodiment of the present disclosure. As shown in the figure, the corresponding pixel subarray readout feedback circuit includes a comparator 802, a threshold electrical signal generation subcircuit 803, and a signal processing subcircuit 804.

The comparator 802 is configured to receive the electrical signal sent by the first pixel unit in the pixel array 201, obtain a threshold electrical signal of the first pixel unit from the threshold electrical signal generation subcircuit 803, and in response to determining that the electrical signal is greater than the threshold electrical signal of the first pixel unit, generate the output signal and send the output signal to the signal processing subcircuit 804.

The signal processing subcircuit 804 is configured to perform statistics on information of the output signal within a time interval, generate, based on the threshold electrical signal generation policy and the information of the output signal obtained within the time interval, a threshold control signal for selecting the threshold electrical signal of the first pixel unit, and send the threshold control signal to the threshold electrical signal generation subcircuit 803. In some embodiments, the output signal may be further output.

The threshold electrical signal generation subcircuit 803 is configured to: based on the received threshold control signal, obtain the threshold electrical signal of the first pixel unit, and send the threshold electrical signal to the comparator 802.

In the foregoing circuit, the signal includes a pulse signal, a level signal, or a value with a limit.

The signal processing subcircuit includes a pulse signal processing subcircuit, a level signal processing subcircuit, or a value-with-limit processing subcircuit.

An example in which the signal is the pulse signal is described in detail.

In the foregoing circuit, the comparator 802 may be a comparison module, a comparison unit, or the like. The signal processing subcircuit 804 may be a signal processing module, a signal processing unit, or the like. The threshold electrical signal generation subcircuit 803 may be a threshold electrical signal generation module, a threshold electrical signal generation unit, or the like. This is not limited herein. The comparator 802, the signal processing subcircuit 804, and the threshold electrical signal generation subcircuit 803 are described above as examples.

In the foregoing circuit, the information that is of the signal of the first pixel unit and that is obtained through statistics by the signal processing subcircuit 804 may be a quantity of signals counted within a preset time period, an average interval between signals, or a minimum interval between signals, all of which can reflect information of a current light intensity of the first pixel unit.

In the foregoing circuit, the comparator 802 is further configured to: when determining that the electrical signal is greater than the threshold electrical signal of the first pixel unit, generate a reset signal and send the reset signal to the first pixel unit. In this way, the first pixel unit can reset.

In the foregoing circuit, signal emission time of the pixel unit in the pixel array 201 is controlled based on the reset signal. The first pixel unit in the pixel array 201 converts an optical signal into an electrical signal, receives a row readout signal from the readout row selector 202, and sends the electrical signal to the comparator 802. The first pixel unit gates a first reset switch of the first pixel unit based on the reset signal sent by the comparator 802, and receives a row reset signal from the reset row selector 203 to gate a second reset switch of the first pixel unit, to perform reset. The signal output circuit 205 is configured to receive the signal from the signal processing subcircuit 804, and output the signal.

Herein, the signal output circuit 205 includes a pulse signal output subcircuit, a level signal output subcircuit, or a value-with-limit output subcircuit. This is not limited herein.

In the foregoing circuit, the readout row selector 202 transmits a row readout signal to a selected row of pixel units in the pixel array 201, to gate the row of pixel units in the pixel array 201. The reset row selector 203 sends a row reset signal to the row of pixel units, to gate the second reset switch of the first pixel unit in the gated row of pixel units. The signal output circuit 205 is configured to receive the signal from the signal processing subcircuit 804, and output the signal.

In the foregoing circuit, the pixel array 201 includes at least one row of a plurality of pixel units arranged in rows and columns. The pixel units may be m*n pixel units, namely, m rows and n columns of pixel units, where m and n are natural numbers.

In the foregoing circuit, the pixel array 201 is implemented by a chip circuit. The readout row selector 202, the reset row selector 203, and the signal output circuit 205 are implemented by a board-level circuit, for example, an FPGA, on a periphery of the chip circuit.

During specific implementation, different circuit structures are implemented based on different locations of the comparator 802, the threshold electrical signal generation subcircuit 803, and the signal processing subcircuit 804 in the circuit.

In an example, the comparator 802 for at least one column of different pixel units in the pixel array is implemented in a column-level readout feedback subcircuit 2043. The column-level readout feedback subcircuit 2043 is disposed in the board-level circuit. The threshold electrical signal generation subcircuit 803 and the signal processing subcircuit 804 are implemented in the board-level circuit. The threshold electrical signal generation subcircuit 803 may be integrated in the column-level readout feedback subcircuit 2043, or located outside the column-level readout feedback subcircuit 2043. The signal processing subcircuit 804 is located outside the column-level readout feedback subcircuit 2043.

Herein, the column-level readout feedback subcircuit 2043 may be a column-level readout feedback circuit or a column-level readout feedback module. This is not limited herein. In this embodiment of the present disclosure, the column-level readout feedback subcircuit 2043 is described in detail as an example.

In another example, the comparator 802 is integrated in each pixel unit of the pixel array 201. The threshold electrical signal generation subcircuit 803 is located in each pixel unit of the pixel array 201, or implemented in the board-level circuit. The signal processing subcircuit 804 is implemented in the board-level circuit.

In the foregoing circuit, the threshold electrical signal that is of the first pixel unit and that is generated by the threshold electrical signal generation subcircuit 803 is specifically a threshold voltage signal. In this case, the comparator 802 compares a voltage signal of the first pixel unit with the threshold voltage signal.

The different circuit structures in the foregoing examples are described in detail below.

First Example Circuit Structure

Figure 9:
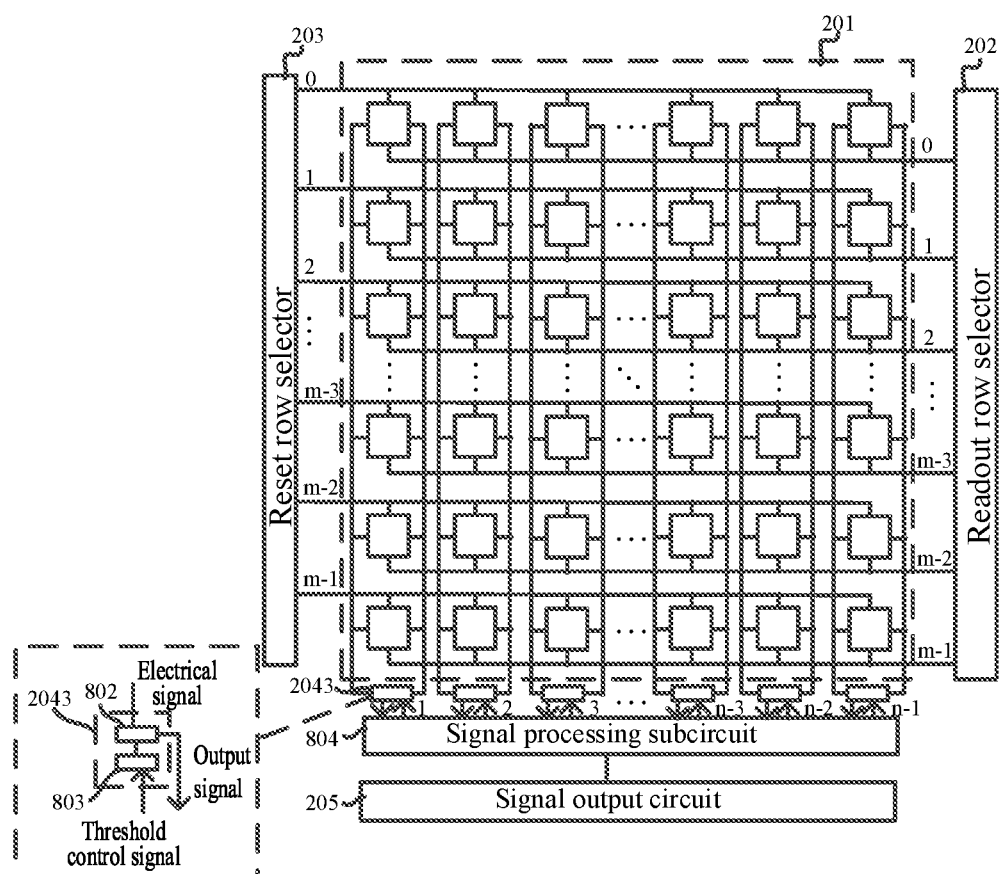
FIG. 9 is a schematic diagram of another example of a signal readout circuit according to an embodiment of the present disclosure.
Figure 10:
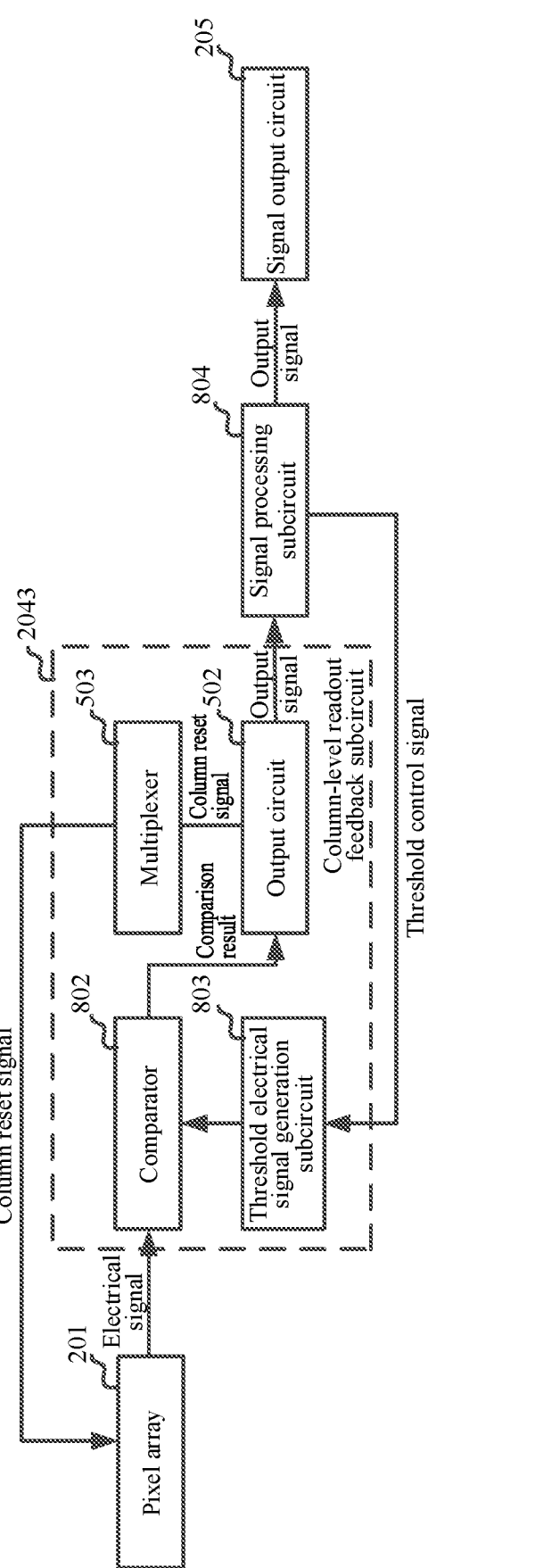
FIG. 10 is a schematic diagram of another overall structure of a signal readout circuit according to an embodiment of the present disclosure.

When the circuit structure is overall described above, the first example circuit structure is described as an example. Specifically, the first example circuit structure is shown in FIG. 9, and includes a pixel array 201, a column-level readout feedback subcircuit 2043, a threshold electrical signal generation subcircuit 803, a signal processing subcircuit 804, and a signal output subcircuit 805. The threshold electrical signal generation subcircuit 803 is disposed in the column-level readout feedback subcircuit 2043.

The pixel array 201 includes a plurality of pixel units arranged in at least one row. A first pixel unit in a gated row of pixel units converts an optical signal into an electrical signal and sends the electrical signal to the column-level readout feedback subcircuit 2043. The first pixel unit gates a first reset switch of the first pixel unit based on a column reset signal sent by the column-level readout feedback subcircuit 2043, and resets when a second reset switch of the first pixel unit is gated.

The column-level readout feedback subcircuit 2043 is electrically connected to at least one column of pixel units in the pixel array 201, and receives the electrical signal transmitted by the first pixel unit. When determining that the electrical signal is greater than the threshold electrical signal of the first pixel unit that is received from the threshold electrical signal generation subcircuit 803, the comparator 802 generates the column reset signal and the signal, sends the column reset signal to the first pixel unit to gate the first reset switch of the first pixel unit, and sends the signal to the signal processing subcircuit 803.

The signal processing subcircuit 804 is connected to the column-level readout feedback subcircuit 2043, and configured to perform statistics on information of the signal of the first pixel unit within a time interval, generate, based on a specified threshold electrical signal generation policy and the information of the signal of the first pixel unit obtained within the time interval, a threshold control signal for selecting the threshold electrical signal of the first pixel unit, feed the threshold control signal back to the threshold electrical signal generation subcircuit 803 in the column-level readout feedback subcircuit 2043, and output the signal of the first pixel unit by using the signal output circuit 205.

In the first example circuit structure, the column-level readout feedback subcircuit 2043 controls reset of at least one column of pixel units, so that the reset signal sent to the first pixel unit is referred to as the column reset signal.

In the first example circuit structure, the comparator 802 is disposed in the column-level readout feedback subcircuit 2043. The column-level readout feedback subcircuit 2043 implements the foregoing functions as follows: When determining that the electrical signal is greater than the threshold electrical signal of the first pixel unit, the comparator 802 generates the column reset signal and the signal, sends the column reset signal to the first pixel unit to gate the first reset switch of the first pixel unit, and sends the signal to the signal processing subcircuit 804.

Herein, the threshold electrical signal generation subcircuit 803 is disposed inside or outside the column-level readout feedback subcircuit 2043. The threshold electrical signal generation subcircuit 803 includes a digital-to-analog converter (DAC) or a multiplexer. The threshold electrical signal generation subcircuit 803 actually includes a plurality of input ends that store different threshold electrical signals. The threshold control signal for selecting the threshold electrical signal of the first pixel unit controls to gate a corresponding input end, and a selected threshold electrical signal is sent as the threshold electrical signal of the first pixel unit to the comparator 802 to be processed.

Herein, the signal processing subcircuit 804 is disposed inside the column-level readout feedback subcircuit 2043, or disposed outside the column-level readout feedback subcircuit 2043. This is not limited herein.

In the first example circuit structure, the column-level readout feedback subcircuit 2043 may be multiplexed in one or more columns of pixel units to compare and generate a signal and a reset signal, so that a circuit area occupied by each pixel unit in the pixel array can be reduced. Given a fixed quantity of pixel units, the circuit can be scaled down, to achieve circuit miniaturization.

FIG. 11 is a schematic diagram of modularization and a signal stream of the first example circuit structure according to an embodiment of the present disclosure. As shown in the figure, the first example circuit structure includes the pixel array 201, the column-level readout feedback subcircuit 2043, the signal processing subcircuit 804, and the signal output subcircuit 205. The column-level readout feedback subcircuit includes the comparator 802, a multiplexer 503, the threshold electrical signal generation subcircuit 803, and an output circuit 502.

In an example, the pixel array 201 is configured to gate the first pixel unit in the gated row of pixel units to convert the optical signal into the electrical signal and send the electrical signal to the column-level readout feedback subcircuit 2043, and is also configured to gate a first reset switch of the first pixel unit based on the column reset signal sent by the column-level readout feedback subcircuit 2043, and reset when the second reset switch of the first pixel unit is gated.

The comparator 802 of the column-level readout feedback subcircuit 2043 is configured to: after receiving the electrical signal and when determining that the electrical signal is greater than the threshold electrical signal of the first pixel unit that is received from the threshold electrical signal generation subcircuit 803, generate the column reset signal and the signal and output the column reset signal and the signal to the output circuit 502. The output circuit 502 sends the column reset signal to the first pixel unit by using the multiplexer 503. The output circuit 502 sends the signal to the signal processing subcircuit 804.

The threshold electrical signal generation subcircuit 803 in the column-level readout feedback subcircuit 2043 is configured to: based on the threshold control signal that is received from the signal processing subcircuit 804 and that is used to select the threshold electrical signal of the first pixel unit, generate the threshold electrical signal of the first pixel unit, and provide the threshold electrical signal to the comparator 802 in the column-level readout feedback subcircuit 2043.

The signal processing subcircuit 804 is configured to perform statistics on information of the signal of the first pixel unit within a time interval, generate, based on a specified threshold electrical signal generation policy and the information of the signal of the first pixel unit obtained within the time interval, the threshold control signal for selecting the threshold electrical signal of the first pixel unit, feed the threshold control signal back to the threshold electrical signal generation subcircuit 803 in the column-level readout feedback subcircuit 2043, and output the signal of the first pixel unit by using the signal output circuit 205.

In the foregoing circuit, the multiplexer 503 may alternatively be a multiplexer circuit or a multiplexer unit. The output circuit 502 may alternatively be an output circuit or an output unit. This is not limited herein. In this embodiment of the present disclosure, the multiplexer 503 or the output circuit 502 is described as an example.

In the first example circuit structure, the signal processing subcircuit 804 may also output the threshold electrical signal of the first pixel unit by using the signal output circuit 205, so that the outside learns of the current threshold electrical signal of the pixel unit in the pixel array.

In the first example circuit structure, as shown in FIG. 9, one column of pixel units in the pixel array 201 of the circuit corresponds to one column-level readout feedback subcircuit 2043. In an example, a plurality of columns of pixel units in the pixel array 201 of the circuit correspond to one column-level readout feedback subcircuit 2043. In this case, at different moments, the column-level readout feedback subcircuit 2043 interacts with different corresponding columns of pixel units, to receive an electrical signal and feed a column reset signal back. For example, when three columns of pixel units are electrically connected to one column-level readout feedback subcircuit 2043, a first column of pixel units interact with the column-level readout feedback subcircuit at a first moment such as the first third of a frame cycle, a second column of pixel units interact with the column-level readout feedback subcircuit at a second moment such as the middle third of the frame cycle, and a third column of pixel units interact with the column-level readout feedback subcircuit at a third moment such as the last third of the frame cycle.

Figure 11A:
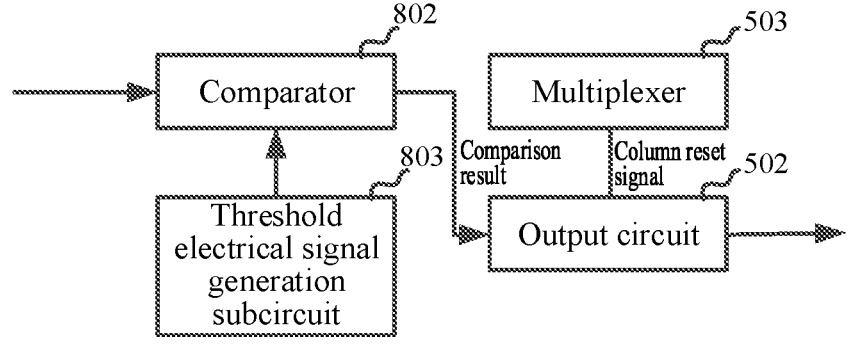
FIG. 11A is a schematic diagram of a partial structure of a signal readout circuit according to an embodiment of the present disclosure.

FIG. 11A is a schematic diagram of a structure of the column-level readout feedback subcircuit in the first example circuit structure according to an embodiment of the present disclosure. As shown in the figure, the column-level readout feedback subcircuit includes the comparator 802, the multiplexer 503, the threshold electrical signal generation subcircuit 803, and the output circuit 502.

The comparator 802 is configured to receive the electrical signal transmitted by the first pixel unit, and when determining that the electrical signal is greater than the threshold electrical signal of the first pixel unit that is received from the threshold electrical signal generation subcircuit 803, generate a comparison result including the column reset signal and the signal of the first pixel unit, and output the comparison result to the output circuit 502.

The output circuit 502 is configured to latch the comparison result of the first pixel unit, output the column reset signal in the comparison result to the multiplexer 503, and send the signal in the comparison result to the signal processing subcircuit 804.

The multiplexer 503 is configured to select a link to the first pixel unit, and send the column reset signal to the first pixel unit over the link.

The threshold electrical signal generation subcircuit 803 is configured to: based on the threshold control signal that is received from the signal processing subcircuit 804 and that is used to select the threshold electrical signal of the first pixel unit, generate the threshold electrical signal of the first pixel unit, and provide the threshold electrical signal to the comparator 802.

In an example, in the column-level readout feedback subcircuit 2043, the comparator 802 is implemented by a comparator, the output circuit 502 is implemented by an RS trigger and a three-state gate device, the multiplexer 503 is implemented by a multiplexer (MUX), and the threshold electrical signal generation subcircuit 803 is implemented by a DAC or a multiplexer.

Figure 11B:
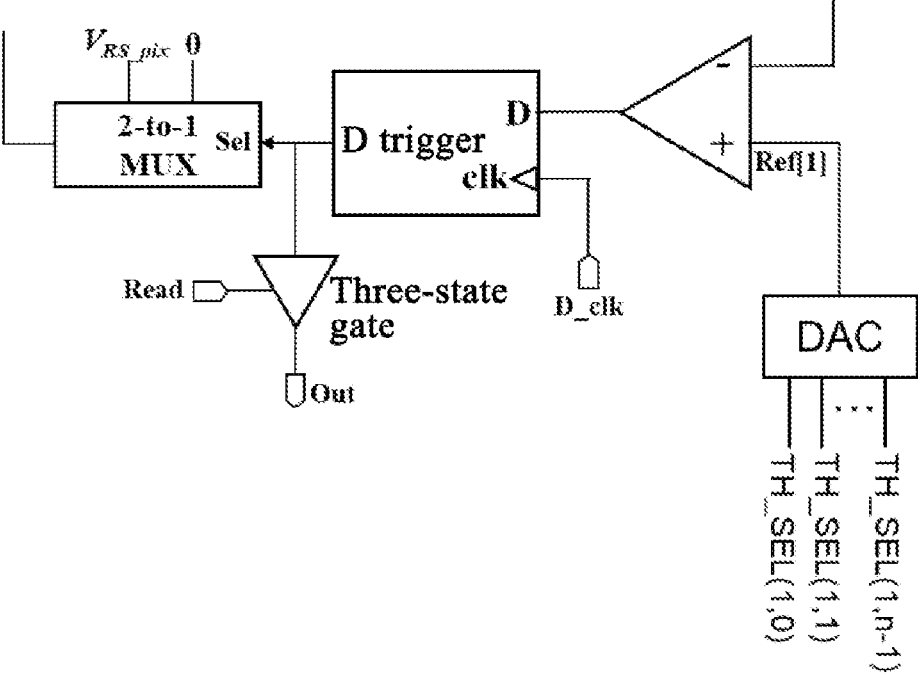
FIG. 11B is a schematic diagram of a structure of another specific circuit implementation of a pixel unit according to an embodiment of the present disclosure.

FIG. 11B is a schematic diagram of a structure of another specific circuit implementation of a pixel unit according to an embodiment of the present disclosure. The comparator 802 includes a comparator. The output circuit 502 includes an RS trigger and a three-state gate device. The multiplexer 503 includes a multiplexer MUX. The threshold electrical signal generation subcircuit 803 includes a DAC.

One input end of the comparator 802 receives the electrical signal transmitted by the first pixel unit, and the other input end is connected to the DAC and receives the threshold electrical signal of the first pixel unit. After the comparator compares the electrical signal with the threshold electrical signal, the comparison result is obtained.

The comparator 802 outputs the comparison result to an end S of the RS trigger. An end R of the RS trigger is used as a reset end. An output of the RS trigger is separately connected to an input end of the MUX and an input end of the three-state gate device, and sends the column reset signal in the comparison result to the MUX and sends the signal in the comparison result to the three-state gate device.

The MUX gates a link to the first pixel unit, and sends the column reset signal to the first pixel unit.

An output end of the DAC is connected to the comparator. A plurality of input ends temporarily store different threshold electrical signals. Based on the threshold control signal for selecting the threshold electrical signal of the first pixel unit, the signal processing subcircuit 804 controls to gate one input end, and a threshold electrical signal temporarily stored in the gated input end is sent as the threshold electrical signal of the first pixel unit to the comparator 802.

When a resistance-state end of the three-state gate device is set to a low-level voltage, an output end outputs the signal to the signal processing subcircuit 804. When the resistance-state end of the three-state gate device is set to a high-level voltage, the comparison result in the comparator 802 is latched.

In the foregoing example, the three-state gate device is included between the RS trigger and the signal processing subcircuit 804. The RS trigger transmits the signal to the signal processing subcircuit 804 by using the three-state gate device. When the signal output subcircuit needs to be protected or the signal is not output, an end e of the three-state gate device is set to a high-resistance state, so that the RS trigger is disconnected from the signal processing subcircuit 804.

In this embodiment of the present disclosure, the comparator 802 may alternatively use a multi-bit DAC. In this case, the obtained comparison result is multi-bit data rather than merely "0" or "1" (0 represents an ineffective column reset signal, indicating that a first reset switch in a corresponding pixel unit cannot be turned on and therefore the corresponding pixel unit cannot reset).

In this embodiment of the present disclosure, the RS trigger may be replaced with a D trigger. This is not limited herein.

Figure 11C:
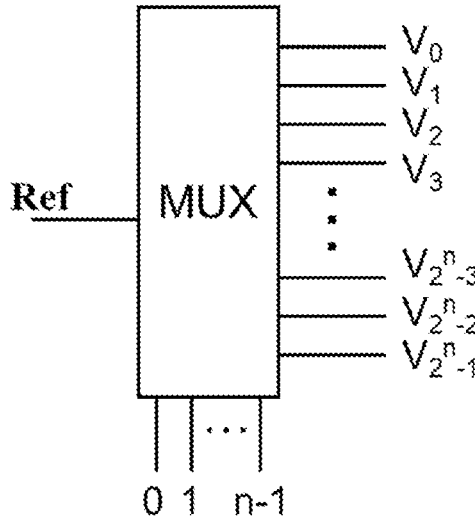
FIG. 11C is a schematic diagram of a structure of another specific circuit implementation of a pixel unit according to an embodiment of the present disclosure.

In this embodiment of the present disclosure, the threshold electrical signal generation subcircuit 803 may alternatively be implemented by a multiplexer, as shown in FIG. 11C. FIG. 11C is a schematic diagram of a structure of another specific circuit implementation of a pixel unit according to an embodiment of the present disclosure. There are a plurality of input ends in the multiplexer. The input ends temporarily store different threshold electrical signals. After the signal processing subcircuit 804 determines the threshold electrical signal of the first pixel unit, the threshold control signal for selecting the threshold electrical signal of the first pixel unit is sent to gating link ports for gating 0 to n−1 below the multiplexer, and a threshold electrical signal for gating a corresponding input end is sent as a threshold electrical signal of a first pixel voltage, that is, a threshold electrical signal Ref, to the comparator.

Second Example Circuit Structure

Figure 12:
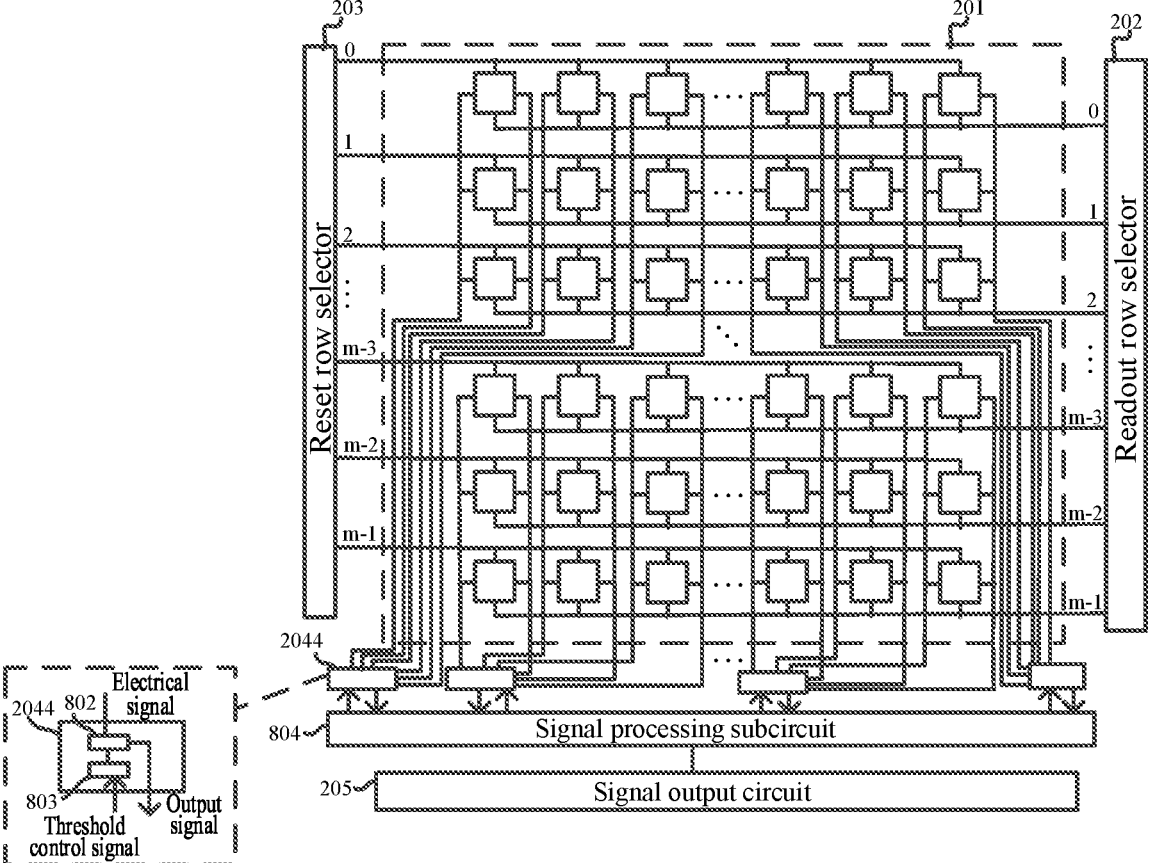
FIG. 12 is a schematic diagram of another example of a signal readout circuit according to an embodiment of the present disclosure.

FIG. 12 is a schematic diagram of another example of a signal readout circuit according to an embodiment of the present disclosure. The circuit structure includes a pixel array 201, a region readout feedback subcircuit 2044, a threshold electrical signal generation subcircuit 803, a signal processing subcircuit 804, and a signal output circuit 205. The threshold electrical signal generation subcircuit 803 is disposed in the region readout feedback subcircuit 2044.

The pixel array 201 includes a plurality of pixel units arranged in at least one row. A first pixel unit in a gated row of pixel units converts an optical signal into an electrical signal, and sends the electrical signal to the region readout feedback subcircuit 2044. The first pixel unit gates a first reset switch of the first pixel unit based on a reset signal sent by the region readout feedback subcircuit 2044, and resets when a second reset switch of the first pixel unit is gated.

The region readout feedback subcircuit 2044 is separately connected electrically connected to pixel units in a corresponding region in the pixel array 201, and configured to: receive the electrical signal from the first pixel unit in the specified region, when the comparator 802 determines that the electrical signal is greater than the threshold electrical signal of the first pixel unit that is received from the threshold electrical signal generation subcircuit 803, generate the reset signal and the signal, send the reset signal to the first pixel unit to gate the first reset switch of the first pixel unit, and send the signal to the signal processing subcircuit 804.

The signal processing subcircuit 804 is connected (for example, electrically connected) to the region readout feedback subcircuit 2044, and configured to perform statistics on information of the signal of the first pixel unit within a time interval, feed back to the threshold electrical signal generation subcircuit 803 in the region readout feedback subcircuit 2044 based on a specified threshold electrical signal generation policy and the information of the signal of the first pixel unit obtained within the time interval, and output the signal of the first pixel unit by using the signal output circuit 205.

In the second example circuit structure, the comparator 802 is disposed in the region readout feedback subcircuit 2044. The region readout feedback subcircuit 2044 implements the foregoing functions as follows: When determining that the electrical signal is greater than the threshold electrical signal of the first pixel unit, the comparator 802 generates the reset signal and the signal, sends the reset signal to the first pixel unit to gate the first reset switch of the first pixel unit, and sends the signal to the signal processing subcircuit 804.

Herein, the threshold electrical signal generation subcircuit 803 is disposed inside or outside the region readout feedback subcircuit 2044. The threshold electrical signal generation subcircuit 803 includes a DAC or a multiplexer. The threshold electrical signal generation subcircuit 803 actually includes a plurality of input ends that store different threshold electrical signals. The threshold control signal for selecting the threshold electrical signal of the first pixel unit controls to gate a corresponding input end, and a selected threshold electrical signal is sent as the threshold electrical signal of the first pixel unit to the comparator 802 to be processed.

Herein, the signal processing subcircuit 804 is disposed inside the region readout feedback subcircuit 2044, or disposed outside the region readout feedback subcircuit 2044. This is not limited herein.

In the second example circuit structure, the region readout feedback subcircuit 2044 may be multiplexed in pixel units in one region to compare and generate a signal and a reset signal, so that a circuit area occupied by each pixel unit in the pixel array can be reduced. Given a fixed quantity of pixel units, the circuit can be scaled down, to achieve circuit miniaturization.

In the second example circuit structure, the pixel array 201 is divided into a plurality of regions. Reset and transmission of pixel units in each region are controlled by the region readout feedback subcircuit 2044 based on the threshold electrical signal of the corresponding pixel units. In one region, the region readout feedback subcircuit 2044 interacts with pixel units in corresponding columns at different moments, so that pixel units in different columns reset and send an electrical signal (pixel units in different rows in one region are directly controlled to be gated and send a row reset signal). For example, when three columns of pixel units are located in one region and electrically connected to a region readout feedback subcircuit 2044 in the region, a first column of pixel units interact with the region readout feedback subcircuit 2044 at a first moment such as the first third of a frame cycle, a second column of pixel units interact with the region readout feedback subcircuit 2044 at a second moment such as the middle third of the frame cycle, and a third column of pixel units interact with the region readout feedback subcircuit 2044 at a third moment such as the last third of the frame cycle.

Third Example Circuit Structure

Figure 13A:
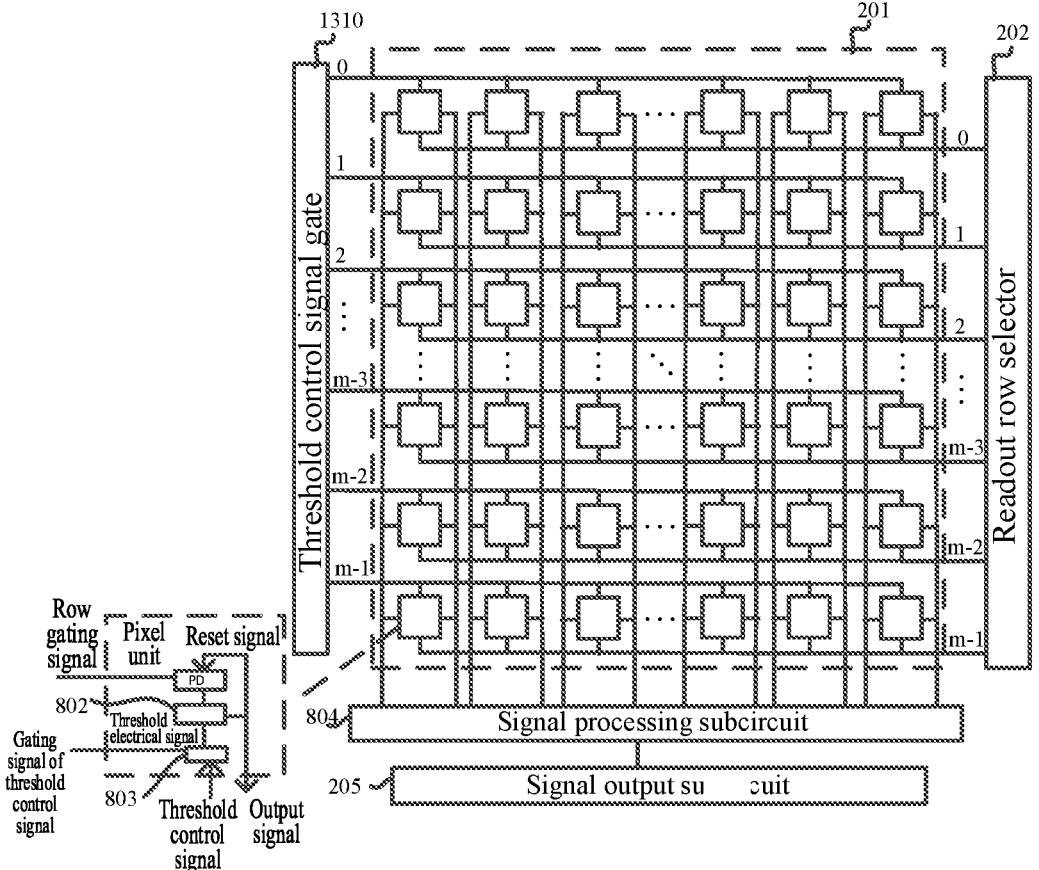
FIG. 13A is a schematic diagram of another example of a signal readout circuit according to an embodiment of the present disclosure.

FIG. 13A is a schematic diagram of another example of a signal readout circuit according to an embodiment of the present disclosure. The circuit structure includes a pixel array 201, a threshold electrical signal generation subcircuit 803, a signal processing subcircuit 804, and a signal output circuit 205.

The pixel array 201 includes a plurality of pixel units arranged in at least one row. A first pixel unit in a gated row of pixel units converts an optical signal into an electrical signal, and when determining that the electrical signal is greater than a threshold electrical signal that is of the first pixel unit and that is sent by the threshold electrical signal generation subcircuit 803, generates the reset signal and the signal, where the reset signal is used to gate a first reset switch of the first pixel unit, to perform reset; and sends the signal to the signal processing subcircuit 204.

The threshold electrical signal generation subcircuit 803 is configured to: based on the threshold control signal that is received from the signal processing subcircuit 804 and that is used to select the threshold electrical signal of the first pixel unit, generate the threshold electrical signal of the first pixel unit, and send the threshold electrical signal to the first pixel unit.

The signal processing subcircuit 804 is configured to perform statistics on the received signal within specified time, perform statistics on information of the signal of the first pixel unit within a time interval, generate, based on a specified threshold electrical signal generation policy and the information that is of the signal of the first pixel unit and that is obtained within the time interval, a threshold control signal for selecting the threshold electrical signal of the first pixel unit, and send the threshold control signal to the threshold electrical signal generation subcircuit 803; and output the signal of the first pixel unit by using the signal output circuit 205.

In the third example circuit structure, it can be learned that the comparator 802 is disposed inside the first pixel unit. Specifically, when the comparator 802 determines that the electrical signal is greater than a threshold electrical signal of the first pixel unit that is received from the threshold electrical signal generation subcircuit 803, the first pixel unit generates the reset signal and the output signal, where the reset signal is used to gate the first reset switch of the first pixel unit, to perform reset. The comparator 802 in the first pixel unit sends the signal to the signal processing subcircuit 804.

Different from the foregoing two example circuit structures, the third example circuit structure does not include a reset row selector 203, but controls to gate a second reset switch of the first pixel unit by using a row reset signal. Because the comparator 802 is disposed inside the first pixel unit and is not multiplexed by a plurality of pixel units, the reset signal sent by the comparator is directly used in the first pixel unit to control reset of the first pixel unit.

The third example circuit structure further includes a threshold control signal gate 1310. As shown in FIG. 13A, the threshold control signal gate is configured to send a gating signal of the threshold control signal to the first pixel unit to gate a third switch that is in the first pixel unit and that is configured to receive the threshold control signal, to cause the threshold electrical signal generation subcircuit 803 in the first pixel unit to receive the threshold control signal.

In the third example circuit structure, the threshold electrical signal generation subcircuit 803 is disposed inside the first pixel unit. The threshold electrical signal generation subcircuit 803 includes a DAC or a multiplexer. The threshold electrical signal generation subcircuit 803 actually includes a plurality of input ends that temporarily store different threshold electrical signals. When the threshold control signal for selecting the threshold electrical signal of the first pixel unit is received, a corresponding input end is gated, and a selected threshold electrical signal is sent as the threshold electrical signal of the first pixel unit to the comparator 802 to be processed.

In the third example circuit structure, the pixel array is used as a chip-level circuit, and has a structure shown in FIG. 13B. The pixel array specifically includes the pixel array 201 including pixel units arranged in at least one row in rows and columns. The first pixel unit in the pixel array 201 includes the comparator 802 and the threshold electrical signal generation subcircuit 803.

When the comparator 802 determines that the electrical signal is greater than the threshold electrical signal of the first pixel unit that is received from the threshold electrical signal generation subcircuit 803, the first pixel unit generates the reset signal and the signal, where the reset signal is used to gate the first reset switch of the first pixel unit, to perform reset. The comparator 802 sends the signal to the signal processing subcircuit 804.

The threshold electrical signal generation subcircuit 803 in the first pixel unit is configured to obtain the threshold electrical signal of the first pixel unit based on the threshold control signal received from the signal processing subcircuit 804, and send the threshold electrical signal to the comparator 802. The signal processing subcircuit 804 performs statistics on information of the signal of the first pixel unit within a time interval, and generate, based on the specified threshold electrical signal generation policy and the information that is of the signal of the first pixel unit and that is obtained within the time interval, the threshold control signal for selecting the first pixel unit.

In the foregoing example, the threshold electrical signal generation subcircuit 803 in the first pixel unit in the pixel array shown in FIG. 13B is further configured to: in response to the received gating signal that is of the threshold control signal and that is sent by the threshold control signal gate 1310, gate the third switch of the first pixel unit, and receive the threshold control signal.

Compared with the first example circuit structure or the second example circuit structure, the third example circuit structure can rapidly adjust a signal emission frequency because the threshold electrical signal generation subcircuit 803 is further integrated in each pixel unit in the pixel array.

The foregoing example circuit structures all use the threshold electrical signal generation subcircuit 803. The threshold electrical signal generation subcircuit 803 specifically includes a digital-to-analog converter DAC or a multiplexer.

The DAC includes at least one input end and an output end. Each input end stores a threshold electrical signal. The DAC gates one input end under the control of the threshold control signal, and outputs the threshold electrical signal stored by the input end to the comparator 802 by using the output end.

The multiplexer includes at least one input end, an output end, and a control end. Each input end stores a threshold electrical signal. The control end of the multiplexer gates a corresponding input end when receiving the threshold control signal. The threshold electrical signal stored by the corresponding input end is sent to the comparator 802 by using the output end.

In the foregoing example circuit structure, there may be a plurality of types of the information of the signal of the first pixel unit, for example, a quantity of signals of the first pixel unit or an average interval or a minimum interval between signals of the first pixel unit. In addition, different specified threshold electrical signal generation policies may be specified to obtain the corresponding threshold electrical signal of the first pixel unit.

Specifically, the information of the signal of the first pixel unit includes a quantity of signals of the first pixel unit accumulatively obtained within the time interval. The signal processing subcircuit 804 determines, based on a correspondence between a preset quantity of signals and a threshold electrical signal, the threshold electrical signal of the first pixel unit corresponding to the quantity of signals of the first pixel unit, and obtains, based on the corresponding threshold electrical signal of the first pixel unit, the threshold control signal for selecting the corresponding threshold electrical signal of the first pixel unit.

Alternatively, the information of the signal of the first pixel unit includes an average interval between signals of the first pixel unit accumulatively obtained within the time interval. The signal processing subcircuit 804 determines, based on a correspondence between a preset average interval of signals and a threshold electrical signal, the threshold electrical signal of the first pixel unit corresponding to the average interval between signals of the first pixel unit, and obtains, based on the corresponding threshold electrical signal of the first pixel unit, the threshold control signal for selecting the corresponding threshold electrical signal of the first pixel unit.

Alternatively, the signal of the first pixel unit includes a minimum interval between signals of the first pixel unit accumulatively obtained within the time interval. The signal processing subcircuit 804 determines, based on a correspondence between a preset minimum interval of signals and a threshold electrical signal, the threshold electrical signal of the first pixel unit corresponding to the minimum interval between signals of the first pixel unit, and obtains, based on the corresponding threshold electrical signal of the first pixel unit, the threshold control signal for selecting the corresponding threshold electrical signal of the first pixel unit.

In a case of another threshold electrical signal generation policy, the information of the signal of the first pixel unit includes a quantity of signals of the first pixel unit accumulatively obtained within the time interval. The signal processing subcircuit 804 is further configured to: determine whether the quantity of signals of the first pixel unit is greater than a specified quantity threshold; if the quantity of signals of the first pixel unit is greater than the specified quantity threshold, decrease the threshold electrical signal of the first pixel unit currently corresponding to the signal of the first pixel unit to a threshold electrical signal in a specified level; or if the quantity of signals of the first pixel unit is not greater than the specified quantity threshold, increase the threshold electrical signal of the first pixel unit currently corresponding to the signal of the first pixel unit to a threshold electrical signal in a specified level, where the specified level is specified based on a correspondence between an adjustment level and a difference between a preset quantity of signals of the first pixel unit and the quantity threshold; and obtain, based on the corresponding threshold electrical signal of the first pixel unit, the threshold control signal for selecting the corresponding threshold electrical signal of the first pixel unit.

Alternatively, the information of the signal of the first pixel unit includes an average interval between signals of the first pixel unit accumulatively obtained within the time interval. The signal processing subcircuit 804 is further configured to determine whether the average interval between signals of the first pixel unit is greater than a specified average interval threshold; if the average interval between signals of the first pixel unit is greater than the specified average interval threshold, decrease the threshold electrical signal of the first pixel unit currently corresponding to the signal of the first pixel unit to a threshold electrical signal in a specified level; or if the average interval between signals of the first pixel unit is not greater than the specified average interval threshold, increase the threshold electrical signal of the first pixel unit currently corresponding to the signal of the first pixel unit to a threshold electrical signal in a specified level, where the specified level is specified based on a correspondence between an adjustment level and a difference between a preset average interval of signals of the first pixel unit and the average interval threshold; and obtain, based on the corresponding threshold electrical signal of the first pixel unit, the threshold control signal for selecting the corresponding threshold electrical signal of the first pixel unit.

Alternatively, the signal of the first pixel unit includes a minimum interval between signals of the first pixel unit accumulatively obtained within the time interval. The signal processing subcircuit 804 is further configured to: determine whether the minimum interval between signals of the first pixel unit is greater than a specified minimum interval threshold; if the minimum interval between signals of the first pixel unit is greater than the specified minimum interval threshold, decrease the threshold electrical signal of the first pixel unit currently corresponding to the signal of the first pixel unit to a threshold electrical signal in a specified level; or if the minimum interval between signals of the first pixel unit is not greater than the specified minimum interval threshold, increase the threshold electrical signal of the first pixel unit currently corresponding to the signal of the first pixel unit to a threshold electrical signal in a specified level, where the specified level is specified based on a correspondence between an adjustment level and a difference between a preset minimum interval of signals of the first pixel unit and the minimum interval threshold; and obtain, based on the corresponding threshold electrical signal of the first pixel unit, the threshold control signal for selecting the corresponding threshold electrical signal of the first pixel unit.

FIG. 14 is an example flowchart of a method for a signal readout circuit according to an embodiment of the present disclosure.

Step 1401: A first pixel unit in a gated row of pixel units in a pixel array of a circuit converts an optical signal into an electrical signal.

Step 1402: When determining that the electrical signal of the first pixel unit is greater than a determined threshold electrical signal of the first pixel unit, generate a signal, where statistics is performed on information of the signal of the first pixel unit within a time interval, and then the threshold electrical signal of the first pixel unit is generated based on a specified threshold electrical signal generation policy and the information that is of the signal of the first pixel unit and that is obtained within the time interval.

Step 1403: Output the signal, and perform step 1401 again.

In an example, the method further includes: when the signal is generated, generating a reset signal to reset the first pixel unit, and performing step 1401 again to emit the signal.

In an example, the information that is of the signal of the first pixel unit and that is obtained through statistics can reflect information of a current light intensity of the first pixel unit, and may, for example, be a quantity of signals counted within a preset time period, an average interval between signals, or a minimum interval between signals. This is not limited herein.

In an example, the specified threshold electrical signal generation policy is actually presetting a correspondence between different threshold electrical signals and different information that is obtained through statistics and that is of the signal of the first pixel unit.

Specifically, that statistics is performed on information of the signal of the first pixel unit within a time interval, and then the threshold electrical signal of the first pixel unit is generated based on a specified threshold electrical signal generation policy and the information that is of the signal of the first pixel unit and that is obtained within the time interval includes:

if the information of the signal of the first pixel unit includes a quantity of signals of the first pixel unit accumulatively obtained within the time interval, determining, based on a correspondence between a preset quantity of signals and a threshold electrical signal, the threshold electrical signal of the first pixel unit corresponding to the quantity of signals of the first pixel unit;

if the information of the signal of the first pixel unit includes an average interval between signals of the first pixel unit accumulatively obtained within the time interval, determining, based on a correspondence between a preset average interval of signals and a threshold electrical signal, the threshold electrical signal of the first pixel unit corresponding to the average interval between signals of the first pixel unit;

or if the signal of the first pixel unit includes a minimum interval between signals of the first pixel unit accumulatively obtained within the time interval, determining, based on a correspondence between a preset minimum interval of signals and a threshold electrical signal, the threshold electrical signal of the first pixel unit corresponding to the minimum interval between signals of the first pixel unit.

In the foregoing method, because the information that is of the signal of the first pixel unit and that is obtained through statistics reflects the information of the current light intensity of the first pixel unit, an information threshold is further preset. When it is determined that the information that is of the signal of the first pixel unit and that is obtained through statistics is greater than the information threshold, it indicates that the current light intensity of the first pixel unit is high, and the corresponding threshold electrical signal needs to be decreased, to increase a signal emission frequency of the first pixel unit. When it is determined that the information that is of the signal of the first pixel unit and that is obtained through statistics is less than the information threshold, it indicates that the current light intensity of the first pixel unit is low, and the corresponding threshold electrical signal needs to be increased, to decrease a signal emission frequency of the first pixel unit.

Herein, a decrease or increase amplitude of the corresponding threshold electrical signal is related to a difference between the information of the signal of the first pixel unit and the information threshold. A larger difference indicates a larger amplitude. In this case, the threshold electrical signal may be set to a plurality of levels in terms of values. In this embodiment of the present disclosure, the specified threshold electrical signal generation policy is actually presetting a correspondence between an adjustment threshold electrical signal and a difference between the information of the signal of the first pixel unit and the information threshold. During adjustment, whether to increase or decrease the corresponding threshold electrical signal is determined based on the information threshold, a level to which the corresponding threshold electrical signal is increased or decreased is then determined based on the specified correspondence, and finally the threshold electrical signal is increased or decreased to a corresponding level based on a current threshold electrical signal of the first pixel unit, to obtain the corresponding threshold electrical signal subsequently used by the first pixel unit.

Specifically, that statistics is performed on information of the signal of the first pixel unit within a time interval, and then the threshold electrical signal of the first pixel unit is generated based on a specified threshold electrical signal generation policy and the information that is of the signal of the first pixel unit and that is obtained within the time interval includes:

determining whether the quantity of signals of the first pixel unit is greater than a specified quantity threshold; if the quantity of signals of the first pixel unit is greater than the specified quantity threshold, decreasing the threshold electrical signal of the first pixel unit currently corresponding to the signal of the first pixel unit to a threshold electrical signal in a specified level; or if the quantity of signals of the first pixel unit is not greater than the specified quantity threshold, increasing the threshold electrical signal of the first pixel unit currently corresponding to the signal of the first pixel unit to a threshold electrical signal in a specified level, where the specified level is specified based on a correspondence between an adjustment level and a difference between a preset quantity of signals of the first pixel unit and the quantity threshold;

determining whether the average interval between signals of the first pixel unit is greater than a specified average interval threshold; if the average interval between signals of the first pixel unit is greater than the specified average interval threshold, decreasing the threshold electrical signal of the first pixel unit currently corresponding to the signal of the first pixel unit to a threshold electrical signal in a specified level; or if the average interval between signals of the first pixel unit is not greater than the specified average interval threshold, increasing the threshold electrical signal of the first pixel unit currently corresponding to the signal of the first pixel unit to a threshold electrical signal in a specified level, where the specified level is specified based on a correspondence between an adjustment level and a difference between a preset average interval of signals of the first pixel unit and the average interval threshold;

or determining whether the minimum interval between signals of the first pixel unit is greater than a specified minimum interval threshold; if the minimum interval between signals of the first pixel unit is greater than the specified minimum interval threshold, decreasing the threshold electrical signal of the first pixel unit currently corresponding to the signal of the first pixel unit to a threshold electrical signal in a specified level; or if the minimum interval between signals of the first pixel unit is not greater than the specified minimum interval threshold, increasing the threshold electrical signal of the first pixel unit currently corresponding to the signal of the first pixel unit to a threshold electrical signal in a specified level, where the specified level is specified based on a correspondence between an adjustment level and a difference between a preset minimum interval of signals of the first pixel unit and the minimum interval threshold.

In an example, the time interval for statistics of the information of the signal of the first pixel unit is specified as needed. This is not limited herein.

It can be learned from the foregoing method that, in this embodiment of the present disclosure, signals emitted by each pixel unit within the time interval before current signal emission are counted, so that information that reflects a current light intensity of the first pixel unit can be obtained. Then, a corresponding threshold electrical signal used by the pixel unit during the current signal emission is obtained based on the preset threshold electrical signal generation policy and the information that reflects the current light intensity of the first pixel unit, to control a current signal emission frequency of the pixel unit. Because a signal emission interval of the pixel unit in the pixel array is in a millisecond level, the corresponding threshold electrical signal used by the pixel unit during the current signal emission can reflect the current light intensity of the pixel unit. Therefore, the signal emission frequency of the pixel unit can be adjusted.

In this embodiment of the present disclosure, corresponding threshold electrical signals are generated for the pixel units in the pixel array at a same moment or different moments. This is not limited herein. In an embodiment of the present disclosure, the corresponding threshold electrical signals are generated for the pixel units at different moments. A corresponding threshold electrical signal is generated for each pixel unit at an individual moment. Specified threshold electrical signal generation policies for the pixel units may also be the same or different. This is not limited herein. Therefore, a threshold voltage of each pixel unit is more flexibly adjusted.

FIG. 15 is an example flowchart of a method for a signal readout circuit according to an embodiment of the present disclosure. The method is implemented based on the signal readout circuit shown in FIG. 2.

Step 1501: A readout row selector in the signal readout circuit sends a row readout signal to a corresponding row (for example, a selected row) of pixel units in the pixel array, to gate the row of pixel units. In an example, the pixel array includes a plurality of pixel units arranged into at least one row and includes at least one pixel subarray, and each pixel subarray includes partial pixel units in the plurality of pixel units.

Step 1502: A gated row of pixel units in a pixel subarray outputs an electrical signal to a connected pixel subarray readout feedback circuit, where the electrical signal is converted from an optical signal.

Step 1503: The connected pixel subarray readout feedback circuit receives the electrical signal, and when determining based on the electrical signal that a signal generation condition is met, generates and outputs a signal, and generates a reset signal and outputs the reset signal to the pixel unit that sends the electrical signal.

Step 1504: A reset row selector in the circuit sends a row reset signal to the row of pixel units, and the pixel unit that receives the row reset signal and the reset signal resets.

In this step, the pixel unit that receives the reset signal gates a second reset switch of the pixel unit. After receiving the row reset signal sent by the reset row selector, the pixel unit gates a first reset switch of the pixel unit. After the second reset switch and the first reset switch of the pixel unit are sequentially gated, the pixel unit performs a reset operation.

In some embodiments, after the pixel unit that receives the row reset signal and the reset signal resets, the method further includes:

performing step 1501 again, where the step includes that the readout row selector in the circuit sends the row readout signal to a next row of pixel units in the pixel array.

In this method, that the connected pixel subarray readout feedback circuit receives the electrical signal, and when determining based on the electrical signal that a signal generation condition is met, outputs a generated signal, and outputs a generated reset signal to the pixel unit that sends the electrical signal includes:

comparing the electrical signal with a specified threshold signal, and determining whether the electrical signal reaches the specified threshold signal, where if the electrical signal reaches the specified threshold signal, the output signal is 1 and the reset signal is 1, or if the electrical signal does not reach the specified threshold signal, the output signal is 0 and the reset signal is 0; the reset signal 0 represents an ineffective reset signal, and the reset signal 1 represents an effective reset signal; and when the reset signal is 0, no reset signal is generated, and it indicates that a reset signal received by a corresponding pixel unit is ineffective and cannot turn on the second reset switch of the pixel unit that sends the electrical signal, so that the pixel unit that sends the electrical signal cannot reset.

In this method, the outputting a generated reset signal to the pixel unit that sends the electrical signal includes:

when the pixel subarray includes pixel units in a specified region in the pixel array, the pixel units in the pixel subarray are electrically connected to a region readout feedback circuit, wherein, when a plurality of pixel units arranged in one column in the pixel subarray are electrically connected to one region readout feedback circuit, the electrical signal transmitted by the pixel unit that sends the electrical signal is received, and the reset signal is sent to the pixel unit that sends the electrical signal;

alternatively, when a plurality of pixel units arranged in a plurality of columns in the pixel subarray are electrically connected to one region readout feedback circuit, an electrical signal sent by a second pixel unit in a column different from a column of the first pixel unit that sends the electrical signal is further received, the reset signal is sent to the first pixel unit at a first moment, and the reset signal is sent to the second pixel unit at a second moment.

In this method, the outputting a generated reset signal to the pixel unit that sends the electrical signal includes:

the pixel subarray readout feedback circuit is a column-level readout feedback circuit, and at least one column of pixel units in the pixel array are electrically connected to the column-level readout feedback circuit, wherein, when one column of pixel units are connected to one column-level readout feedback circuit, the reset signal is directly output to the pixel unit that sends the electrical signal;

when the plurality of columns of pixel units are connected to one column-level readout feedback circuit, if it is determined based on the electrical signal transmitted by each column of pixel units that a signal generation condition is met, the reset signal is output at different moments to each column of pixel units that send the electrical signal.

A specific embodiment is described in detail below.

Figure 16:
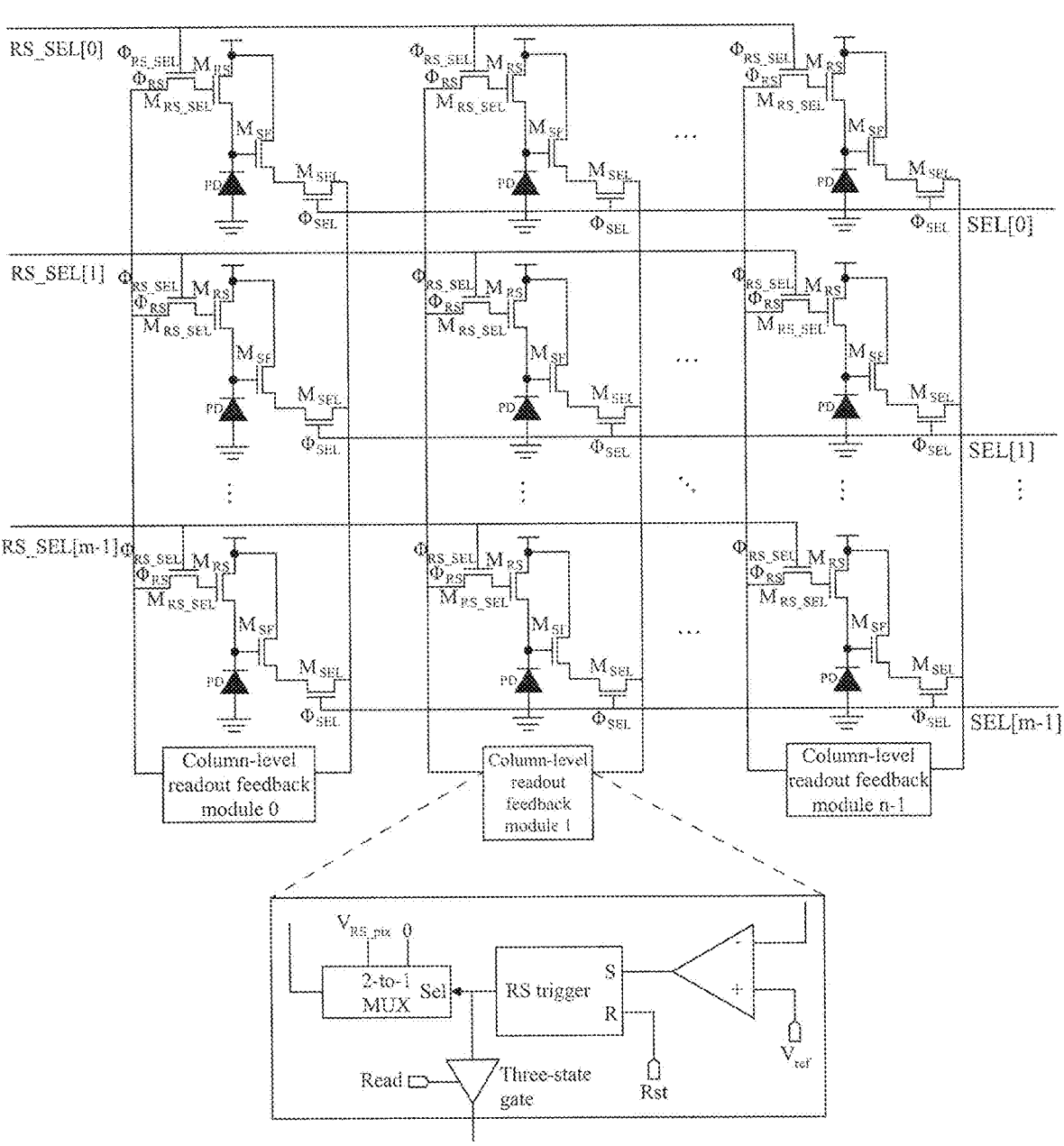
FIG. 16 is a schematic diagram of an example of a method for a signal readout circuit according to an embodiment of the present disclosure.

FIG. 16 is a schematic diagram of a structure of a specific example of a signal readout circuit according to an embodiment of the present disclosure. A structure of a pixel unit in the structure uses the specific implementation structure in FIG. 3B. A structure of a column-level readout feedback circuit uses the specific implementation structure in FIG. 5B.

In the figure, the column-level readout feedback circuit is marked as a column-level readout feedback module. This is not limited herein. In this specific example, one column of pixel units and one column-level readout feedback circuit are cascaded. In other words, one column of pixel units correspond to one column-level readout feedback circuit.

Figure 17:
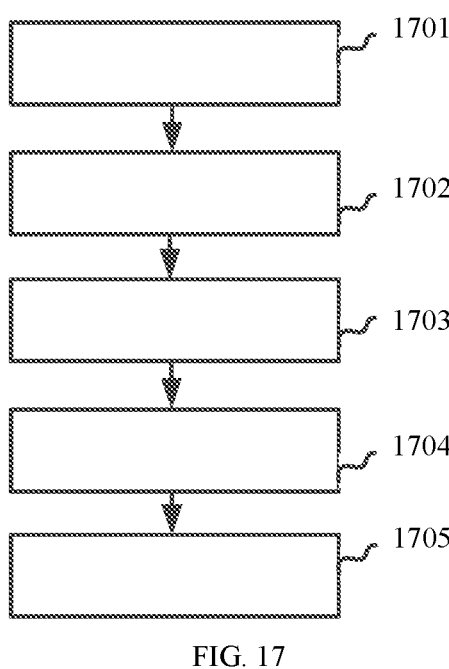
FIG. 17 is a flowchart of an example of a method for a signal readout circuit according to an embodiment of the present disclosure.

Based on FIG. 16, FIG. 17 is a flowchart of a specific example of a method for a signal readout circuit according to an embodiment of the present disclosure.

Step 1701: A readout row selector selects an i-th row for signal readout, where $0<=i<=m-1$, and m is a natural number; and sends a row readout signal to an i-th row of pixel units.

Step 1702: The i-th row of pixel units receives the row readout signal, converts an optical signal into an electrical signal, and outputs the electrical signal to a connected column-level readout feedback circuit, and the connected column-level readout feedback circuit compares the electrical signal with a specified threshold, to obtain a signal and a reset signal of the i-th row of pixel units, and outputs the obtained signals.

In this step, if a trigger condition is met, the signal is 1, and an effective reset signal is obtained, that is, the reset signal is generated. If the trigger condition is not met, the signal is 0, and an ineffective reset signal is obtained, that is, the reset signal is not generated.

Step 1703: The column-level readout feedback circuit transmits the reset signal of connected pixel units in the obtained i-th row to the pixel units.

Step 1704: A reset row selector selects an i-th row for reset, where $0<=i<=m-1$, and m is a natural number; and transmits a row reset signal to the i-th row of pixel units; and the pixel unit that receives the row reset signal and the reset signal performs a reset operation.

In this step, in a case of an effective reset signal, for example, if the reset signal is set to 0, it is determined that no reset signal is received, and no reset operation is performed.

Step 1705: an (i+1)-th row of pixel units are selected as pixel units for signal output, and step 1701 is performed again.

Figure 18:
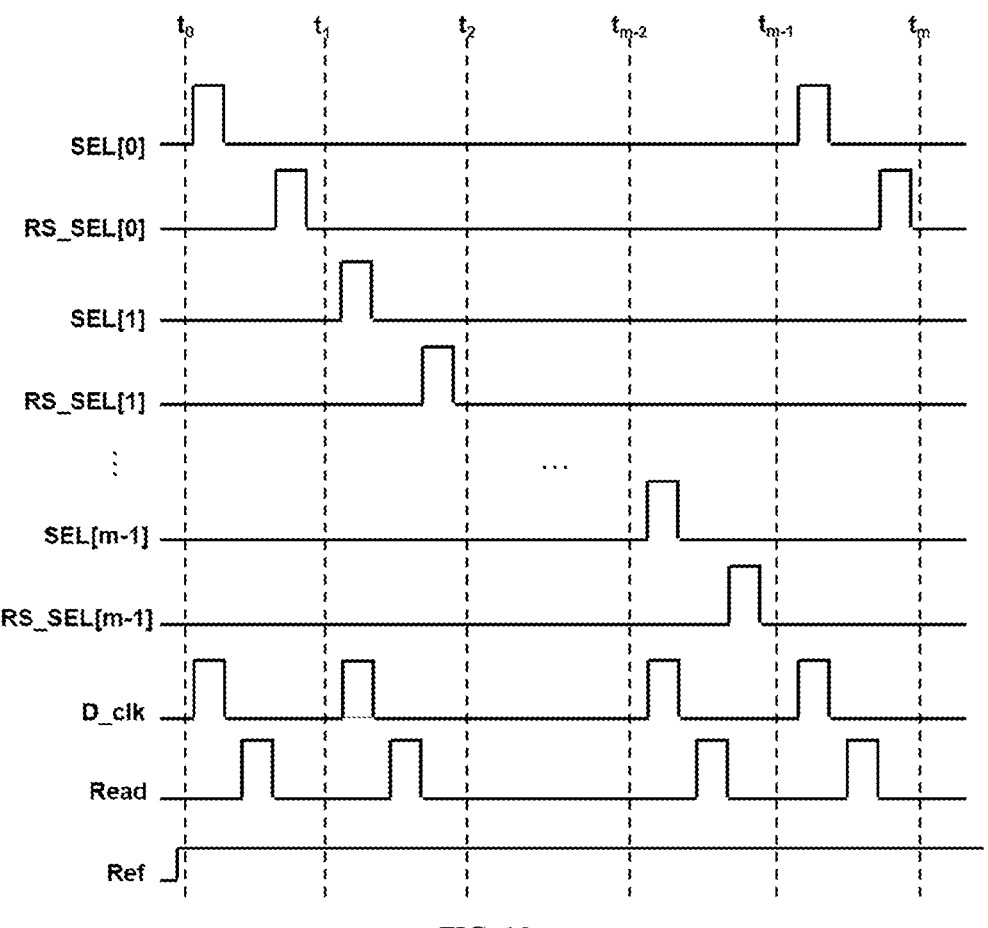
FIG. 18 is a timing diagram of signals in a signal readout process according to an embodiment of the present disclosure.

FIG. 18 is a sequence diagram of signals in a signal readout process according to an embodiment of the present disclosure.

In this example, a column-level readout feedback circuit uses a D trigger to latch a comparison result, and a trigger end of the D trigger is D_clk.

During the time period from t0 to t1, a high-level voltage signal is applied to a row SEL[0] in a circuit, a 0-th row of pixel units are gated, and the 0-th row of pixel units send an electrical signal to a connected column-level readout feedback circuit, where the electrical signal is generated from an optical signal.

A comparator in the connected column-level readout feedback circuit compares the transmitted electrical signal with a voltage signal at an end Ref to obtain a comparison result, and outputs the comparison result to the D trigger, and the end D_clk of the D trigger applies a high-level voltage signal and latches the comparison result.

An end Read of a three-state gate device in the connected column-level readout feedback circuit applies a high-level voltage signal, and outputs the comparison result that is latched in the D trigger and that is used as a signal, and a MUX in the connected column-level readout feedback circuit obtains a reset signal, that is, VRS_pix or 0, based on the comparison result latched in the D trigger, and outputs the reset signal.

The high-level voltage signal is applied to a signal line RS_SEL[0] to reset the 0-th row of pixel units, and VRS_pix or 0 in a j-th column (0<=j<=n) is applied to a pixel unit at a location (0, j) to determine whether to reset the pixel unit at the location (0, j). The 0-th row of pixel units all receive a row reset signal, namely, the high-level voltage signal applied to the signal line RS_SEL[0], and only the pixel unit that is in the row and that receives the reset signal performs a reset operation.

In this embodiment of the present disclosure, the signal readout circuit includes a pixel array circuit and a board-level circuit. A structure of each pixel unit in the pixel array circuit is changed, so that each pixel unit generates an electrical signal from an optical signal. A pixel subarray readout feedback circuit that includes a column-level readout feedback circuit or a region readout feedback circuit is correspondingly added to the board-level circuit, to generate an electrical signal and a signal and generate and feed back a reset signal. Therefore, imaging uniformity of an imaging array is improved, and circuit miniaturization is achieved.

Figure 19:
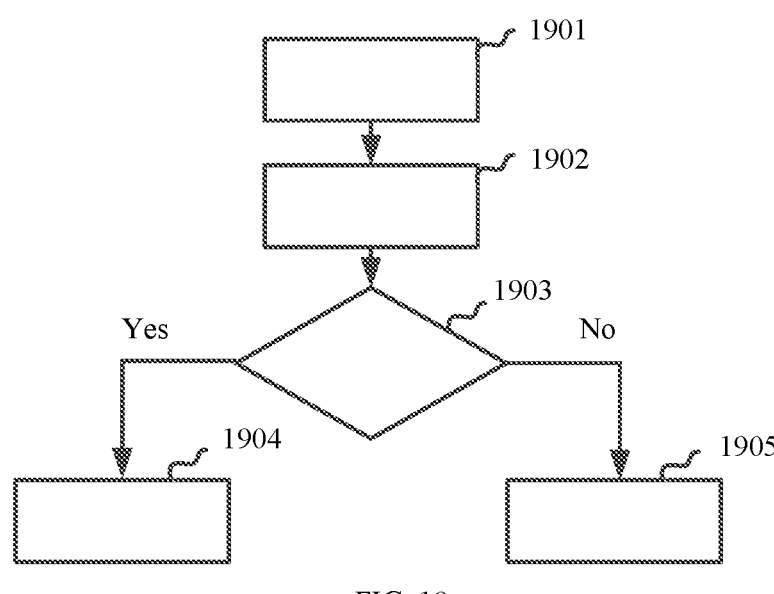
FIG. 19 is a flowchart of a method for determining a threshold electrical signal of a corresponding pixel unit according to an embodiment of the present disclosure.

In the foregoing example, the signal is counted within specified time to obtain the information that reflects the current light intensity of the first pixel unit, and then the threshold electrical signal of the pixel unit in the pixel array is generated based on the information that reflects the current light intensity of the first pixel unit and based on the specified threshold electrical signal generation policy. There may be a plurality of preset threshold electrical signal generation policies, one of which is shown in FIG. 19. FIG. 19 is a flowchart of a method for determining a threshold electrical signal of a corresponding pixel unit according to an embodiment of the present disclosure.

Step 1901: Count signals of corresponding pixel units in a pixel array within specified time.

Step 1902: Calculate a sum quantity of signals emitted by each corresponding pixel unit in the pixel array.

Step 1903: Determine whether the sum quantity of signals emitted by each corresponding pixel unit is greater than a specified sum quantity threshold; and if the sum quantity of signals emitted by each corresponding pixel unit is greater than the specified sum quantity threshold, perform step 1904; or if the sum quantity of signals emitted by each corresponding pixel unit is not greater than the specified sum quantity threshold, perform step 1905.

Step 1904: Decrease a level of a threshold electrical signal of a pixel unit greater than the sum quantity threshold, to obtain a current threshold electrical signal of the pixel unit.

Step 1905: Increase a level of a threshold electrical signal of a pixel unit not greater than the sum quantity threshold, to obtain a current threshold electrical signal of the pixel unit.

In the foregoing specific example, threshold electrical signals of the pixel units are divided into a plurality of levels in a descending order. If the sum quantity of signals emitted by the pixel unit is greater than the specified sum quantity threshold, it indicates that an input light intensity of the pixel unit is high, and the current threshold electrical signal of the pixel unit is decreased by one or more levels that are determined based on a difference, to decrease a subsequent signal emission frequency of the pixel unit. If the sum quantity of signals emitted by the pixel unit is not greater than the specified sum quantity threshold, it indicates that an input light intensity of the pixel unit is low, and the current threshold electrical signal of the pixel unit is increased by one or more levels that are determined based on a difference, to increase a subsequent signal emission frequency of the pixel unit.

It can be learned that, in this embodiment of the present disclosure, a comparator in a circuit performs comparison and controls a signal emission frequency of a corresponding pixel unit based on an adjustable threshold electrical signal of the pixel unit, to improve sensitivity of the signal emission frequency of the pixel unit in the pixel array, implement flexible adjustment of the pixel-level signal emission frequency, and implement imaging in both a bright region and a dark region in the pixel array.

Specifically, a fixed photo-generated current I is generated for a determined light intensity input in a single pixel unit of the pixel array. A capacitance value on a PD is C. If a threshold voltage obtained in the comparator is Vref, a voltage on the PD after each reset is Vrst. In this case, when an accumulated charge in the pixel unit reaches $C*(Vrst-Vref)$, a signal is emitted. A signal emission interval $\Delta t$ of the pixel unit is $C*(Vrst-Vref)/I$. Under a condition that the capacitance C, the photo-generated current I, and the voltage Vrst are not changed, if the threshold voltage Vref is changed, the signal emission interval changes.

In a conventional pulse sequence image sensor, pixel units share a same threshold voltage Vref. In a specific implementation process, when the photo-generated current I is large, $\Delta t$ is short. Because the signal emission frequency of the pixel unit is limited, to increase the detected photo-generated current I, the threshold voltage Vref needs to be reduced. Therefore, a larger light intensity can be detected at a same signal emission frequency. If a threshold voltage Vref of a pixel unit with a low photo-generated current I is reduced, $\Delta t$ is further improved. As a result, it takes a longer time to obtain a corresponding light intensity based on the signal emission interval, which does not facilitate signal-based real-time image reconstruction of the pixel unit. In this embodiment of the present disclosure, comparison threshold voltages Vref of corresponding pixel units may be separately set for different pixel units with different light intensities. A corresponding low threshold voltage Vref is set for a pixel unit with a high light intensity. A corresponding high threshold voltage Vref is set for a pixel unit with a low light intensity. Therefore, in the entire pixel array, different pixel units have different signal emission frequencies.

Figure 20:
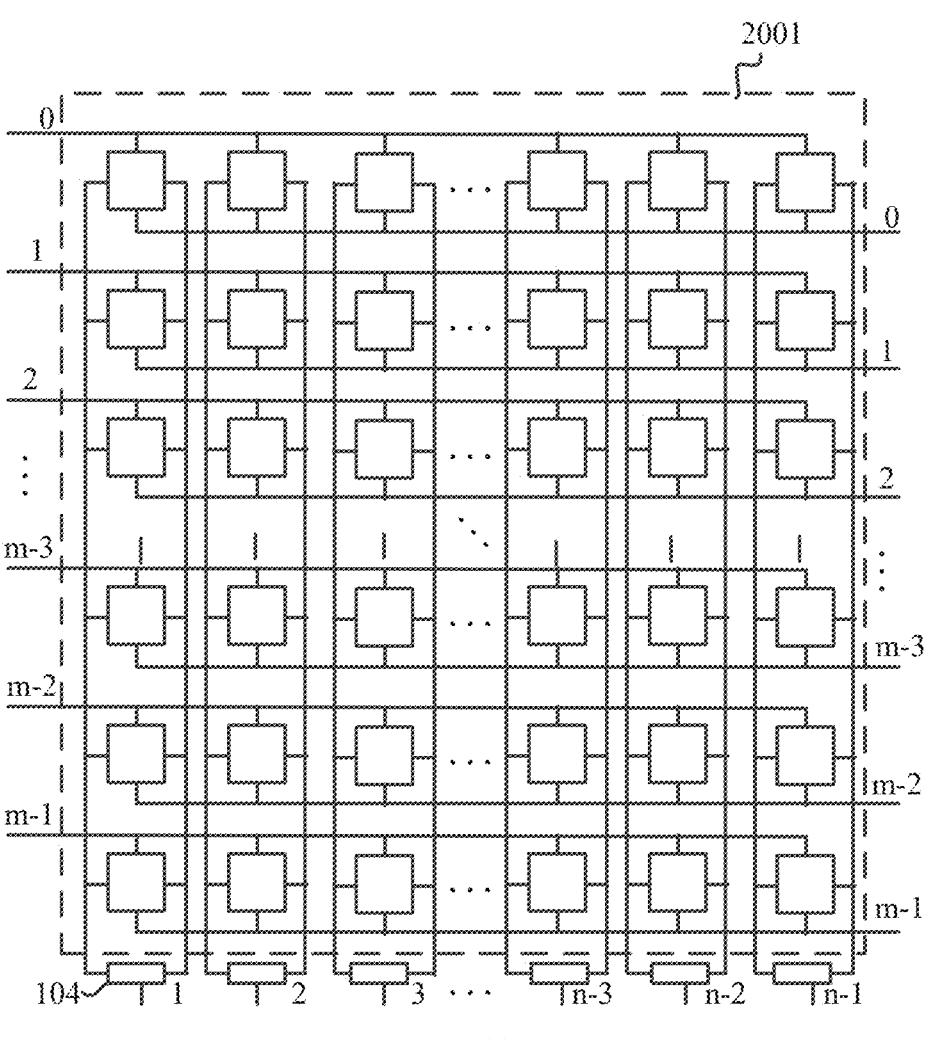
FIG. 20 is a schematic diagram of a structure of a pixel array circuit according to an embodiment of the present disclosure.

FIG. 20 is a schematic diagram of a structure of a pixel unit array circuit according to an embodiment of the present disclosure. In a circuit structure of a pixel unit array 2001, the pixel unit array 2001 includes at least one pixel subarray. A quantity of columns of pixel units in the pixel subarray is less than a quantity of columns of pixel units in the pixel unit array 2001. A quantity of rows of the pixel units in the pixel subarray is equal to a quantity of rows of the pixel units in the pixel unit array 2001. Alternatively, a quantity of columns of pixel units in the pixel subarray is less than or equal to a quantity of columns of pixel units in the pixel unit array 2001. A quantity of rows of the pixel units in the pixel subarray is less than a quantity of rows of the pixel units in the pixel unit array 2001.

The pixel units in the pixel subarray are electrically connected to one pixel subarray readout feedback circuit 104. The pixel unit in the pixel subarray is configured to convert an optical signal into an electrical signal, and after receiving a row readout signal, output the electrical signal to the connected pixel subarray readout feedback circuit 104 in a board-level circuit, so that when determining based on the electrical signal that a signal generation condition is met, the pixel subarray readout feedback circuit 104 generates a reset signal and sends the reset signal to the connected pixel unit, and generates a signal for output.

The pixel unit that receives the reset signal gates a second reset switch of the pixel unit in response to the reset signal, and gates a first reset switch of the pixel unit in response to a row reset signal received from a reset row selector, to perform a reset operation.

A structure of each pixel unit in the pixel array circuit provided in FIG. 20 is specifically shown in FIG. 3A, and the specific implementation structures of the pixel unit are shown in FIG. 3B to FIG. 3D.

Figure 21:
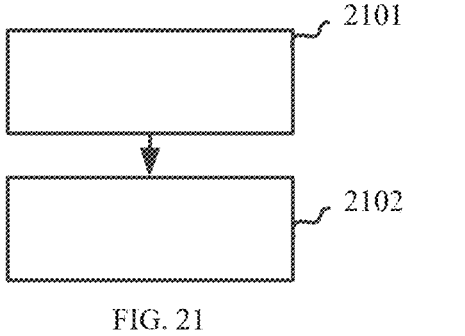
FIG. 21 is a flowchart of a signal readout method based on the pixel array circuit in FIG. 20 according to an embodiment of the present disclosure.

Based on the pixel unit array circuit provided in FIG. 20, an embodiment of the present disclosure further provides a flowchart of a signal readout method based on the pixel array circuit in FIG. 20, as shown in FIG. 21. In a pixel unit array including pixel units arranged in at least one row in rows and columns, the pixel unit array includes at least one pixel subarray. Each pixel subarray includes partial pixel units in the pixel units. A quantity of columns of the pixel units in the pixel subarray is less than a quantity of columns of the pixel units in the pixel unit array. A quantity of rows of the pixel units in the pixel subarray is equal to a quantity of rows of the pixel units in the pixel unit array. Alternatively, a quantity of columns of the pixel units in the pixel subarray is less than or equal to a quantity of columns of the pixel units in the pixel unit array. A quantity of rows of the pixel units in the pixel subarray is less than a quantity of rows of the pixel units in the pixel unit array. The pixel units in the pixel subarray are electrically connected to a pixel subarray readout feedback circuit.

Step 2101: After receiving a row readout signal, the pixel unit in the pixel subarray outputs an electrical signal to the pixel subarray readout feedback circuit that is in a board-level circuit and that is connected to the pixel unit, where the electrical signal is converted from an optical signal, so that when determining based on the electrical signal that a signal generation condition is met, the pixel subarray readout feedback circuit generates a reset signal and sends the reset signal to the connected pixel unit, and generates a signal for output.

Step 2102: The pixel unit that receives the reset signal gates a second reset switch of the pixel unit, and gates a first reset switch of the pixel unit in response to a row reset signal received from a reset row selector, to perform a reset operation.

It can be learned that, in this embodiment of the present disclosure, a function that is implemented by the disposed pixel subarray readout feedback circuit and that is of generating a signal from an electrical signal and generating a reset signal for resetting a corresponding pixel unit by the plurality of pixel units electrically connected to the pixel subarray readout feedback circuit is combined with a function of generating an electrical signal from an optical signal in a corresponding pixel unit in the pixel array circuit, so that a circuit area of the pixel unit can be effectively reduced, and an original pulse emission mode can also be kept unchanged. Given that the circuit area of the pixel unit is reduced, a fill factor of the pixel unit can also be increased, and a proportion of a photosensitive area of the pixel unit is increased. In addition, a manner that a plurality of pixel units share one pixel subarray readout feedback circuit helps improve uniformity of the pixel unit as an imaging array.

In an example, the selected row of pixel units in the pixel array is a row of pixel units in a corresponding pixel subarray in the at least one pixel subarray, the operation is performed on each pixel subarray in a pixel subarray polling manner, and in the pixel subarray polling manner, one pixel subarray is sequentially determined from the at least one pixel subarray as a target pixel subarray for an output signal to be read, where the one pixel subarray includes at least one of the following: p rows of pixel units in the pixel array, q columns of pixel units in the pixel array, or p rows and q columns of pixel units in the pixel array, where p is an integer greater than 1 and not greater than a quantity of rows of the pixel array, and q is an integer greater than 1 and not greater than a quantity of columns of the pixel array.

The method further includes: obtaining a corresponding output signal generated for each pixel unit in the target pixel subarray within a corresponding data frame read cycle, where the output signal generated for each pixel unit indicates whether the pixel unit generates a pulse signal.

Figure 22:
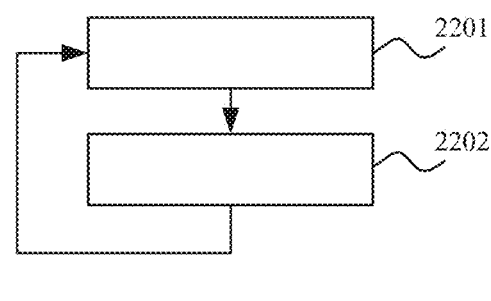
FIG. 22 is a flowchart of a pulse data readout method according to an embodiment of the present disclosure.

FIG. 22 is another example flowchart of a method for a signal readout circuit according to the present disclosure.

Step 2201: In a pixel region polling manner, sequentially determine one pixel region from a pulse imaging array as a target pixel region of a pulse signal currently to be read.

The pulse imaging array includes m*n pixel units arranged in m rows and n columns, where m and n each are an integer greater than 1. One pixel region may include any one of the following: p rows of pixel units, q columns of pixel units, or p rows and q columns of pixel units, where p is an integer greater than 1 and not greater than m, and q is an integer greater than 1 and not greater than n.

Step 2202: Obtain and output pulse data of each pixel unit in the target pixel region within a corresponding data frame read cycle.

The pulse data indicates whether the pixel unit generates a pulse signal. A binary character 1 may indicate that the pixel unit generates a pulse signal within the data frame read cycle. A binary character 0 may indicate that the pixel unit does not generate a pulse signal within the data frame read cycle.

Then, the operation 2201 is performed again, to implement polling readout of the pulse data of the pixel unit in the pulse imaging array.

In this embodiment of the present disclosure, a size of the pixel region and/or a length of the data frame read cycle may be determined based on any one or more of factors such as a detection requirement of a business scenario, a size of an output bandwidth, and a detection requirement of a dynamic light intensity range.

This embodiment of the present disclosure provides an implementation solution for reading out pulse data in a multi-row polling manner, a multi-column polling manner, or a multi-row multi-column polling manner. Because only pulse data of partial pixel units in the pulse imaging array is read and output each time in the polling manner, if a quantity of pulse emission times within a short time is excessively large, it can be avoided that a pulse emission event is lost in an output process of the pulse data under the limitation of the output width, and accuracy and integrity of the pulse data are effectively ensured. In addition, this embodiment of the present disclosure uses the implementation solution for reading out pulse data in a multi-row polling manner, a multi-column polling manner, or a multi-row multi-column polling manner. Compared with a single-row polling manner, a pulse emission event within a shorter time interval can be detected, and a maximum detectable light intensity is increased, so that a dynamic range of a pulse sequence image sensor is enlarged, and light intensity information in a scene is more completely captured and recorded.

In some implementations, the pulse data readout method in the embodiments of the present disclosure further includes: Each pixel unit in the pulse imaging array converts the received optical signal into the electrical signal and performs accumulation, and when electrical signals accumulated (that is, a quantity of the electrical signals accumulated) reach a preset threshold, generates a pulse signal, and performs reset to implement accumulation again.

Correspondingly, in the operation 2202, whether each pixel unit in the target pixel region generates the pulse signal within a corresponding data frame cycle is learned, to determine and output pulse data of each pixel unit within the corresponding data frame cycle.

Based on this embodiment, each pixel unit in the pulse imaging array may continuously perform optical signal acquisition, photoelectric conversion, and accumulation, and when the electrical signals accumulated reach the preset threshold, generate a pulse signal, and also read out the pulse data of each pixel unit in the target pixel region in parallel.

In some implementations, when one pixel region determined each time in the operation 2201 needs to include p rows of pixel units, p rows of pixel units may be determined from the pulse imaging array, where at least two rows in the p rows are not adjacent in the pulse imaging array.

Alternatively, in some implementations, when one pixel region determined each time in the operation 2201 needs to include q columns of pixel units, q columns of pixel units may be determined from the pulse imaging array, where at least two columns in the q columns are not adjacent in the pulse imaging array.

Alternatively, in some implementations, when one pixel region determined each time in the operation 2201 needs to include p rows and q columns of pixel units, p rows and q columns of corresponding pixel units may be determined from the pulse imaging array, where at least two rows in the p rows are not adjacent in the pulse imaging array, and/or at least two columns in the q columns are not adjacent in the pulse imaging array.

In this embodiment of the present disclosure, a specific rule of determining p rows of pixel units, q columns of pixel units, and p rows and q columns of corresponding pixel units as the target pixel region each time is not limited.

For example, a polling manner of two rows of pixel units is used as an example. That is, p is 2. Row numbers of two rows of pixel units determined as one pixel region each time may be denoted as i and $\Delta n$, where $0<\Delta n<m$, $\Delta n$ may be determined according to '$(\Delta n+i)$ mod m', and '$(\Delta n+i)$ mod m' represents a remainder of $(\Delta n+i)$ divided by m. In an initial state, i=0. In this case, two rows of pixel units determined from the pulse imaging array for the first time are a 0-th row of pixel units and a $\Delta n$-th row of pixel units. After 104 is operated to reach out pulse data of the two rows of pixel units, i=i+1 is assigned. That is, 1 is added to a value of i. Then, $\Delta n$ is determined according to '$(\Delta n+i)$mod m', and 104 is operated to read out the pulse data of the two rows of pixel units. By analogy, an i-th row of pixel units and a $\Delta n$-th row of pixel units are determined as the target pixel region in a polling manner of sequentially assigning i=i+1 and read out the pulse data. When i=m−1, i is set to 0, and the pulse data of the 0-th row of pixel units and the $\Delta n$-th row of pixel units starts to be read out again, so that the pulse data of each row of pixels elements is read out. During specific implementation, assuming that m=200, n=100, and $\Delta n$=5, a value of i and numbers of two rows for polling readout each time are respectively: i=0, 0, 5; i=1, 1, 6; i=2, 2, 7; . . . ; i=13, 13, 18; . . . ; i=199, 199, 4; . . . .

In some implementations, differences between adjacent row numbers in the determined p rows are sequentially $\Delta n_1, \ldots,$ and $\Delta n_{1-q}$, where values of $\Delta n_1, \ldots,$ and $\Delta n_{1-q}$ are each an integer not less than 0, and the values of $\Delta n_1, \ldots,$ and $\Delta n_{1-q}$ are not the same, partially the same, or completely the same. That is, the p rows in the pulse imaging array are not adjacent, partially adjacent, or sequentially adjacent. When the row numbers of the p rows in the pulse imaging array are closest and are not adjacent or partially not adjacent, quantities of rows between the two rows with the closest row numbers may be the same, partially the same, or completely different. This is not limited in this embodiment of the present disclosure. For example, during specific implementation, when the value of p is 6, differences between adjacent row numbers in the determined 6 rows may be sequentially 2, 4, 6, 8, and 16.

In some implementations, differences between adjacent column numbers in the determined q columns are sequentially $\Delta n_1, \ldots,$ and $\Delta n_{1-q}$, where values of $\Delta n_1, \ldots,$ and $\Delta n_{1-q}$ are each an integer not less than 0, and the values of $\Delta n_1, \ldots,$ and $\Delta n_{1-q}$ are not the same, partially the same, or completely the same. That is, the q columns in the pulse imaging array are not adjacent, partially adjacent, or sequentially adjacent. When the column numbers of the q columns in the pulse imaging array are closest and are not adjacent or partially not adjacent, quantities of columns between the two columns with the closest column numbers may be the same, partially the same, or completely different. This is not limited in this embodiment of the present disclosure. For example, during specific implementation, when the value of q is 3, differences between adjacent column numbers in the determined 3 columns may be sequentially 1, 2, and 3.

Figure 23:
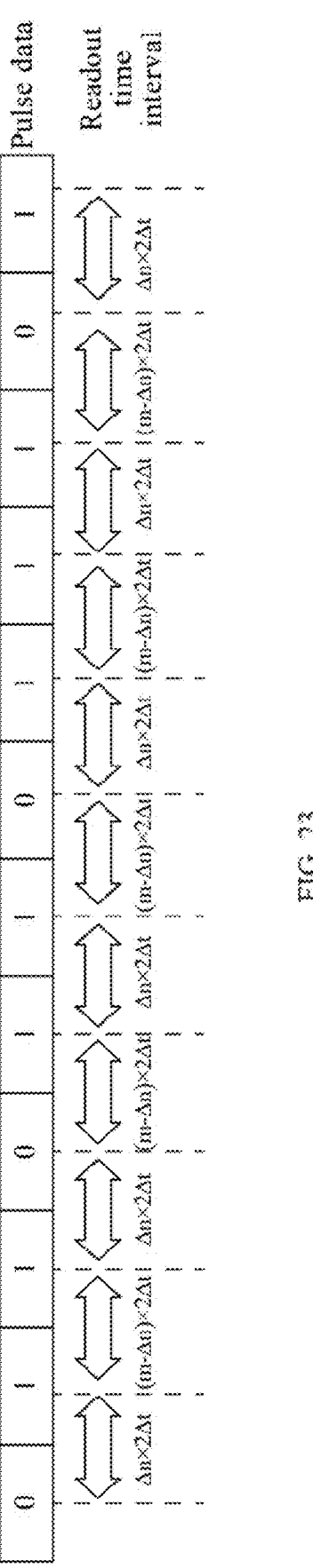
FIG. 23 is a timing diagram of signals in a pulse data readout process according to an embodiment of the present disclosure.

Assuming that time for reading pulse data of one row of pixel units (that is, a data frame cycle) is $\Delta t$, when the value of p is 2, pulse data of two rows of pixel units needs to be read in a polling manner each time, so that time for polling read is $2\Delta t$. A $\Delta t$-th row of pixel units are used as an example. When i=0, pulse data of the $\Delta t$-th row of pixel units is read out once. When i=$\Delta t$, the pulse data of the $\Delta t$-th row of pixel units is read out again. After time $(m-\Delta n)\times 2\Delta t$, the pulse data of the $\Delta t$-th row of pixel units is read out. Therefore, readout time intervals of the pulse data of the $\Delta t$-th row of pixel units are respectively $\Delta n\times 2\Delta t$ and $(m-\Delta n)\times 2\Delta t$. FIG. 23 is a schematic diagram of readout time interval distribution of pulse data of a pixel unit according to an embodiment of the present disclosure. FIG. 23 shows readout time interval distribution of pulse data of the pulse imaging array in the present disclosure in an example of polling of two rows of pixel units.

Assuming that m=1000, $\Delta n$=10, and $\Delta t$=10 ns, in a single-row polling manner, a time interval between two adjacent times of readout of pulse data of a single pixel unit is specified to m×$\Delta t$=10 μs. In this case, a maximum light intensity of a preset electrical signal threshold accumulated within 10 μs can be detected. In a polling manner of two rows of pixel units in this embodiment of the present disclosure, under a same output bandwidth, two time intervals between two adjacent times of readout of a single pixel are respectively $\Delta n\times 2\Delta t$=200 ns and $(m-\Delta n)\times 2\Delta t$=19.8 μs. That is, a maximum light intensity of a preset electrical signal threshold accumulated within 200 ns can be detected. In the single-row polling manner, the maximum detectable light intensity is increased by 50 times. A minimum detectable light intensity is determined based on a dark current in the pixel unit. This is the same in the single-row polling manner and the polling manner of two rows of pixel units. Therefore, in the polling manner of two rows of pixel units in this embodiment of the present disclosure, a dynamic range is remarkably increased. Especially in a scenario such as explosion with a high requirement for instant light intensity detection, a good capturing and recording effect can be implemented.

In the foregoing example of the polling manner of two rows of pixel units, the time intervals between two adjacent times of readout of a single pixel may be greatly different. The maximum light intensity detected within the readout time interval of 200 ns is 50 times of the light intensity detected within the readout time interval of 19.8 µs, but an intermediate light intensity cannot be detected, causing high discontinuity between actually detected light intensities. Based on this embodiment, a plurality of rows of pixel units, a plurality of columns of pixel units, or a plurality rows and a plurality of columns of pixel units may be polled once, a value of p is greater than 2 or a value of q is greater than 2, the plurality of rows are spaced by a specific quantity of rows, and the plurality of columns are spaced by a specific quantity of columns, so that a difference between readout time intervals of the single pixel in the entire polling process can be reduced, and discontinuity between light intensities can be effectively reduced.

When values of differences $\Delta m_1, \ldots,$ and $\Delta m_{p-1}$ between adjacent row numbers of p rows are not the same or are partially the same, or when values of differences $\Delta n_1, \ldots,$ and $\Delta n_{1-q}$ between adjacent column numbers of q columns are not the same or are partially the same, readout time intervals of the single pixel in the entire process may be different, so that a specific dynamic range can be ensured.

In a specific implementation process, the value of the quantity p of rows of one pixel region during each polling and/or the values of the differences $\Delta m_1, \ldots,$ and $\Delta m_{p-1}$ between adjacent row numbers of the p rows, or the value of the quantity q of columns and/or the values of the differences $\Delta n_1, \ldots,$ and $\Delta n_{1-q}$ between adjacent column numbers of the q columns may be determined based on a requirement for the dynamic range. This is not limited in this embodiment of the present disclosure.

In some implementations, when one pixel region determined each time in the operation 2201 includes p rows of pixel units, pulse data of one row of pixel units in the p rows of pixel units within a data frame read cycle may be sequentially obtained and output in the operation 2202. In this way, pulse data of each row of pixel units in the p rows of pixel units is correspondingly obtained and output within each data frame read cycle, and time for obtaining and outputting pulse data of the p rows of pixel units is p data frame read cycles.

Alternatively, in some implementations, when one pixel region determined each time in the operation 2201 includes q columns of pixel units, pulse data of one column of pixel units in the q columns of pixel units within a data frame read cycle is sequentially obtained and output in the operation 2202. In this way, pulse data of each column of pixel units in the q columns of pixel units is correspondingly obtained and output within each data frame read cycle, and time for obtaining and outputting pulse data of the q columns of pixel units is q data frame read cycles.

Alternatively, in some implementations, when one pixel region determined each time in the operation 2201 includes p rows and q columns of pixel units, pulse data of one row of pixel units or one column of pixel units in the p rows and q columns of pixel units within a data frame read cycle is sequentially obtained and output in the operation 2202. In this way, pulse data of each row or column of pixel units in the p rows and q columns of pixel units is correspondingly obtained and output within each data frame read cycle, and time for obtaining and outputting pulse data of the p rows and q columns of pixel units is p or q data frame read cycles.

Figure 24:
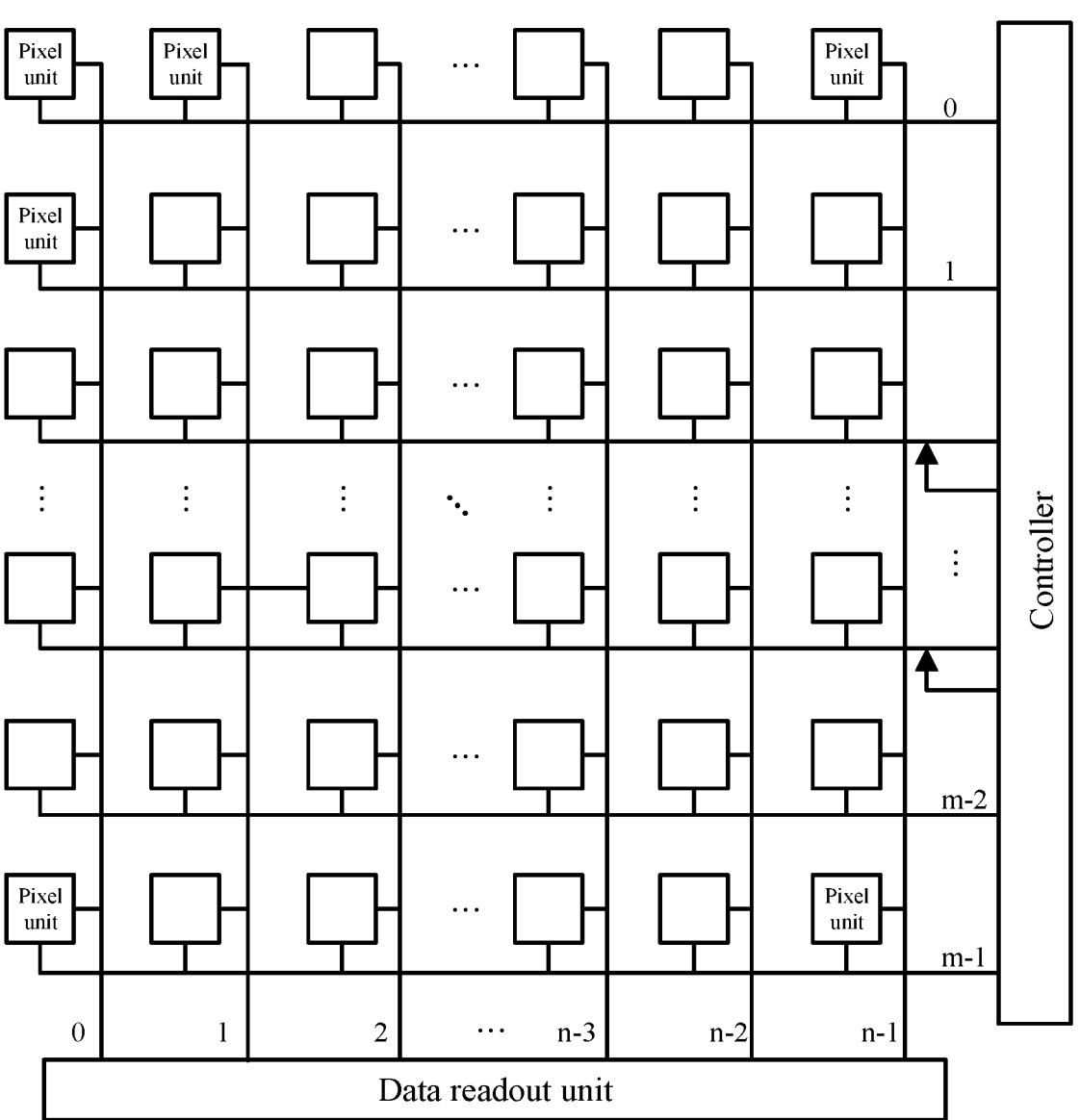
FIG. 24 is a schematic diagram of an implementation of sequentially obtaining pulse data of a row of pixel units according to an embodiment of the present disclosure.

FIG. 24 is a schematic diagram of an implementation of sequentially obtaining pulse data of a row of pixel units according to an embodiment of the present disclosure. As shown in FIG. 24, the pulse imaging array includes m*n pixel units arranged in m rows and n columns. Each pixel unit converts the received optical signal into the electrical signal and performs accumulation, and when electrical signals accumulated reach a preset threshold, generates a pulse signal, and performs reset to implement accumulation again. A row of pixel units in the p rows of pulse data to be read may be sequentially gated by a controller within a data frame read cycle after the p rows of pixel units to be read are determined each time. Then, pulse data of the gated row of pixel units within the data frame read cycle is read by a data readout unit.

Based on this embodiment, because one row or column of pixel units are gated each time for reading pulse data, only one controller and one data readout unit need to be disposed for the pulse imaging array. A circuit structure can be simplified, and a circuit size can be reduced, to achieve circuit miniaturization.

In some implementations, when one pixel region determined each time in the operation 2201 includes p rows of pixel units, pulse data of a selected row of pixel units in the p rows of pixel units within a data frame read cycle may be obtained and output by p data readout units in parallel in the operation 2202. That is, a quantity of data readout units is the same as a quantity of rows in one pixel region determined each time, and each data readout unit in the p data readout units corresponds to one row of pixel units. In this way, pulse data of the p rows of pixel units may be read out by the p data readout units in parallel within a data frame read cycle, so that pulse data readout efficiency is improved.

Alternatively, in some implementations, when one pixel region determined each time in the operation 2201 includes p rows of pixel units, pulse data of P rows of pixel units in the p rows of pixel units may be sequentially obtained and output within a data frame read cycle by P data readout units in parallel in a polling manner of P rows of pixel units in the operation 2202. A value of P is an integer greater than 1, a value of p is k times of the value of P, and a value of k is an integer greater than 1. That is, a quantity of rows in one pixel region determined each time is k times of the quantity of data readout units. The P data readout units read out pulse data of the p rows of pixel units in a manner of reading in parallel within a data frame read cycle and performing k times of polling within k data frame read cycles. Each data readout unit in the P data readout units polls k rows of pixel units in the p rows of pixel units within the k data frame read cycles respectively. The P data readout units may read out pulse data of the p rows of pixel units within the k data frame read cycles. A small quantity of data readout units may be disposed to save a circuit structure, and pulse data readout efficiency is improved.

Alternatively, in some implementations, when one pixel region determined each time in the operation 2201 includes q columns of pixel units, pulse data of a corresponding column of pixel units in the q columns of pixel units within a data frame read cycle may be obtained and output by q data readout units in parallel in the operation 2202. That is, a quantity of data readout units is the same as a quantity of columns in one pixel region determined each time, and each data readout unit in the q data readout units corresponds to one column of pixel units. In this way, pulse data of the q columns of pixel units may be read out within a data frame read cycle by the q data readout units in parallel, so that pulse data readout efficiency is improved.

Alternatively, in some implementations, when one pixel region determined each time in the operation 2201 includes q columns of pixel units, pulse data of Q columns of pixel units in the q columns of pixel units may be sequentially obtained and output within a data frame read cycle by Q data readout units in parallel in a polling manner of Q columns of pixel units in the operation 2202. A value of Q is an integer greater than 1, a value of q is s times of the value of Q, and a value of s is an integer greater than 1. That is, a quantity of columns in one pixel region determined each time is s times of the quantity of data readout units. The Q data readout units read out pulse data of the q columns of pixel units in a manner of reading in parallel within a data frame read cycle and performing s times of polling within s data frame read cycles. Each data readout unit in the Q data readout units polls s columns of pixel units in the q columns of pixel units within the s data frame read cycles respectively. The Q data readout units may read out pulse data of the q columns of pixel units within the s data frame read cycles. A small quantity of data readout units may be disposed to save a circuit structure, and pulse data readout efficiency is improved.

Alternatively, in some implementations, when one pixel region determined each time in the operation 2201 includes p rows and q columns of pixel units, pulse data of a selected row of pixel units in the p rows and q columns of pixel units within a data frame read cycle may be obtained and output by p data readout units in parallel in the operation 2202. That is, a quantity of data readout units is the same as a quantity of rows in one pixel region determined each time, and each data readout unit in the p data readout units corresponds to one row of pixel units. In this way, pulse data of the p rows and q columns of pixel units may be read out within a data frame read cycle by the p data readout units in parallel, so that pulse data readout efficiency is improved.

Alternatively, in some implementations, when one pixel region determined each time in the operation 2201 includes p rows and q columns of pixel units, pulse data of P rows of pixel units in the p rows and q columns of pixel units may be sequentially obtained and output by P data readout units within a data frame read cycle in parallel in a polling manner of the P rows of pixel units in the operation 2202. A value of P is an integer greater than 1, a value of p is k times of the value of P, and a value of k is an integer greater than 1. That is, a quantity of rows in one pixel region determined each time is k times of the quantity of data readout units. The P data readout units read out pulse data of the p rows and q columns of pixel units in a manner of reading in parallel within a data frame read cycle and performing k times of polling within k data frame read cycles. Each data readout unit in the P data readout units polls k rows of pixel units in the p rows and q columns of pixel units within the k data frame read cycles respectively. The P data readout units may read out pulse data of the p rows and q columns of pixel units within the k data frame read cycles. A small quantity of data readout units may be disposed to save a circuit structure, and pulse data readout efficiency is improved.

Alternatively, in some implementations, when one pixel region determined each time in the operation 2201 includes p rows and q columns of pixel units, pulse data of a corresponding column of pixel units in the p rows and q columns of pixel units within a data frame read cycle may be obtained and output by q data readout units in parallel in the operation 2202. That is, a quantity of data readout units is the same as a quantity of columns in one pixel region determined each time, and each data readout unit in the q data readout units corresponds to one column of pixel units. In this way, pulse data of the p rows and q columns of pixel units may be read out by the q data readout units in parallel within a data frame read cycle, so that pulse data readout efficiency is improved.

Alternatively, in some implementations, when one pixel region determined each time in the operation 2201 includes p rows and q columns of pixel units, pulse data of Q columns of pixel units in the p rows and q columns of pixel units within a data frame read cycle may be sequentially obtained and output within the data frame read cycle by Q data readout units in parallel in a polling manner of Q columns of pixel units in the operation 2202. A value of Q is an integer greater than 1, a value of q is s times of the value of Q, and a value of s is an integer greater than 1. That is, a quantity of columns in one pixel region determined each time is s times of the quantity of data readout units. The Q data readout units read out pulse data of the p rows and q columns of pixel units in a manner of reading in parallel within a data frame read cycle and performing s times of polling within s data frame read cycles. Each data readout unit in the Q data readout units polls q columns of pixel units in the p rows and q columns of pixel units within the s data frame read cycles respectively. The Q data readout units may read out pulse data of the p rows and q columns of pixel units within the s data frame read cycles. A small quantity of data readout units may be disposed to save a circuit structure, and pulse data readout efficiency is improved.

In the implementation shown in FIG. 24, a row of pixel units in the p rows of pulse data to be read may be sequentially gated, and pulse data of the row of pixel units within the data frame read cycle is read, so that a pulse data readout speed is affected. Based on this embodiment, a plurality of data readout units may be disposed, a plurality of rows or columns may be gated once, and pulse data of the plurality of gated rows or columns of pixel units is read by the plurality of data readout units in parallel, so that a pulse data readout speed can be increased.

Figure 25:
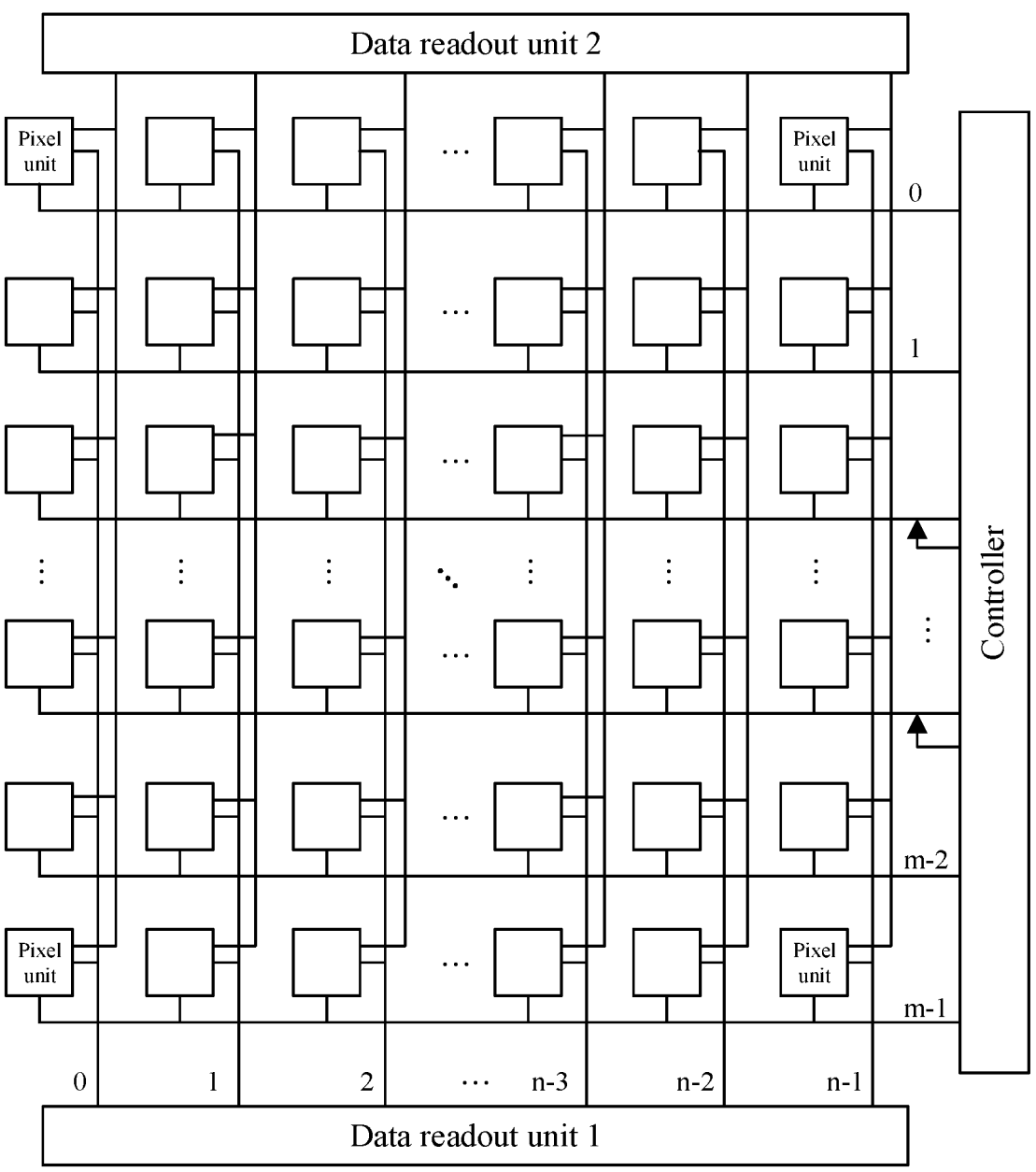
FIG. 25 is a schematic diagram of an implementation of obtaining pulse data of a plurality of rows of pixel units in parallel according to an embodiment of the present disclosure.

FIG. 25 is a schematic diagram of an implementation of obtaining pulse data of a plurality of rows of pixel units in parallel according to an embodiment of the present disclosure. FIG. 25 merely shows an example in which pulse data of two gates rows or a plurality of gated columns of pixel units is read by two data readout units in parallel. A plurality of column lines are led out of each pixel unit. Each row of pixel units are gated by a controller. Pulse data of the pixel units in the rows gated by the two data readout units in parallel is output.

Figure 26:
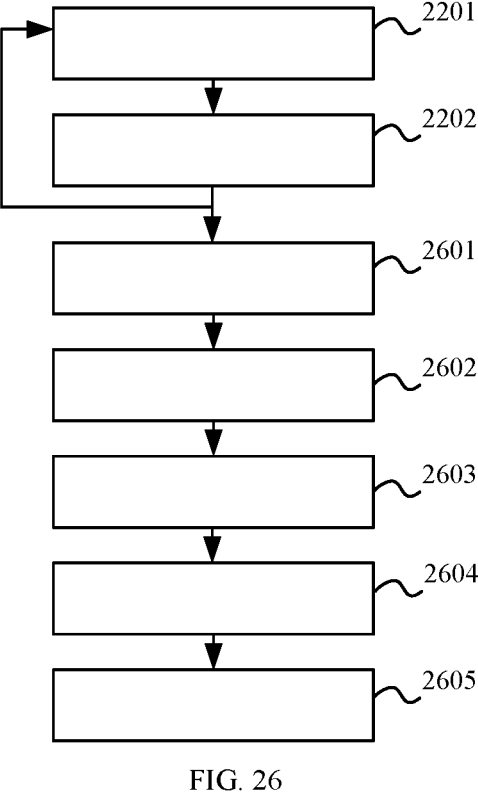
FIG. 26 is a flowchart of another pulse data readout method according to an embodiment of the present disclosure.

FIG. 26 is a flowchart of another embodiment of a pulse data readout method according to the present disclosure. As shown in FIG. 26, based on any one of the embodiments shown in FIG. 22 to FIG. 25, in this embodiment, after the operation 2202, the method may further include the following step.

Step 2601: Respectively align output pulse data of each pixel unit to a corresponding pixel unit in a pulse imaging array, to form a pulse data sequence of each pixel unit in the pulse imaging array.

Figure 27:
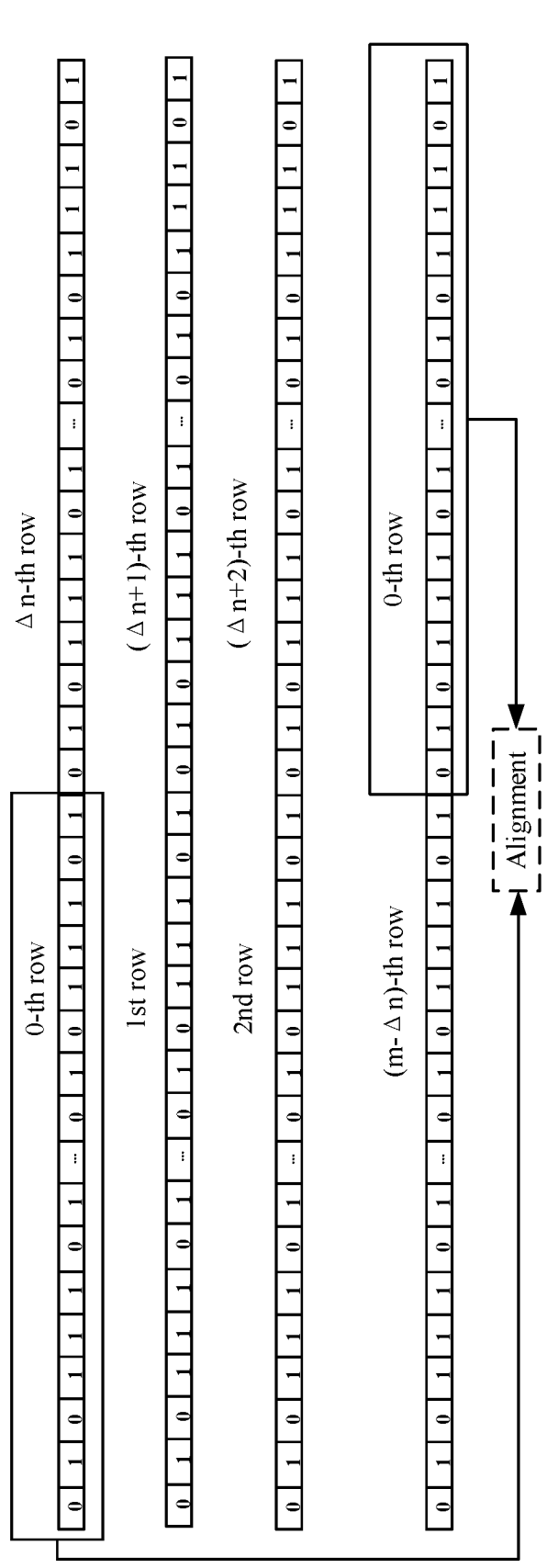
FIG. 27 is a schematic diagram of pulse data alignment according to an embodiment of the present disclosure.

FIG. 27 is a schematic diagram of pulse data alignment according to an embodiment of the present disclosure. FIG. 26 shows an example in which pulse data of two rows of pixel units is read out during each polling. Because the pulse data of the two rows of pixel units is read out each time, pulse data of each row of pixel units is alternately presented. With reference to the foregoing example, pulse data of a 0-th row of pixel units is read out once during first polling, and read out again during (m−Δn)-th polling. In this case, first half (corresponding to the 0-th row) of pulse data read out during the first polling and second half (corresponding to the 0-th row) of pulse data read out during the (m−Δn)-th polling are aligned to the 0-th row.

Based on this embodiment, the output pulse data of each pixel unit is respectively aligned to the corresponding pixel unit in the pulse imaging array, so that the pulse data sequence of each pixel unit in the pulse imaging array can be obtained to be subsequently applied to image reconstruction, object detection, and the like.

In addition, still referring to FIG. 26, in a further embodiment, after the pulse data sequence of each pixel unit in the pulse imaging array is formed in the operation 2201, the method may further include the following step.

Step 2602: With each pixel unit in the pulse imaging array as a target pixel unit, obtain a time interval between two adjacent pieces of pulse data for representing pulse signal generation of a pixel unit in the pulse data sequence of the target pixel unit.

As described above, in this embodiment of the present disclosure, readout time intervals of single pixel units in the entire polling process may be not the same or not completely the same. During specific implementation, assuming that a binary character 1 indicates pulse data of pulse signal generation, a time interval between two adjacent pieces of pulse data 1 of the pixel unit may be obtained in the operation 2602.

Step 2603: Determine, based on the foregoing time interval, a light intensity of the target pixel unit within the time interval.

The readout time intervals of single pixel units in the entire polling process may be not the same or not completely the same. Therefore, in some implementations, when a light intensity of each pixel unit within the time interval is determined, the pixel unit may convert, based on the pulse data sequence of the pixel unit and a dynamic change rule of the pulse data sequence, the time interval between two adjacent pieces of pulse data (that is, two adjacent ones) for representing pulse signal generation of the pixel unit into a basic time interval (for example, a length of a data frame read cycle or a minimum time interval between two adjacent ones in the pulse data sequence corresponding to the entire pulse imaging array). For example, if last five pieces of pulse data in a pulse data sequence of a pixel unit are all ones, a time interval between the pulse data 1 and latest pulse data 1 may be converted into a basic time interval, and then a ratio of 1 to the basic time interval is obtained as the light intensity of the pixel unit within the foregoing time interval. Alternatively, the light intensity of the pixel unit within the foregoing time interval may be obtained according to G=1× Gmax/t, where G indicates the light intensity, Gmax indicates a light intensity corresponding to a minimum time interval between two adjacent ones in the pulse data sequence of the pixel unit, and t indicates a length of the basic time interval.

Alternatively, in some other implementations, each pixel unit may determine a readout time interval distribution sequence (including r continuous readout time intervals determined in a window sliding manner, where r is an integer greater than 2) in a window sliding manner. If pieces of pulse data that are in the pulse data sequence and that correspond to the readout time interval distribution sequence are all ones, it indicates that an optical signal within a time period corresponding to the readout time interval distribution sequence is in a highest state. In this case, when the readout time intervals in the readout time interval distribution sequence are not the same or not completely the same, a shortest readout time interval in the readout time interval distribution sequence may be used as another readout time interval in the readout time interval distribution sequence, and then a ratio of 1 to the shortest readout time interval is obtained as a light intensity of the pixel unit within another readout time interval; or a light intensity corresponding to the shortest readout time interval is directly used as a light intensity of the pixel unit within another readout time interval.

Step 2604: Perform image reconstruction based on the light intensity of each pixel unit in the pulse imaging array within each time interval, to obtain a reconstructed image sequence, where the reconstructed image sequence includes a plurality of reconstructed images based on a sequential relationship.

A gray value of each pixel in a reconstructed image is a light intensity of a corresponding pixel unit.

In some implementations, for example, image reconstruction may be performed by using an interspike interval (ISI)-based pulse reconstruction algorithm (TFI), a fixed window sliding-based pulse reconstruction algorithm (TFP), a convolutional neural network (CNN)-based pulse reconstruction algorithm, or the like. The applied pulse reconstruction algorithm is not limited in this embodiment of the present disclosure.

In this embodiment of the present disclosure, the readout time intervals of the single pixel units in the entire polling process may be not the same or not completely the same. Therefore, the light intensity of each pixel unit within the time interval may be determined for the different time intervals and the pulse data sequence, to perform image reconstruction.

In addition, still referring to FIG. 5A, in a further embodiment, after the reconstructed image sequence is obtained in the operation 2604, the method may further include the following step.

Step 2605: Perform object detection based on the reconstructed image sequence to obtain an object detection result.

Optionally, in some implementations, object detection may be performed based on gray values in the reconstructed image sequence and a distribution rule of the grayscale values, or object detection may be performed on the reconstructed image sequence by using a CNN obtained through pre-training, where the CNN may be obtained through pre-training based on a sample image sequence including an object to be detected.

Based on this embodiment, object detection may be performed on the reconstructed image sequence.

Alternatively, in another embodiment of the pulse data readout method of the present disclosure, after the pulse data sequence of each pixel unit in the pulse imaging array is formed in the operation 2601, the method may further include:

performing object detection based on the pulse data sequence of the pixel units in the pulse imaging array by using a spiking neural network (SNN) obtained through pre-training, to obtain the object detection result, where the SNN may be obtained through pre-training based on a sample pulse data sequence including an object to be detected.

Based on this embodiment, object detection may be directly performed based on the pulse data sequence of the pulse imaging array, and image reconstruction is not needed, so that consumption of computation resources is reduced, and object detection efficiency is improved.

Figure 28:
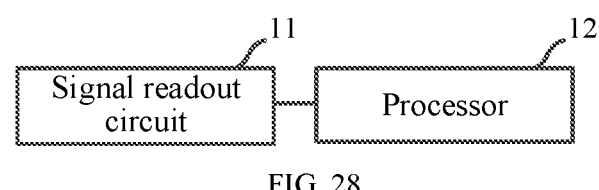
FIG. 28 is a schematic diagram of a structure of a signal processing system with a signal readout circuit according to an embodiment of the present disclosure.

In another embodiment of the present disclosure, FIG. 28 is a schematic diagram of a structure of a signal processing system with a signal readout circuit according to an embodiment of the present disclosure. The signal processing system includes the foregoing signal readout circuit 11 and a processor 12.

The signal readout circuit 11 is configured to transmit a generated signal of a pixel unit in a pixel array 201 to the processor 12 in a specified sending mode.

The processor 12 is configured to determine the specified sending mode used by the signal readout circuit 11, position the pixel unit, receive the corresponding signal of the pixel unit, and reconstruct an image based on the signal of the pixel unit and a location of the pixel unit; or perform detection based on the location of the pixel unit by using the corresponding signal of the pixel unit.

Specifically, when a pixel subarray readout feedback circuit in the signal readout circuit 11 is a region readout feedback circuit or a column-level readout feedback circuit, there are different sending modes for sending signals of pixel units: When the pixel subarray readout feedback circuit is the region readout feedback circuit, signals of pixel units in a region are sent according to a preset sending sequence in the region, and the processor 12 receives signals of pixel units in each region, and then performs convergence to obtain signals of pixel units in the entire pixel array; or when the pixel subarray readout feedback circuit is the column-level readout feedback circuit, signals of pixel units in a specified column are sent in a column-level unit according to a preset sending sequence in the specified column, and the processor 12 receives signals of pixel units in each column, and then performs convergence to obtain signals of pixel units in the entire pixel array.

Therefore, to position a pixel unit that sends the received signal of the pixel unit, the processor 12 further needs to determine the specified sending mode used by the signal readout circuit 11, to adaptively receive the signal of the pixel unit, position each pixel unit, and make a preparation for subsequent image reconstruction of the pixel array or subsequent detection of the pixel array.

In the foregoing system, after receiving and converging the signals of the pixel units in the pixel array, the processor 12 can reconstruct an image and then perform subsequent detection and another processing; or can directly perform detection by using the signals.

Specifically, the first mode of image reconstruction: The signals of the pixel units in the pixel array are converted into an image in a specified image format, and then subsequent detection and another processing are performed. Herein, there are two manners for converting the signals into the image in the specified image format. In one manner, a signal emission interval of each pixel unit is converted into multi-bit data, to reconstruct the image. In the other manner, a signal emission quantity of the pixel unit is converted into multi-bit data within a specified time period, to reconstruct the image.

The second mode of direct detection application: For example, a signal emission frequency of each pixel unit is regarded as brightness of the pixel unit in the image, the image is not reconstructed, and a signal emission frequency of each pixel unit is obtained to perform brightness detection application.

In another embodiment of the present disclosure, a device with a signal readout circuit is further provided, and is applied to imaging of an image sensor. The device includes the foregoing signal readout circuit, and/or the foregoing pixel unit array circuit, and/or a chip with the foregoing pixel unit array circuit.

Specifically, the device includes at least one of the following: a camera device, a camera, an audio/video player, a navigation device, a position-fixed terminal, an entertainment device, a smart phone, a communication device, a mobile device, a transportation or transport facility, an industrial device, a medical device, a security device, a flight device, and a household appliance.

In this embodiment of the present disclosure, the camera device includes but is not limited to a pulse camera, a high-speed camera, an industrial detection camera, and the like. The camera includes but is not limited to: a vehicle-mounted camera, a mobile phone camera, a traffic camera, a camera mounted on a flying object, a medical camera, a security camera, or a household appliance camera.

Figure 29:
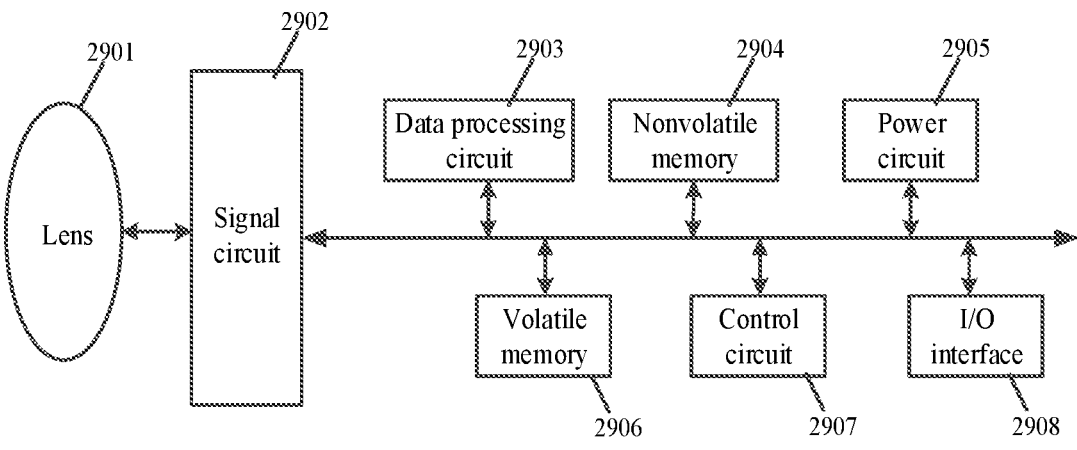
FIG. 29 is a schematic diagram of a structure of a pulse camera according to an embodiment of the present disclosure.

The device provided in this embodiment of the present disclosure is described in detail by using an example of the pulse camera. FIG. 29 is a schematic diagram of a structure of a pulse camera according to an embodiment of the present disclosure. As shown in FIG. 29, the pulse camera includes a lens 2901, a signal circuit 2902, a data processing circuit 2903, a nonvolatile memory 2904, a power circuit 2905, a volatile memory 2906, a control circuit 2907, and an I/O interface 2908.

The lens 2901 is configured to receive incident light from a photographed object, that is, an optical signal.

The signal circuit 2902 is configured to convert the optical signal into an electrical signal and generate a signal based on the electrical signal, where the optical signal is received by using the lens 2901. For example, the signal circuit 2902 includes the foregoing signal readout circuit, and/or the foregoing pixel unit array circuit, and/or a chip with the foregoing pixel unit array circuit.

The data processing circuit 2903 is configured to control a signal readout process. For example, the data processing circuit 2903 includes an operation processing unit (for example, a CPU) and/or a graph processing unit (GPU). For example, the data processing circuit controls a signal readout process of the signal readout circuit, and controls a readout row selector to send a row readout signal and a reset row selector to send a reset signal, and the like.

The volatile memory 2906 is, for example, a random access memory (RAM). The nonvolatile memory 2904 is, for example, a solid state disk (SSD), a hybrid hard disk (HHD), a secure digital (SD) card, or a mini SD card.

According to an embodiment of the present disclosure, the pulse camera further includes a display unit, configured to perform real-time display/playback on signal/image information. The pulse camera in this embodiment of the present disclosure may further include at least one of the following: a wired/wireless transmission interface, for example, a Wi-Fi interface, a Bluetooth interface, a USB interface, an RJ45 interface, a mobile industry processor interface (MIPI), a low-voltage differential signaling (LVDS) interface, and another interface with a wired or wireless transmission function.

The pulse camera in this embodiment of the present disclosure can be configured to detect visible light, infrared light, ultraviolet light, X-ray, and the like, and can be applied to various scenarios. The common scenarios include but are not limited to:

For example, the pulse camera may be used as a vehicle-mounted camera and mounted in a transportation or transport facility, and is, for example, configured to perform information obtaining and control on cooperative vehicle infrastructure, intelligent transportation, and self-driving. For example, the pulse camera is used as a high-speed train traffic recorder and mounted on a rail traffic line or a rail vehicle such as a high-speed train. The pulse camera may alternatively be mounted in a self-driving vehicle or a vehicle with an advanced driver assistance system (ADAS), and is, for example, configured to perform information detection and alarm on vehicles, pedestrians, lanes, drivers, and the like.

The pulse camera may be used as a traffic camera and mounted on a traffic signal pole, to perform photographing, early warning, and cooperative control, and the like on vehicles and pedestrians on urban roads and expressways.

The pulse camera may be used as an industrial detection camera and is, for example, mounted on a high-speed rail traffic line for high-speed line patrol and high-speed rail safety detection. The pulse camera may alternatively be used for detection, early warning, and the line in specific industrial scenarios, for example, fracture detection of a coal mine conveyor belt, arc detection of a transformer substation, real-time detection of a wind turbine blade, and non-stop detection of a high-speed turbine.

The pulse camera is mounted on a flying object, for example, an airplane and a satellite, and is configured to perform high-definition imaging on the object in a high-speed flight scenario or even a high-speed rotation scenario.

The pulse camera may be used for industry (machine vision in intelligent manufacturing and the like), civil use (judicial evidence collection, sports penalty, and the like), and consumer electronics (a camera, film and television media, and the like).

The pulse camera may be used as a medical camera, to perform high-definition medical imaging in clinical diagnosis and treatment such as medical treatment, cosmetology, and health care.

The pulse camera may be used as a sports camera or a wearable camera, for example, a head-mounted camera or a camera embedded in a watch, and can perform photographing in various scenarios such as sports competition and daily leisure sports.

The pulse camera may alternatively be used as a security camera, a mobile phone camera, a household appliance camera, or the like.

The flowcharts and block diagrams in the accompanying drawings of the present disclosure illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram or the flowchart, and a combination of the blocks in the block diagram or the flowchart may be implemented by a dedicated hardware-based system that executes specified functions or operations, or may be implemented by a combination of dedicated hardware and computer instructions.

Those skilled in the art can understand that the characteristics described in the various embodiments and/or claims of the present disclosure may be integrated and/or combined in various manners, even if such integration or combination is not expressly stated in the present disclosure. Especially, the characteristics described in the various embodiments and/or claims of the present disclosure may be integrated and/or combined in various manners without departing from the spirit and teaching of the present disclosure, and such integration and/or combination all fall within the scope of the present disclosure.

The principle and implementation of the present disclosure have been illustrated with reference to the specific embodiments in this specification, and the above illustration of the embodiments is merely for the purpose of assisting in understanding the method of the present disclosure and its core concept, and is not used to limit the present disclosure. Those skilled in the art can make variations to the specific implementation and the application scope according to the concept, spirit, and principle of the present disclosure. Any modifications, equivalent replacements, improvements, and the like made by those skilled in the art shall all fall within the protection scope of the present disclosure.

What is claimed is:

1. A signal readout circuit, comprising:

a pixel array;

a readout row selector circuit;

a reset row selector circuit; and at least one pixel subarray readout feedback circuit;

wherein the pixel array comprises at least one pixel subarray, and each pixel subarray is electrically connected to a corresponding pixel subarray readout feedback circuit in the at least one pixel subarray readout feedback circuit;

wherein the readout row selector circuit is configured to send a row readout signal to a selected row of pixel units in the pixel array, to gate the selected row of pixel units;

wherein the reset row selector circuit is configured to send a row reset signal to the selected row of pixel units, to gate first reset switches of the selected row of pixel units, the selected row of pixel units comprise a first pixel unit, and the first pixel unit is configured to convert an optical signal into an electrical signal, and output the electrical signal to the corresponding pixel subarray readout feedback circuit;

wherein the corresponding pixel subarray readout feedback circuit is configured to receive the electrical signal from the first pixel unit, and in response to determining based on the electrical signal that a signal generation condition is met;

generate a reset signal and send the reset signal to the first pixel unit, to gate a second reset switch of the first pixel unit, wherein the reset signal and the row reset signal cause the first pixel unit to perform a reset operation, and generate an output signal;

wherein the first pixel unit comprises: a reset signal receiving circuit, a photosensitive integration circuit, and an electrical signal output circuit;

wherein the reset signal receiving circuit is configured to receive the row reset signal to gate the first reset switch, and receive the reset signal to gate the second reset switch for performing the reset operation and to turn on the photosensitive integration circuit;

wherein the photosensitive integration circuit is configured to: in an on state, convert the optical signal into the electrical signal and output the electrical signal to the electrical signal output circuit;

wherein the electrical signal output circuit is configured to: in response to the row readout signal, output the electrical signal to the corresponding pixel subarray readout feedback circuit;

wherein the reset signal receiving circuit comprises a reset signal latch circuit, and the reset signal latch circuit is configured to receive the reset signal from the corresponding pixel subarray readout feedback circuit, latch the reset signal in response to the row reset signal, and reset the photosensitive integration circuit in an effective duration of the row reset signal; and wherein the electrical signal output circuit is configured to: in response to the row readout signal, output the electrical signal to the corresponding pixel subarray readout feedback circuit, to cause the corresponding pixel subarray readout feedback circuit to compare the electrical signal with a threshold, and based on a comparison result: (i) generate the reset signal and feed the reset signal back to the reset signal latch circuit, and (ii) generate the output signal for output.

2. The signal readout circuit according to claim 1, wherein the corresponding pixel subarray readout feedback circuit comprises a region readout feedback circuit, the region readout feedback circuit is electrically connected to pixel units in a specified region in the pixel array, a quantity of columns of the pixel units in the specified region is at least one and is less than or equal to a quantity of columns of pixel units in the pixel array, and a quantity of rows of the pixel units in the specified region is less than or equal to a quantity of rows of the pixel units in the pixel array.

3. The signal readout circuit according to claim 2, wherein
the region readout feedback circuit is electrically connected to a corresponding column of pixel units, and is configured to receive the electrical signal transmitted by the first pixel unit, and send the reset signal to the first pixel unit; or
the region readout feedback circuit is electrically connected to a plurality of corresponding columns of pixel units, and is configured to receive an electrical signal sent by a second pixel unit in a column different from a column of the first pixel unit, send the reset signal to the first pixel unit at a first moment, and send the reset signal to the second pixel unit at a second moment.

4. The signal readout circuit according to claim 1, wherein the corresponding pixel subarray readout feedback circuit comprises a column-level readout feedback circuit, the column-level readout feedback circuit is electrically connected to at least one specified column of pixel units in the pixel array, and a quantity of rows of the pixel units in the specified column is less than or equal to a quantity of rows of pixel units in the pixel array.

5. The signal readout circuit according to claim 1, wherein the corresponding pixel subarray readout feedback circuit comprises: a comparison circuit, an output circuit, and a multiplexer circuit, wherein
the comparison circuit is configured to receive the electrical signal from the first pixel unit, compare the electrical signal with a threshold signal, and in response to determining that the signal generation condition is met, obtain a comparison result comprising the output signal and the reset signal, and output the comparison result to the output circuit;
the output circuit is configured to latch the comparison result, and output the reset signal in the comparison result to the multiplexer circuit; and the multiplexer circuit is configured to select a link electrically connected to the first pixel unit, and send the reset signal to the first pixel unit over the link.

6. The signal readout circuit according to claim 1, wherein the corresponding pixel subarray readout feedback circuit comprises: a comparator, a signal processing subcircuit, and a threshold electrical signal generation subcircuit, wherein
the comparator is configured to receive the electrical signal from the first pixel unit, obtain a threshold electrical signal of the first pixel unit from the threshold electrical signal generation subcircuit, and in response to the electrical signal being greater than the threshold electrical signal of the first pixel unit, generate the output signal and send the output signal to the signal processing subcircuit;
the signal processing subcircuit is configured to perform statistics on information of the output signal within a time interval, generate, based on a threshold electrical signal generation policy and the information of the output signal obtained within the time interval, a threshold control signal for selecting the threshold electrical signal of the first pixel unit, and send the threshold control signal to the threshold electrical signal generation subcircuit; and
the threshold electrical signal generation subcircuit is configured to: in response to the threshold control signal, obtain the threshold electrical signal of the first pixel unit, and send the threshold electrical signal to the comparator.

7. The signal readout circuit according to claim 6, wherein the corresponding pixel subarray readout feedback circuit further comprises:
a column-level readout feedback subcircuit, electrically connected to at least one column of pixel units in the pixel array, and configured to receive the electrical signal transmitted by the first pixel unit,
wherein the comparator is disposed in the column-level readout feedback subcircuit, and the reset signal is a column reset signal; and
the comparator is further configured to: in response to the electrical signal being greater than the threshold electrical signal of the first pixel unit that is received from the threshold electrical signal generation subcircuit, generate the column reset signal and the output signal, send the column reset signal to the first pixel unit to gate a first reset switch of the first pixel unit, and send the output signal to the signal processing subcircuit.

8. The signal readout circuit according to claim 7, wherein
the threshold electrical signal generation subcircuit is disposed inside the column-level readout feedback subcircuit, and
the threshold electrical signal generation subcircuit in the column-level readout feedback subcircuit is configured to: in response to the threshold control signal, obtain the threshold electrical signal of the first pixel unit, and send the threshold electrical signal to the comparator in the column-level readout feedback subcircuit.

9. The signal readout circuit according to claim 6, wherein the corresponding pixel subarray readout feedback circuit further comprises:
a region readout feedback subcircuit, electrically connected to pixel units in a specified region in the pixel array, and configured to receive the electrical signal from the first pixel unit in the specified region,
wherein the comparator is disposed in the region readout feedback subcircuit; and the comparator is configured to: in response to the electrical signal being greater than the threshold electrical signal of the first pixel unit that is received from the threshold electrical signal generation subcircuit, generate the reset signal and the output signal, send the reset signal to the first pixel unit to gate a first reset switch of the first pixel unit, and send the output signal to the signal processing subcircuit.

10. The signal readout circuit according to claim 9, wherein the threshold electrical signal generation subcircuit is disposed inside or outside the region readout feedback subcircuit, and the threshold electrical signal generation subcircuit in the region readout feedback subcircuit is configured to: based on the threshold control signal, obtain the threshold electrical signal of the first pixel unit, and send the threshold electrical signal to the comparator in the region readout feedback subcircuit.

11. The signal readout circuit according to claim 6, wherein the comparator is disposed inside the first pixel unit; and the comparator in the first pixel unit is further configured to: in response to the electrical signal being greater than the threshold electrical signal of the first pixel unit that is received from the threshold electrical signal generation subcircuit, generate the reset signal and the output signal, and send the output signal to the signal processing subcircuit.

12. The signal readout circuit according to claim 11, wherein the threshold electrical signal generation subcircuit is disposed inside the first pixel unit;

the threshold electrical signal generation subcircuit in the first pixel unit is configured to: based on the threshold control signal, obtain the threshold electrical signal of the first pixel unit, and send the threshold electrical signal to the comparator in the first pixel unit; and the signal readout circuit further comprises a threshold control signal gate, and the threshold control signal gate is configured to send a gating signal of the threshold control signal to the first pixel unit to gate a third switch that is in the first pixel unit and that is configured to receive the threshold control signal, to cause the threshold electrical signal generation subcircuit in the first pixel unit to receive the threshold control signal.

13. A method for a signal readout circuit, wherein the signal readout circuit comprises: a pixel array, a readout row selector circuit, a reset row selector circuit, and at least one pixel subarray readout feedback circuit, wherein the pixel array comprises at least one pixel subarray, each pixel subarray is electrically connected to a corresponding pixel subarray readout feedback circuit in the at least one pixel subarray readout feedback circuit, and the method comprises the following operations:

sending, by the readout row selector circuit, a row readout signal to a selected row of pixel units in the pixel array, to gate the selected row of pixel units;

outputting, by a first pixel unit in the selected row of pixel units, an electrical signal to the corresponding pixel subarray readout feedback circuit, wherein the electrical signal is converted from an optical signal;

receiving, by the corresponding pixel subarray readout feedback circuit, the electrical signal, and in response to determining based on the electrical signal that a signal generation condition is met, generating an output signal, and generating a reset signal and outputting the reset signal to the first pixel unit; and sending, by the reset row selector circuit, a row reset signal to the row of pixel units, to cause the first pixel unit to reset in response to the row reset signal and the reset signal;

wherein the first pixel unit comprises: a reset signal receiving circuit, a photosensitive integration circuit, and an electrical signal output circuit;

wherein the reset signal receiving circuit is configured to receive the row reset signal to gate the first reset switch, and receive the reset signal to gate the second reset switch for performing the reset operation and to turn on the photosensitive integration circuit;

wherein the photosensitive integration circuit is configured to: in an on state, convert the optical signal into the electrical signal and output the electrical signal to the electrical signal output circuit;

wherein the electrical signal output circuit is configured to: in response to the row readout signal, output the electrical signal to the corresponding pixel subarray readout feedback circuit;

wherein the reset signal receiving circuit comprises a reset signal latch circuit, and the reset signal latch circuit is configured to receive the reset signal from the corresponding pixel subarray readout feedback circuit, latch the reset signal in response to the row reset signal, and reset the photosensitive integration circuit in an effective duration of the row reset signal; and wherein the electrical signal output circuit is configured to: in response to the row readout signal, output the electrical signal to the corresponding pixel subarray readout feedback circuit, to cause the corresponding pixel subarray readout feedback circuit to compare the electrical signal with a threshold, and based on a comparison result: (i) generate the reset signal and feed the reset signal back to the reset signal latch circuit, and (ii) generate the output signal for output.

14. The method according to claim 13, wherein the selected row of pixel units in the pixel array is a row of pixel units in a corresponding pixel subarray in the at least one pixel subarray, the operation is performed on each pixel subarray in a pixel subarray polling manner, and in the pixel subarray polling manner, one pixel subarray is sequentially determined from the at least one pixel subarray as a target pixel subarray for an output signal to be read, wherein the one pixel subarray comprises at least one of the following: p rows of pixel units in the pixel array, q columns of pixel units in the pixel array, or p rows and q columns of pixel units in the pixel array, wherein p is an integer greater than 1 and not greater than a quantity of rows of the pixel array, and q is an integer greater than 1 and not greater than a quantity of columns of the pixel array; and the method further comprises: obtaining a corresponding output signal generated for each pixel unit in the target pixel subarray within a corresponding data frame read cycle, wherein the output signal generated for each pixel unit indicates whether the pixel unit generates a pulse signal.

15. A device, comprising a signal readout circuit, wherein the signal readout circuit comprises: a pixel array, a readout row selector circuit, a reset row selector circuit, and at least one pixel subarray readout feedback circuit, wherein the pixel array comprises at least one pixel subarray, and each pixel subarray is electrically connected to a corresponding pixel subarray readout feedback circuit in the at least one pixel subarray readout feedback circuit;

the readout row selector circuit is configured to send a row readout signal to a selected row of pixel units in the pixel array, to gate the selected row of pixel units;

the reset row selector circuit is configured to send a row reset signal to the selected row of pixel units, to gate first reset switches of the selected row of pixel units, the selected row of pixel units comprise a first pixel unit, and the first pixel unit is configured to convert an optical signal into an electrical signal, and output the electrical signal to the corresponding pixel subarray readout feedback circuit;

the corresponding pixel subarray readout feedback circuit is configured to receive the electrical signal from the first pixel unit, and in response to determining based on the electrical signal that a signal generation condition is met, generate a reset signal and send the reset signal to the first pixel unit, to gate a second reset switch of the first pixel unit, wherein the reset signal and the row reset signal cause the first pixel unit to perform a reset operation, and generate an output signal;

the first pixel unit comprises: a reset signal receiving circuit, a photosensitive integration circuit, and an electrical signal output circuit;

the reset signal receiving circuit is configured to receive the row reset signal to gate the first reset switch, and receive the reset signal to gate the second reset switch for performing the reset operation and to turn on the photosensitive integration circuit;

the photosensitive integration circuit is configured to: in an on state, convert the optical signal into the electrical signal and output the electrical signal to the electrical signal output circuit;

the electrical signal output circuit is configured to: in response to the row readout signal, output the electrical signal to the corresponding pixel subarray readout feedback circuit;

the reset signal receiving circuit comprises a reset signal latch circuit, and the reset signal latch circuit is configured to receive the reset signal from the corresponding pixel subarray readout feedback circuit, latch the reset signal in response to the row reset signal, and reset the photosensitive integration circuit in an effective duration of the row reset signal; and the electrical signal output circuit is configured to: in response to the row readout signal, output the electrical signal to the corresponding pixel subarray readout feedback circuit, to cause the corresponding pixel subarray readout feedback circuit to compare the electrical signal with a threshold, and based on a comparison result: (i) generate the reset signal and feed the reset signal back to the reset signal latch circuit, and (ii) generate the output signal for output.

16. The device according to claim 15, wherein the corresponding pixel subarray readout feedback circuit comprises a region readout feedback circuit, the region readout feedback circuit is electrically connected to pixel units in a specified region in the pixel array, a quantity of columns of the pixel units in the specified region is at least one and is less than or equal to a quantity of columns of pixel units in the pixel array, and a quantity of rows of the pixel units in the specified region is less than or equal to a quantity of rows of the pixel units in the pixel array.

* * * * *